United States Patent [19]

Stahl et al.

[11] Patent Number: 5,326,854
[45] Date of Patent: Jul. 5, 1994

[54] FLOCCULATION PROCESS USING LACTAM OR VINYL SULFONATE POLYMER

[75] Inventors: G. Allan Stahl, Humble, Tex.; Henry L. Hsieh; Ahmad Moradi-Araghi, both of Bartlesville, Okla.

[73] Assignee: Phillips Petroleum Company, Bartlesville, Okla.

[21] Appl. No.: 820,719

[22] Filed: Jan. 14, 1992

Related U.S. Application Data

[63] Continuation-in-part of Ser. No. 756,851, Jul. 18, 1985, Pat. No. 5,080,809, which is a continuation-in-part of Ser. No. 568,363, Jan. 9, 1984, Pat. No. 4,951,921, which is a continuation-in-part of Ser. No. 461,707, Jan. 28, 1983, Pat. No. 4,644,020.

[51] Int. Cl.$^5$ .................. B01D 21/01; C02F 1/56; C08L 33/24; C08L 39/06
[52] U.S. Cl. .................. 528/488; 523/312; 210/732; 210/734; 210/735; 524/922
[58] Field of Search ............... 528/488; 210/732, 734, 210/735; 523/312

[56] References Cited

U.S. PATENT DOCUMENTS

| | | | |
|---|---|---|---|
| 3,025,234 | 3/1962 | Canterino | 252/8.5 |
| 3,146,193 | 8/1964 | Sullivan | 210/54 |
| 3,179,171 | 4/1965 | Beale, Jr. | 166/42 |
| 3,256,141 | 6/1966 | Stephenson | 162/190 |
| 3,421,584 | 1/1969 | Eilers et al. | 166/33 |
| 3,434,971 | 3/1969 | Atkins | 252/8.55 |
| 3,450,680 | 6/1969 | Jursich et al. | 260/78.5 |
| 3,511,313 | 5/1970 | Eilers et al. | 166/295 |
| 3,558,545 | 1/1971 | Lummus | 260/29.6 |
| 3,629,101 | 2/1969 | Hille et al. | 252/8.5 C |
| 3,816,308 | 6/1974 | Le Blanc | 252/8.5 A |
| 3,877,522 | 4/1975 | Knight et al. | 166/295 |
| 3,937,633 | 2/1976 | Knight et al. | 106/90 |
| 4,048,077 | 9/1977 | Engelhardt et al. | 252/8.5 |
| 4,282,261 | 8/1981 | Greene | 210/734 |
| 4,304,300 | 12/1981 | Watson | 166/291 |
| 4,471,097 | 9/1984 | Uhl et al. | 526/240 |
| 4,536,294 | 8/1985 | Guillet et al. | 210/734 |
| 4,951,921 | 8/1990 | Stahl et al. | 523/130 |
| 5,080,809 | 1/1992 | Stahl et al. | 166/273 |

OTHER PUBLICATIONS

Foshee et al., SPE 6202 "Preparation and Testing of Partially Hydrolyzed Polyacrylamide Solutions", presented at Fall conference of Pet. Engineers, Oct. 3–6, 1976.
Klemmensen and Bauer, "Water Soluble Acrylic Polymer for Enhanced Oil Recovery", Polymer Preprints, vol. 22, Aug. 1981, pp. 78–80.
Park, Scott and Lummus, "Obtaining Low Solids Drilling Fluids", Oil and Gas Journal, vol. 58, pp. 81–84, May 30, 1960.
Kirk–Othmer Encyclopedia of Chemical Technology, Third Edition, vol. 10, "Flocculating Agents", pp. 489–523 (1980).
Kirk–Othmer Encyclopedia of Chemical Technology, Third Edition, vol. 10, "Flotation" pp. 523–547 (1980).

Primary Examiner—Paul R. Michl
Assistant Examiner—Andrew E. C. Merriam
Attorney, Agent, or Firm—Gary L. Haag

[57] ABSTRACT

A process capable of operation under hostile conditions for accelerating the sedimentation of suspended solids in an aqueous suspension using a flocculating agent comprising a water-soluble polymer composition produced from a monomer composition comprising at least one of a hydrophilic N-vinyl lactam or a hydrophilic vinyl-containing sulfonate.

28 Claims, 16 Drawing Sheets

FLOCCULATION PROCESS USING LACTAM OR VINYL SULFONATE POLYMER

This application is a Continuation-In-Part of copending application Ser. No. 06/756,851 filed Jul. 18, 1985 now U.S. Pat. No. 5,080,809, which is a Continuation-In-Part of then copending application Ser. No. 568,363 filed Jan. 9, 1984 now U.S. Pat. No. 4,951,921, which is a Continuation-in-Part of then copending application Ser. No. 461,707, filed Jan. 28, 1983, now U.S. Pat. No. 4,644,020.

This invention relates to the use of polymers as flocculating agents and further relates to their application in minerals benefication.

BACKGROUND

Synthetic polymers have been developed and used as flocculating agents in processes for the recovery of natural resources. For such processes, there is an increasing demand for polymers which will withstand hostile environments including, e.g. high temperatures, high salinity, and high content of multivalent metal cations, commonly known as "hardness ions", as well as the high acidity, temperature and shear conditions which are often encountered.

In processing mineral ores, it is often necessary to separate finely divided solids from aqueous suspension; conversely, in treating water for use, e.g., for municipal water supplies or industrial applications, it is often necessary to remove finely divided solids which may be suspended therein. Improvements in the ease of separation of finely divided solids from aqueous suspension either by sedimentation or by filtration have been accomplished by incorporating small amounts of high molecular weight water-soluble polymers in such suspensions. Among such polymers which have proven to be effective on a wide variety of ore suspensions are high molecular weight polyacrylamide polymers and the hydrolysis products thereof. Kirk-Othmer Encyclopedia of Chemical Technology, Vol. 10, p. 489-548 (3rd Ed-1980), whose teachings are herein incorporated by reference, teaches the use of cationic, anionic and non-ionic polymers as "Floculating Agents" and in "Flotation". Improved polymers have also been developed for this purpose; for example, Sullivan discloses in U.S. Pat. No. 3,146,193 (1964) certain high molecular weight water-soluble copolymers of certain vinyl substituted, nitrogen-containing, heterocyclic ring compounds with acrylamide which can be incorporated in aqueous suspensions of finely divided inorganic solids to facilitate the concentration and separation of such solids.

Processes using improved polymers are in demand for the treatment of concentrated brine solutions, e.g., potash ore processing. As an example, the American potash industry annually treats more than 18 MM tons of ore from which more than 3 MM tons of potash concentrate is recovered. Most of this product is used as fertilizer; however, nearly all of the potassium required by other U.S. industries comes from this concentrate.

A typical potash ore consists of sylvite (20-25%), halite (60-75%), and clay (4-20%). The potassium containing mineral is sylvite (KCl). The major impurities are halite (NaCl) and clay. The mixed ore is processed at the mine site. The processing varies with the level of clay, the higher clay ores requiring a more extensive treatment. This extensive treatment is becoming more widely utilized as the mines grow more mature and use lower grade ores.

The adverse effect of clay is caused by the high affinity of potash collectors for clay. The potash collectors are chemical compounds which ideally adsorb onto sylvite and then facilitate the flotation separation process. The affinity of the collector for clay diminishes the cost effectiveness of the overall process which typically consists of subsequent crushing, grinding, hydrolytic clay removal, and flotation steps. As a result, the time, cost and steps required are dependent upon the clay content. When more than a few percent of clay is present, the clay must be "blinded" by a polymer which historically has been polyacrylamide, guar gum, or potato starch before addition of the collector.

A preferred step would be clay removal by flocculation with a brine soluble polymer, since all processing is conducted in saturated brine to prevent mineral dissolution. This polymer, in addition to brine solubility, must retain its activity and thus cost effectiveness in the presence of the high ionic strength brine medium. The effectiveness of most polymers, such as the polyacrylamides, are reduced, and in many cases the polymers are actually precipitated in such brines. Thus, effective flocculating agents which will withstand such saturated brines are in demand.

SUMMARY OF THE INVENTION

An object of this invention is the development of flocculation processes suitable for use in the recovery and processing of natural resources such as water and minerals. Another object is the development of such processes capable of operation at hostile conditions including high temperatures and/or highly saline environments and/or water with a high concentration of hardness ions. Other objects, advantages and features of the invention will be readily apparent to one skilled in the art from the following detailed description of the invention, drawings, and the appended claims.

In accordance with the present invention, a process which is also capable of operation under hostile conditions has been developed for accelerating the sedimentation of suspended solids in an aqueous suspension by using a flocculating agent comprising a water-soluble polymer composition produced from a monomer composition comprising at least one of a hydrophilic N-vinyl lactam or a hydrophilic vinyl-containing sulfonate and optionally another monomer.

Further in accordance with the present invention, polymers prepared in accordance with this invention are added to a liquid containing solids to aid in flocculating such solids, wherein the temperature of the liquid is at least about 150° F. and/or the liquid has a salinity of at least about 10 grams per kilogram of solution.

DETAILED DESCRIPTION OF THE INVENTION

Figure 1:
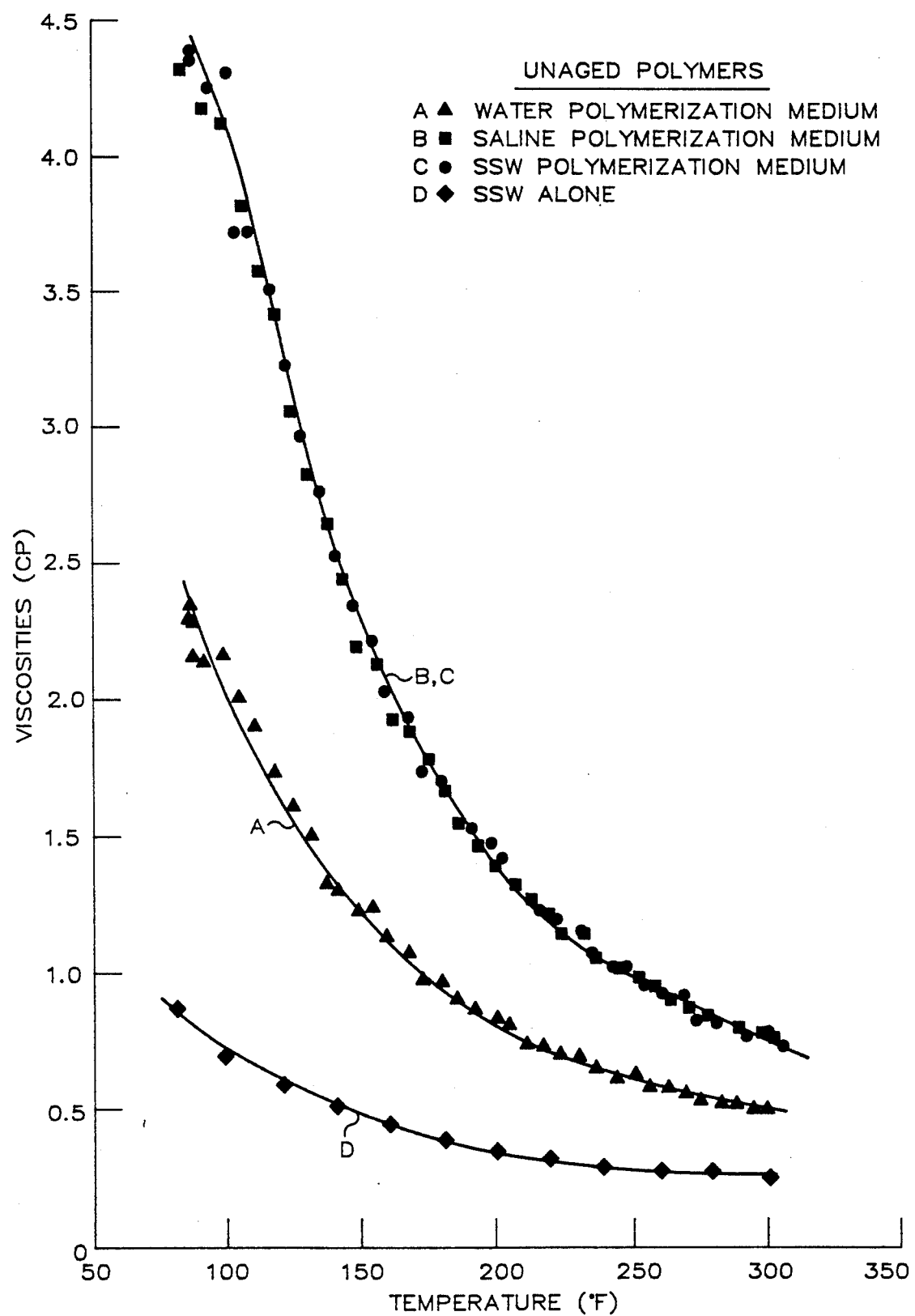
FIG. 1 shows the variation of viscosity with temperature of unaged polymers of this invention compared with polymers of the prior art and synthetic sea water.

This invention concerns a process for concentrating finely divided organic or inorganic solids from an aqueous suspension thereof by admixing with the suspension an effective amount of polymer to cause accelerated sedimentation of the suspended solids and maintaining the treated suspension under quiescent conditions to separate a clarified supernatant liquid layer and a concentrated solid suspension layer.

In carrying out the flocculation, the polymer is distributed in a suspension of finely divided inorganic solids in any fashion by which rapid, thorough mixing may be accomplished without excessive agitation. In a preferred method of operation, the copolymer is dissolved in water and introduced into the suspension in the form of a dilute aqueous solution. Following the introduction of the polymer solution, the treated suspension is transferred with a minimum of agitation and shearing action into a quiescent zone such as a sedimentation vessel to allow the developmeat and settling of agglomerates of the finely divided solids. In practice, the polymer solution may be sprayed or otherwise introduced into a flume or other conduit through which the suspension is moving. In such operations the conduit may be equipped with baffle plates or other weans of mild agitation at or immediately following the point of introduction of the polymer solution to assure thorough mixing. Preferably the polymer solution is added portionwise or at a plurality of sites to accomplish thorough distribution of flocculant without local overtreatment.

Following the mixing of the solution of polymer with the suspension of finely divided solids, as set forth above, the treated suspension may be submitted to various conventional procedures for the concentration or separation of solids from the suspension. For example, the treated suspension may be fed into a settling tank or thickener to effect the separation of a concentrated slurry of solids as an underflow product and a clarified aqueous effluent as an overflow product.

The amount of polymer to be employed will vary depending upon the type of inorganic solids, the degree of subdivision thereof and the rate of settling required. With highly amenable solids, such as certain chemical precipitates, excellent improvement in settling rate and clarity of supernatant liquid can be Obtained when employing only 0.001 pound of polymer per ton of suspended solids. For most finely ground materials, good results can be obtained when employing about 0.01 to about 0.1 pound of polymer per ton of suspended solids, although loadings ranging up to 1 or 2 pounds of polymer per ton of solids may sometimes be required, particularly when the solids are to be filtered following treatment. In any case, an amount sufficient to increase the rate of sedimentation of the solids is employed. In some cases, the specifically identified polymers are conveniently employed in conjunction with other flocculants such as polyacrylamides or natural polymers.

Polymers

As used herein the term "polymers" is used generically, unless otherwise indicated, to mean homopolymers, copolymers and terpolymers and thus includes polymers prepared using any number of monomers.

However the polymers of interest and used in the present invention are prepared from a monomer-composition comprising at least one of a hydrophilic N-vinyl lactam or a hydrophilic vinyl-containing sulfonate. Polymer preparation and resulting polymer properties are taught in said Ser. No. 756,851 (U.S. Pat. No. 5,080,809) which in its entirety is herein incorporated by reference or the polymers may be prepared by any other process known to those skilled in the art.

The copolymers and terpolymers of this invention appear to be well suited for flocculation treatments in minerals beneficiation, and water treatment. In a presently preferred embodiment, the copolymers and terpolymers, to be described subsequently, are well adapted because of their outstanding stability in hostile, saline, and hard water environments.

Hostile Environment

A hostile environment for the purpose of this application is one in which the temperature, salinity and/or hardness cation content is high enough to cause precipitation, loss of viscosity and/or similar adverse effects within a nominal period of time in conventional polymers otherwise suitable for use in such applications. Such conventional polymers include, for example, polyacrylamides. The advantages of the polymers of this invention are apparent when they are employed in hostile environments of at least 120° F. or as more specifically defined in FIG. 14 wherein the time until polymer precipitation for previously "unhydrolyzed" polyacrylamide decreases as temperature and hardness cation concentration increase. Brackish and/or hard aqueous fluids having a salinity of at least about 10 grams per kilogram of solution and/or a fraction of divalent hardness ions to total cations of at least about 1 weight percent and particularly at least about 5 weight percent in combination with temperatures of at least about 120° F.

are considered hostile environments. Since hardness cations such as Ca$^{+2}$ and Mg$^{+2}$ are particularly damaging to many such polymers, when the salinity and hardness cation content are relatively high, the hostile zone is defined by a relatively lower temperature. A hostile environment, for example, is one wherein the temperature can be as low as 150° F. and the electrolyte concentration of dissolved salts is at least about 35,000 ppm (with about 1750 ppm combined calcium and magnesium ions), i.e., about 3.5 weight percent or higher, equivalent to a salinity of about 35 grams per kilogram of solution. At a lower temperature, from e.g about 120° F. up to about 150° F. a relatively higher salinity and/or content of hardness cations would create such a hostile environment, say, for example a salinity of at least about 50–100 grams per kilogram with a fraction of divalent hardness cations to total cations of at least about 20 weight percent. At temperatures of at least about 120° F., a hostile environment for polymer can also be created by a strongly basic environment, e.g., concentrations of at least about 5 weight percent of strong base, which accelerates the hydrolysis process in many polymers.

A hostile environment can best be viewed as one in which conventionally used thickening agents are unstable. Polyacrylamides are such conventionally used thickening agents.

Figure 14:
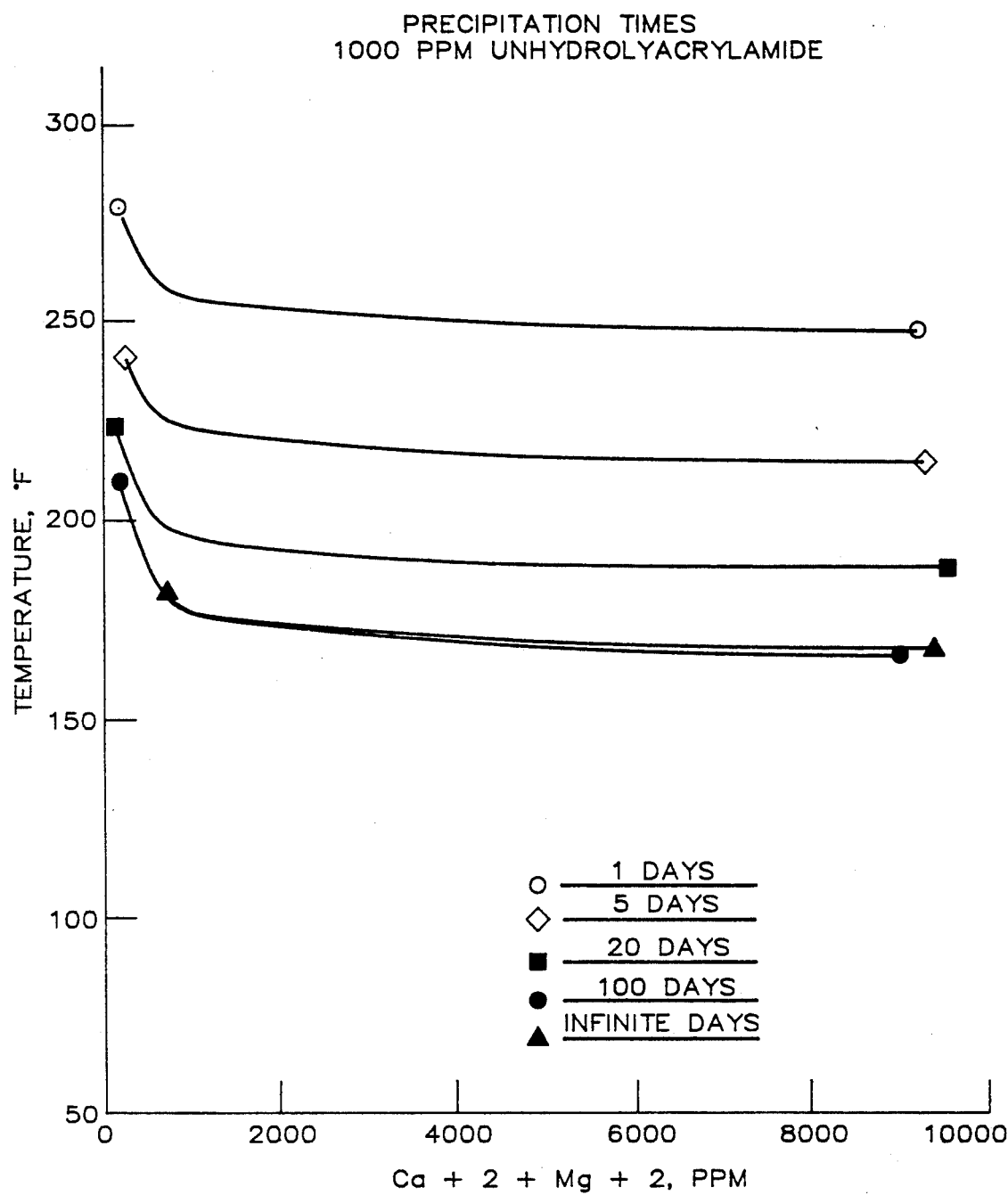
FIG. 14 is a plot of precipitation times for 1000 ppm unhydrolyzed polyacrylamide in ~5% total dissolved solids as a function of brine temperature and divalent ion concentration.

As previously shown in FIG. 14, polyacrylamides hydrolyze at elevated temperatures and will eventually precipitate in the presence of divalent cations. The following is the method by which the limits of a hostile environment are determined using this criteria. That is, the boundary below which this polymer remains in solution indefinitely and above which in days or months it falls out of solution, resulting in loss of polymer viscosity which is indicative of a lack of polymer stability and thereby defines a hostile environment.

Figure 12:
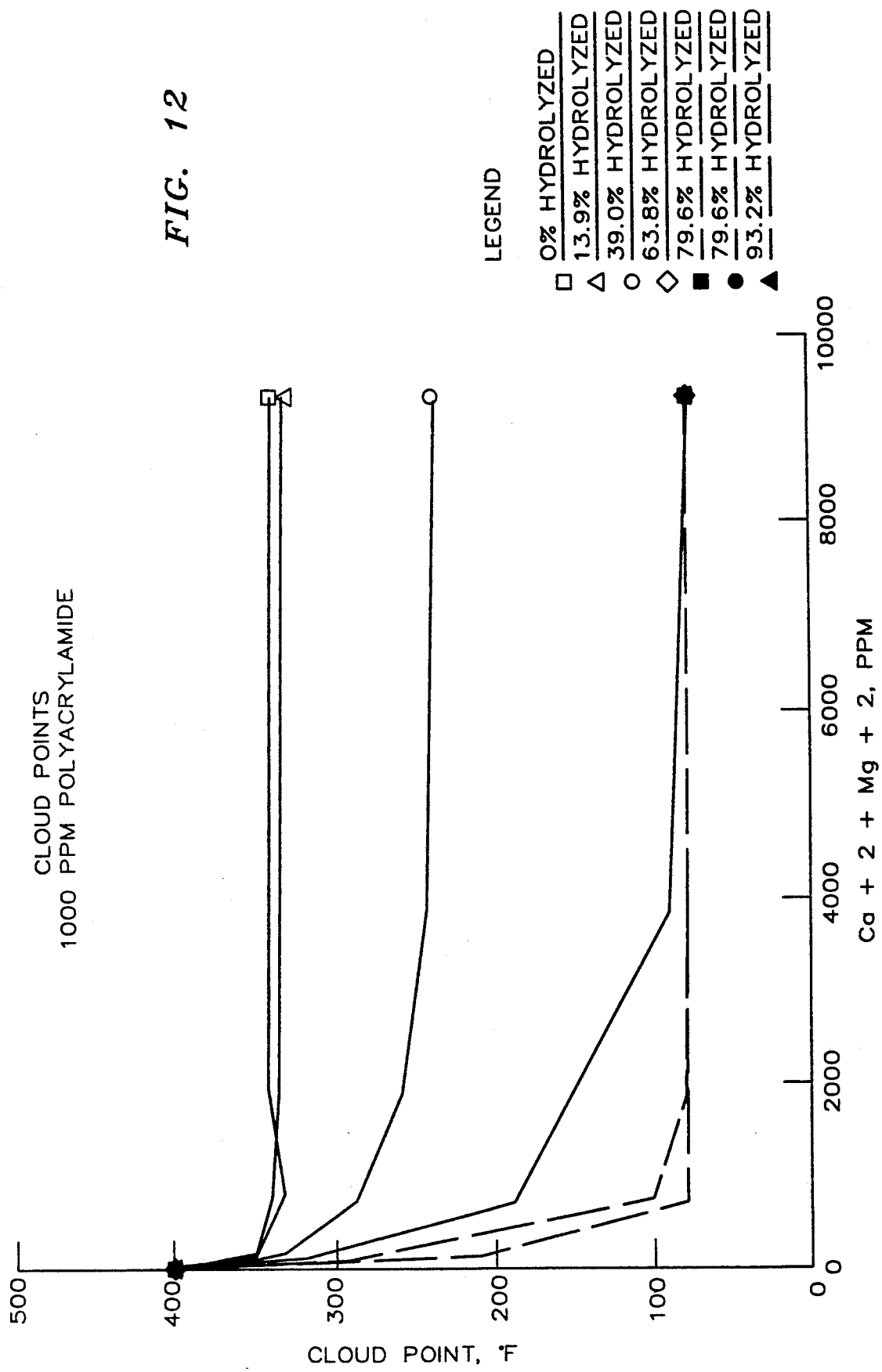
FIG. 12 is a plot of cloud point of 1000 ppm polyacrylamide as a function of hydrolysis and multivalent cation concentration in ~5% total dissolved solids saline.

Any polyacrylamide in hard brines will eventually turn cloudy (i.e., begin to precipitate if its temperature is raised high enough). FIG. 12 shows the cloud point as a function of divalent cation concentration for 1000 ppm by weight originally "unhydrolyzed" commercial polyacrylamide in various brines. These solutions were themally "hydrolyzed" to different levels in 5% saline solution (i.e., in the absence of divalent (hardness) cations). Divalent cations were then added (equal amounts of calcium and magnesium in ppm by weight) and cloud point measurements made. In the absence of divalent cations, this polymer stays in solution up to 400° F. (the limits of the measurement) regardless of the level of hydrolysis. The presence of divalent cations, on the other hand, affects the cloud point depending on the hydrolysis and hardness level. That is, the higher the hydrolysis level and divalent cation concentration, the lower the cloud point.

Figure 13:
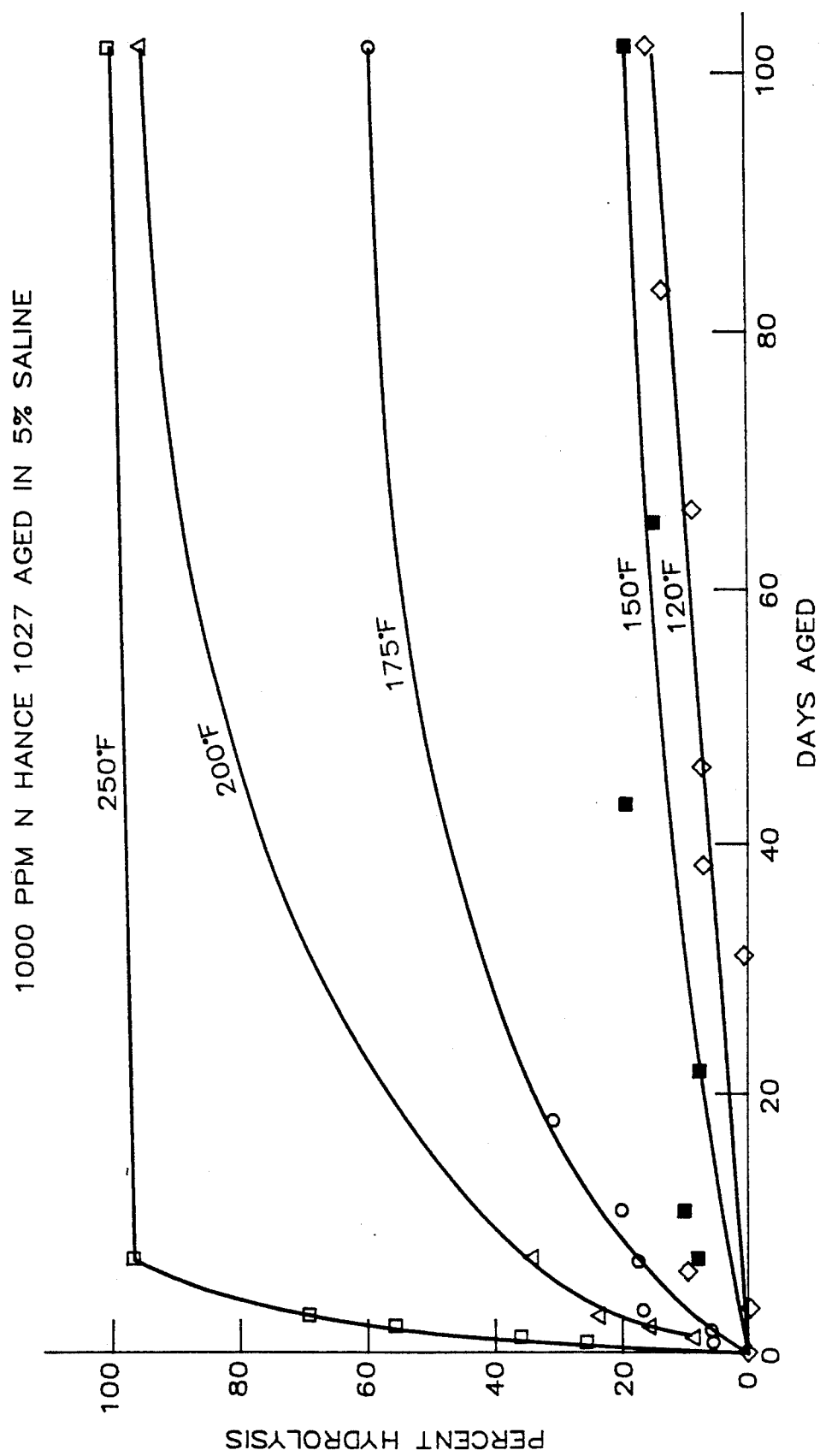
FIG. 13 is a plot of per cent hydrolysis of 1000 ppm polyacrylamide versus days aged in ~5% total dissolved solids saline.

FIG. 13 shows the effects of time and temperature on the hydrolysis of 1000 ppm of the same "unhydrolyzed" commercial polymer. This figure indicates that at a given temperature the level of hydrolysis increases with time, but eventually reaches an equilibrium. Using a standard thermodynamic treatment of an equilibrium reaction, where K$_{eq}$ is the equilibrium constant, ΔS° and ΔH° are the standard entropy and enthalpy changes for the reaction, R is the gas constant and T is the absolute temperature $$K_{eq} = \frac{\Delta S^o}{R} - \frac{\Delta H^o}{RT} \quad (1)$$

Fitting this equation to K$_{eq}$ and T values derived from FIG. 13 gave values of ΔS° and ΔH° which were then used to calculate K$_{eq}$ and equilibrium level of hydrolysis for any desired temperature. A standard analysis of the kinetics of hydrolysis gives the following equation $$\frac{Ao - Ae}{Ao + Ae} Ln \frac{Ao^2 - AAe}{(A - Ae)Ao} = k_f t \quad (2)$$

where Ao, Ae and A are the amide concentrations at zero time, at equilibrium and at t, respectively, and k$_f$ is the rate constant for the forward (hydrolysis) reaction. By fitting amide concentrations to equation (2) k$_f$ values were calculated for the five temperatures represented in FIG. 13. A fit of these results to the Arrhenius equation $$k_f = Ce^{-Ea/RT} \quad (3)$$

gave values for C, the pre-exponential factor and Ea, the activation energy. The forward rate constant for any desired temperature could then be calculated. Using the k$_f$ value for a given temperature and equation (2), the time required to achieve a given degree of hydrolysis can be calculated. This can be done so long as the desired hydrolysis level is lower than the equilibrium level of hydrolysis for that temperature, that is as long as A=Ae in equation (2). For A<Ae, this equation predicts time to approach infinity. For A<Ae, time is undefined. In other words, the hydrolysis level at any temperature cannot exceed the equilibrium value for that temperature.

FIG. 12, with appropriate interpolation, can be used to define the hydrolysis level that causes the onset of precipitation for any given temperature and hardness level. Equations (1), (2), and (3) predict the time taken to reach this level of hydrolysis. If the equilibrium hydrolysis level is less than the level causing instability, the time is infinite. In other words, an initially unhydrolyzed polyacrylamide will be indefinitely stable under the chosen conditions. If the equilibrium hydrolysis level is greater than the level causing instability, the polymer will ultimately precipitate and the calculation gives the time to the onset of instability. If the two hydrolysis levels are exactly equal, the stability limit has been defined.

By repeated calculations at closely spaced temperatures for many hydrolysis levels, FIG. 14 was generated. This gives contour lines of equal precipitation time as a function of temperature and hardness level. Any conditions above and to the right of the infinity line.

It must be pointed out that FIG. 14 is for an unhydrolyzed polymer and the stability times are much longer than for already partially hydrolyzed polyacrylamides. Furthermore, the polymer used in this study has a moderate molecular weight (MW) and those commonly used as flocculants have higher MW which precipitate at lower temperatures under the same hardness and hydrolysis levels. It must also be mentioned that polymer concentration may play a role in precipitation of polymer and FIG. 14 represents stability limits for 1000 ppm of polymer.

Since there is so little difference between the 100 day curve and the infinity curve, there is no need to make an arbitrary designation of a time limit for the time parameter but rather infinity can be used. Also, since many fluids requiring flocculation treatment in an otherwise hostile environment will have at least 400 to 1000 ppm multivalent cations, and since the infinity curve becomes almost flat after about 1000 ppm, the hardness parameter can simply be anything greater than 500-1000 ppm by weight multivalent cations. This leaves the temperature as the significant factor, the temperature being anything over about 170° F. at greater than 1000 ppm multivalent cations although, of course, defining the hostile environment as above (i.e. above and to the right) of the infinity line is more precise. Generally the temperature will be within the range of 170°–400° F. or at least 170°–300° F. and the multivalent cation concentration will be within the range of 500 to 220,000 or more likely 1000 to 10,000 ppm by weight based on the weight of water.

Although several biopolymers have been reported to be stable in sea water for extended periods at temperatures up to a range of from about 150 F. to nearly 200 F., above about 200 F. the only water-soluble polymer known to maintain its solution viscosity under these conditions is polyvinylpyrrolidone (PVP). However, PVP is relatively expensive.

Copolymers

The copolymers and terpolymers used in this invention are generally water-soluble or water-dispersible and cheaper to prepare than polyvinylpyrrolidone (PVP). These polymers can be retained in solution in the aqueous polymerization medium in which they are prepared. When prepared by radiation polymerization in a viscous polymer mass (commonly known as a "gel log"), the polymers are also water-soluble. However when the polymer separated from such an aqueous medium and dried, it is generally expected to be water-dispersible and/or swellable, but may not be completely water-soluble. On the other hand, the polymers separated from a polymerization medium consisting essentially of a tertiary alkanol in accordance and dried appear to be generally water-soluble, which can be an advantage when a granular, water-soluble polymer material is desired. They have been found to provide adequate solution viscosity with exceptional thermal stability and resistance to electrolyte effects, thus are superior to PVP in hot, saline environments, especially those containing "hardness" or multivalent metal cations such as $Ca^{+2}$, $Mg^{+2}$, etc. Their preparation and properties are taught in U.S. Pat. No. 5,080,809 (previously incorporated by reference).

The copolymers for this inventive process are derived from N-vinylamide monomer units; that is cyclic amides called N-vinyl lactams and/or open chain N-vinyl amides. N-vinyl lactams preferably having the formula

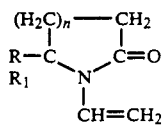

where R and $R_1$ are selected independently from the group consisting of hydrogen, methyl and ethyl and n is an integer of from 1 to 3. These monomers are generally water-soluble or water-dispersible. A more preferred class of compounds are those of the formula

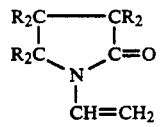

where $R_2$ is hydrogen, methyl or ethyl. The monomer unit presently most preferred is N-vinyl-2-pyrrolidone (VP).

Alternatively, in place of or in addition to the N-vinyl lactams, (i.e., N-vinyl cyclic amides), open chain N-vinyl amides suitable for use in the present invention are described by the formula

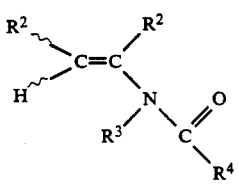

wherein each $R^2$ is independently selected from H and 1-6 preferably 1-2 carbon atom alkyl groups; $R^3$ and $R^4$ are selected from 1-3 carbon atom alkyl groups. The preferred monomer is N-methyl-N-vinylacetamide because of the exceptional resistance to hydrolysis of copolymers made therewith in combination with the unsaturated amide monomers and/or vinyl-containing sulfonate monomers described herein. Such polymers are particularly suited for temperatures of 190° F. or greater (88° C.) in the presence of 400 or more ppm multivalent cations such as $Ca^{+2}$ or $Mg^{+2}$.

Although the $R^2$, $R^3$, $R^4$ groups can be independently selected as noted, the resulting monomer must be hydrophilic as defined herein to be used as the N-vinyl amide component of compositions of this invention. These alternative N-vinyl amide components can be viewed as open chain or with the $R^3$ and $R^4$ groups fused as the lactam component. Hence the generic term N-vinyl amide is used to include both the lactam and the open chain N-vinyl amide, these both being hydrophilic.

Copolymers of this invention are produced by copolymerizing a comonomer of an unsaturated amide having the formula

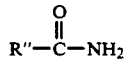

wherein R" is an unsaturated radical selected from 1-alkenyl groups such as ethenyl (vinyl), propenyl, isopropenyl, 1-butenyl, isobutenyl (2-methyl-1-propenyl), 1-pentenyl, 1-isopentenyl (3-methyl-1-butenyl), and 1-methyl-1-butenyl with a comonomer of at least one N-vinyl lactam as described above. These unsaturated amides are generally water-soluble or water-dispersible. The monomers presently preferred are N-vinyl-2-pyrrolidone (VP) and acrylamide (Am). For convenience, the terms VP and Am will be used to refer to the first and second monomers, respectively, in the discussions herein.

A more preferred class of unsaturated amide monomers are those of the formula

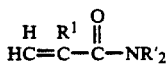
$$HC=C-\overset{R^1}{\underset{H}{|}}-\overset{O}{\overset{\|}{C}}-NR'_2$$

wherein each R' is individually selected from H and methyl. Especially suitable in addition to acrylamide are N-methylacrylamide and N,N-dimethylacrylamide (DMAm). For both the vinyl lactam and unsaturated amide the scope can be viewed functionally as including the replacement of hydrogens with hydrocarbon groups so long as the monomer remains hydrophilic. By hydrophilic is meant if the monomer were homopolymerized, the polymer would be water soluble. A monomer which may not form a water-soluble homopolymer but which, in the amount used in a copolymer results in a water-soluble copolymer is also viewed in a broader sense within the definition of hydrophilic.

The minimum amount of N-vinyl lactam comonomer required is that amount necessary to provide the desired polymer properties (e.g. stability) under the expected environmental conditions. For example, polymers containing a minor amount, up to about 10 weight percent, of the vinyl lactam could be effective in the recovery and processing of natural resources at temperatures in the range of about 120° F. to about 150° F. and/or waters of significant salinity and/or hardness. Polymers of these proportions could also be useful under more adverse conditions if exposed for shorter periods of time.

The monomer weight ratios of the copolymers can vary rather widely. Generally, VP:AM ratios in the range from about 10:90 to about 90:10 are employed depending upon the intended application. However, VP:Am weight ratios as low as 5:95 and as high as 99:1 can be prepared and employed for specialized applications. Preferably, VP:AM weight ratios in the range of about 25:75 to about 75:25 are employed, more preferably from about 40:60 to about 70:30. The optimum VP:Am weight may vary according to the application. For example, in EOR the range presently preferred is from about 65:35 to about 50:50, based on prolonged aging studies conducted with the copolymers. A copolymer presently particularly preferred for certain applications after heat aging at 250° F. contains about 60 weight percent VP and about 40 weight percent Am, corresponding to a 1:1 molar ratio. The VP:Am weight ratios of 10:90 to 90:10 correspond to molar ratios of about 6:94 to 85:15.

After heat aging, copolymers of these 60:40 proportions have been found to retain their viscosity well in hot, saline environments. On the other hand, when the copolymers are to be used without such pre-aging, higher, if less persistent, viscosities have been obtained with copolymers having VP:Am weight ratios in the range of from about 45:55 to about 55:45, or preferably about 50:50. Since the VP:Am weight ratios are expressed in terms of 100 parts by weight of the copolymer, the weight percentages of the monomer units in the copolymer can be read directly.

Terpolymers

Further in accordance with this invention, useful terpolymers can be prepared by copolymerizing a first monomer unit of an N-vinyl lactam and a second monomer unit of an unsaturated amide as described above with a minor portion of a third monomer selected from the group consisting of hydrophobic compounds, vinyl pyridines and hydroxyalkyl esters of ethylenically-unsaturated carboxylic acids and combinations of any two or more thereof. Particularly suitable second monomers are acrylamide and N-substituted unsaturated amides such as N,N-dimethylacrylamide. For convenience, the third monomer will hereinafter be referred to as a termonomer, as distinguished from the first and second monomer units described above, which are referred to as comonomers, or VP and Am for convenience. The hydrophobic compounds suitable for the termonomers are generally selected from the group consisting of monovinyl aromatic hydrocarbons having from 8 to about 12 carbon atoms such as styrene, vinyl esters of saturated carboxylic acids having from 3 to about 6 total carbon atoms such as vinyl acetate, alkyl esters of ethylenically-unsaturated monocarboxylic acids having from 3 to about 22 carbon atoms, such as ethyl acrylate, and ethylenically-unsaturated nitriles having from 3 to about 5 total carbon atoms, such as acrylonitrile. Other suitable hydrophobic monomers are N-vinyl acetamide and 2-vinyl quinoline. Also suitable hydrophobic monomers are acryloyl pyrrolidones, diacetoneacrylamide and N- and N,N-alkylacrylamides where the alkyl groups contain more than two carbon atoms. By hydrophobic is meant that if the monomer were homopolymerized, it would be water insoluble although in amounts up to 25 percent it can be present herein and the total polymer is still water soluble. Other suitable compounds (hydrophilic but not anionic) include vinyl pyridines such as 4-vinyl pyridine, acryloyl morpholine, methyl vinyl ether, ethyl vinyl ether, dimethylallyl ammonium chloride, dimethylaminoethyl acrylate, N-vinyl urea, acryloyl urea, N,N-diethylaminoethyl acrylate, N-methyol acrylamide, tert-butylaminoethyl acrylate, dimethylaminopropyl methacrylamide, methacrylamidopropyl trimethyl ammonium chloride, and hydroxyalkyl esters of ethylenically-unsaturated monocarboxylic acids having from 3 to about 22 carbon atoms, such as hydroxyethyl acrylate. Termonomers which are presently preferred comprise (meth)acrylic acids and their monovalent salts and their esters such as methyl acrylate, butyl acrylate, methyl methacrylate and lauryl methacrylate, acrylonitrile, diacetone acrylamide and styrene for increasing the hydrophobic character of the terpolymers, vinyl pyridines, hydroxypropyl methacrylate and hydroxyethyl methacrylate and hydroxyethyl acrylate as water soluble monomers which increase the hydrophilic character of the terpolymers without introducing termonomers which are sensitive to metal cations (and because good results have been obtained with 4-vinylpyridine and 5-methyl-2-vinylpyridine); and vinyl acetate due to its low cost and ready availability.

As with the copolymers, the monomer weight ratios of the terpolymers can vary rather widely, depending upon the intended application, but preferably the termonomer will be present as no more than about 10 weight percent of the monomer units charged. More broadly, however, particularly with non-ionic hydrophylic termonomers up to 25 weight percent can be used. The first and second monomer units can be present in approximately the range of weight ratios disclosed for the copolymers, constituting the major portion of the terpolymer, with the termonomer providing the remaining minor portion. For example, the terpolymer can consist of 45 weight percent each of the first and second monomers, with 10 weight percent of the termonomer, 49 weight percent each of the first and second monomers with 2 weight percent of the termonomer, and so on. These examples contain the first and second monomer units in weight ratios of 50:50, but as disclosed above, the three monomer units can be combined in any combination, provided the termonomer does not exceed 10 weight percent, but preferably is at least 1 weight percent, and the first and second monomer units are within the range of weight ratios as disclosed for the copolymers. Based on the examples, the temonomer is preferably present as from about 2 to about 8 weight percent, or more preferably, from about 3 to about 5 weight percent, based upon total monomers.

As the copolymerization reaction produces polymer in near-quantitative yield, the desired ratios of VP to Am can be obtained by controlling the ratios of VP monomer and Am monomer charged to the reactor and the rates at which the monomers are fed into the reactor.

Third Comonomer

In order to distinguish between the N-vinyl lactam and unsaturated amide comonomers which are hydrophilic and non-ionic or neutral on the one hand and the sulfonate comonomer which is also hydrophilic but anionic on the other hand, the sulfonate is arbitrarily referred to as the "third comonomer". This then further distinguishes from the monomers referred to as termonomers which are generally hydrophobic or if hydrophilic are not anionic.

The third comonomer is referred to as a vinyl-containing sulfonate which is meant to encompass the acid also. They are represented by the following formula.

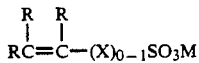

Also the analogous phosphonate compounds as represented by the formula can be used.

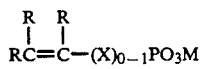

where in each formula R is methyl, ethyl or H preferably methyl or H and provided further that at least one of the R groups on the terminal carbon of the vinyl group is H and the other is H or methyl. In another embodiment, the non-terminal R can be a group which will make the vinyl group more reactive. As an example, R can be a nitro group.

M in each formula is H, Na+, K+, Li+, R''''$_4$N+, Ca++ or Mg++ and
X in each formula is

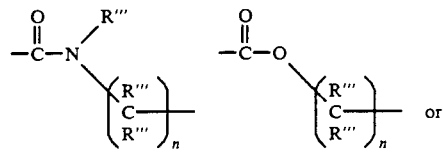

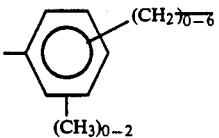

where n is an integer of 1-5, preferably 1-3, and R''' is individually selected from 1-3 carbon atom alkyl groups, or H, R'''' is selected individually from H, —ROH or a 1-3 carbon atom alkyl radical.

In a broader embodiment, M can be selected from those cations recited above and in addition can be other polyvalent metals such as Zn++, Sr++, Fe++, and Mn++. Other cations are organic cations of the formula +NH$_3$R$^1$NH+$_3$ where R$^1$ is 1-20 carbon atom divalent hydrocarbon radical. Examples of organic cations are those formed from methylamine, diethylamine, ethylene diamine, tetramethyl ethylene diamine, long chain diamines such as C$_{12}$ diamines and N-propylaminodiethanol. Polyether diamines are particularly suitable. Such materials are sold under the tradename Jeffamine ED-600, ED-900 and ED-2001 and have the following general structure.

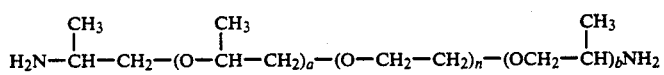

where a+b is 2-3 and n is 8-41. Another particularly desirable class of amines is the multi-basic amines such as poly(ethylenimine). The acid form of the monomer can be reacted with the polyether diamines in water or a solvent such as DMF, DMSO, alcohol or mixtures thereof and the salt precipitated and isolated. In the case of aqueous systems, the monomer generally is added last. In some instances, there may be a preference for tertiary amines instead of the primary.

In the case of polyvalent cations, the resulting monomer units which are [CR$_2$=CR(X)$_{0-1}$—SO$_3$]$_2$M and a small amount of [CR$_2$=CR(X)$_{0-1}$—SO$_3$]M+ have a greater molecular weight and also have the potential for crosslinking in the resulting polymer. While not wishing to be bound by theory, the use of such divalent cations can be viewed as creating an ionic crosslinking of two or more monomer units, i.e.

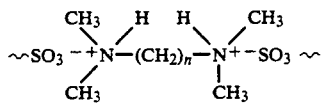

After polymerization this in effect gives crosslinking between polymer chains thus increasing the molecular weight and hence increases the viscosity the resulting polymer will impart to water. However, surprisingly the most dramatic effect is to give more stable polymer in copolymerizations with unsaturated amides such as acrylamide. While not wishing to be bound by theory, apparently the polyvalent cation monomer is more nearly equal to or greater than the acrylamide in reactivity and thus avoids long segments of polyamide homopolymer blocks from being formed which render the entire molecule unstable. This increased stability is particularly remarkable in polymer compositions having 10 weight percent or greater, i.e., 10-90, preferably 10-50 weight percent of the unsaturated amide. Indeed, the difference in hydrolysis resistance of copolymers produced from monomer salts of the various metals, primary, secondary, and tertiary or diamines allows fine tuning of the properties of the final polymer to suit a particular end use. Examples of suitable monomers are:

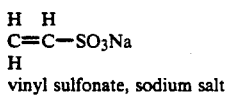
vinyl sulfonate, sodium salt

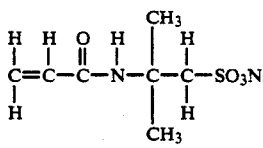
sodium-2-acrylamido-2-methylpropane sulfonate (sodium AMPS)

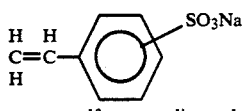
styrene sulfonate, sodium salt

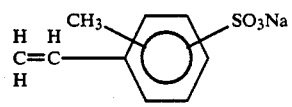
sodium vinyl toluene sulfonate

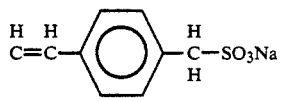
sodium p-vinylbenzyl sulfonate

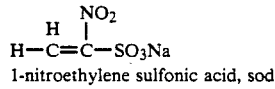
1-nitroethylene sulfonic acid, soduim salt

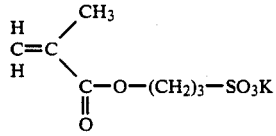
(3-sulfopropyl)methacrylic ester, potassium salt (SPM)

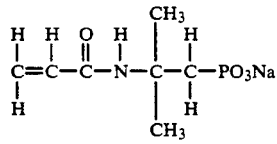
2-acrylamido 2-methylpropane phosphonic acid, sodium salt.

The first two formulae for X can be viewed as

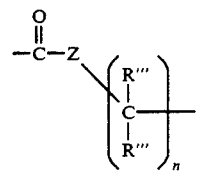

wherein Z is —N— or —O—, i.e., amides or esters. Of course, mixtures of these amides and esters can also be used.

These are known monomers and can be produced as is known in the art. Particularly with regard to the N-sulfohydrocarbon-substituted acrylamides, they are disclosed in U.S. Pat. No. 3,679,000 assigned to the Lubrizol Corporation, the disclosure of which patent is incorporated by reference. The 2-acrylamide-2-methyl-propanesulfonicacid is available from Lubrizol under the Registered Trademark AMPS.

Purified AMPS monomer results in surprisingly superior polymer. While not wishing to be bound by theory, it is believed the higher purity results in higher molecular weight which is responsible for the increased viscosity imparted to water by polymer made from purified monomer. Preferably the monomer is purified to contain less than 150 ppm, preferably less than 50 ppm by weight chain tranfer-promoting impurities such as allylic compounds. This is done by recrystallization from hydrous acetic acid or lower alcohols, chromatographic techniques or other standard purification procedures.

Thus useful compositions can be described as polymers produced from a monomer composition comprising at least one of a hydrophilic N-vinyl lactam (more broadly an N-vinyl amide) or a hydrophilic vinyl containing sulfonate salt or the corresponding acid, optionally containing in addition a hydrophilic unsaturated amide and if desired a termonomer as disclosed hereinabove, said polymer being stable. Not precipitating after 7 days at 300° F. (149° C.) is one way of defining stability which has been definitely correlated with long term stability at 250° F. for N-vinyl lactam/unsaturated amide polymers. Particularly with the N-vinyl lactam containing polymers, after a modest initial drop in viscosity on aging, the viscosity on continued aging remains essentially unchanged. Because of this enhancement of stability on extended aging, these N-vinyl lactam containing polymers are particularly suitable for extremely harsh environments as defined for instance by the area above the 20 day line or even the 5 day line or 1 day line at FIG. 14. By N-vinyl lactam containing polymers as used in this context of extremely harsh environment stability is meant polymers having at least 20 weight percent combined N-vinyl lactam and unsaturated amide, at least half of which is N-vinyl lactam.

In certain applications it is believed there is an advantage to polymer compositions having at least 20 weight percent each of the vinyl-containing sulfonate and the N-vinyl lactam (more broadly N-vinyl amide) and 0–40 weight percent of the unsaturated amide. In other instances compositions having at least 10 weight percent of all three monomers (lactam, amide and sulfonate are preferred).

Fourth Comonomer

Alpha-, beta-carboxylic acid such as acrylic acid, particularly in the salt form can also be used as a fourth comonomer with the N-vinyl amide, unsaturated amide and vinyl-containing sulfonate, or simply as a comonomer with the N-vinyl amide and the unsaturated amide or vinyl-containing sulfonate, or as a comonomer with the vinyl-containing sulfonate and the unsaturated amide.

It has been found that the salt of acrylic acid imparts far greater stability to the polymer as measured by shelf life (ability to remain water-soluble on standing at room temperature or temperatures likely to be found in storage) than the acid itself. Any salt can be used including salts of divalent metal cations but generally sodium acrylate is used. Thus the result can be obtained by copolymerizing a salt of acrylic acid with the other monomers or by hydrolyzing an unsaturated amide-containing polymer with alkaline conditions, the former being preferred. In emulsion polymerization, the acid can be used quite satisfactorily.

The use of acrylic acid or an acrylate can be viewed as replacing 5-50, preferably 8-40 weight percent of one of the other monomers (generally the unsaturated amide with the acrylic acid or acrylate to provide cross-linking sites). Of particularly suitable composition is a 30/10/55/5 weight percent VP/Am/NaAMPS/sodium acrylate polymer. This is compared with a 30/15/55 composition the 30/10/55/5 has 33 1/3 percent of the acrylamide replaced with sodium acrylate. Broadly the acrylic acid or acid salt can be used in an amount within the range 1-30, preferably 2-15 weight percent, the remainder including at least one of a hydrophilic N-vinyl amide or a hydrophilic vinyl containing sulfonate salt or sulfonic acid. Salts of substituted acrylic acid such as methacrylic acid can also be used as well as salts of higher unsaturated acids including those with up to 8 carbon atoms. In such cases, the same conditions and concentrations set out for the acrylate also apply. In absolute terms, the copolymer will contain about 1-20, preferably 2-15 weight percent of the acrylic acid or acrylate salt monomer.

The acrylate salt can also be used simply as a comonomer to provide the polymers used in this invention. It has been found that with otherwise identical monomer systems, those using the acrylic acid monomer are unsuitable because the polymers produced have a shortened shelf life; whereas, those systems using the acrylate salt monomer produce polymers possessing a much longer shelf life.

Thus, while either the acid or salt form can be used to produce gelled polymer, only the salt form has the long shelf life desired.

Any suitable amount of the polymers, including the polymers of the invention as well as analogous polymers of the prior art, can be used in the embodiments of the invention concerning the recovery and processing of natural resources. Generally, the inventive polymers prepared by the novel methods of this invention can be used in smaller quantities due to their superior properties, and are thus preferred.

Polymer Stability

Viscosity loss in a polymer-bearing system is a means of inferring polymer stability. Polyacrylamide has historically been a standard material for thickening brines. At a concentration of, for instance, 0.25 weight percent in sea water, polyacrylamide imparts a viscosity to the resulting solution which is about ten to twenty times the viscosity of sea water at the same temperature. For instance, sea water at room temperature has a viscosity of approximately 1 compared with 10 to 25 for the same water containing a quarter weight percent polyacrylamide and this viscosity remains essentially unchanged on aging at room temperature. At 250° F. (121° C.), sea water has a viscosity of about 0.3. The same water with 0.25 weight percent acrylamide initially has the viscosity of about 10 but on aging the acrylamide precipitates rendering it totally useless with the resulting sea water not having a viscosity increased any after the precipitation.

Figure 15:
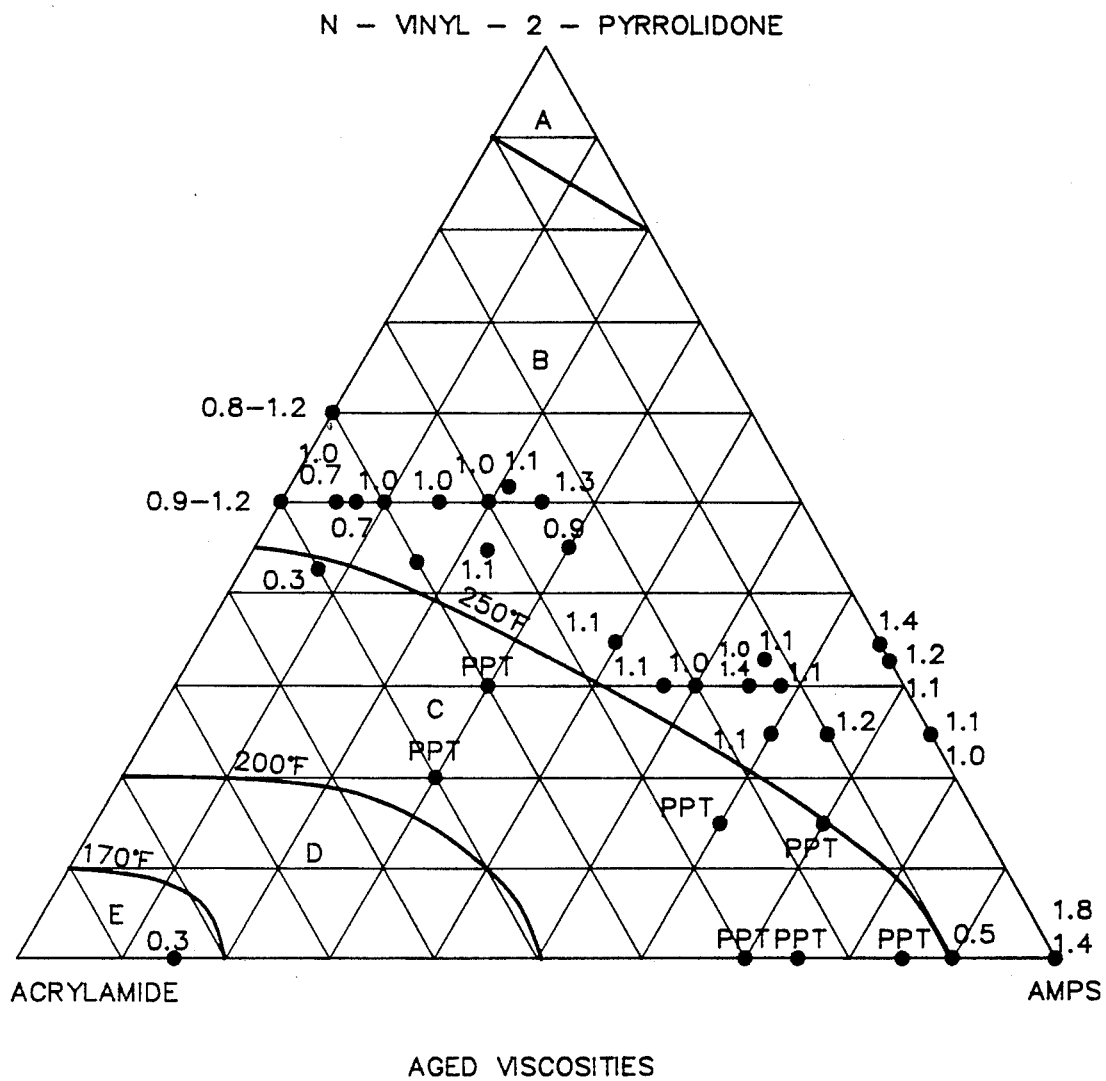
FIG. 15 is a plot of aged viscosity data on polymers having monomer ratios of components as shown on the triangular graph.
Figure 16:
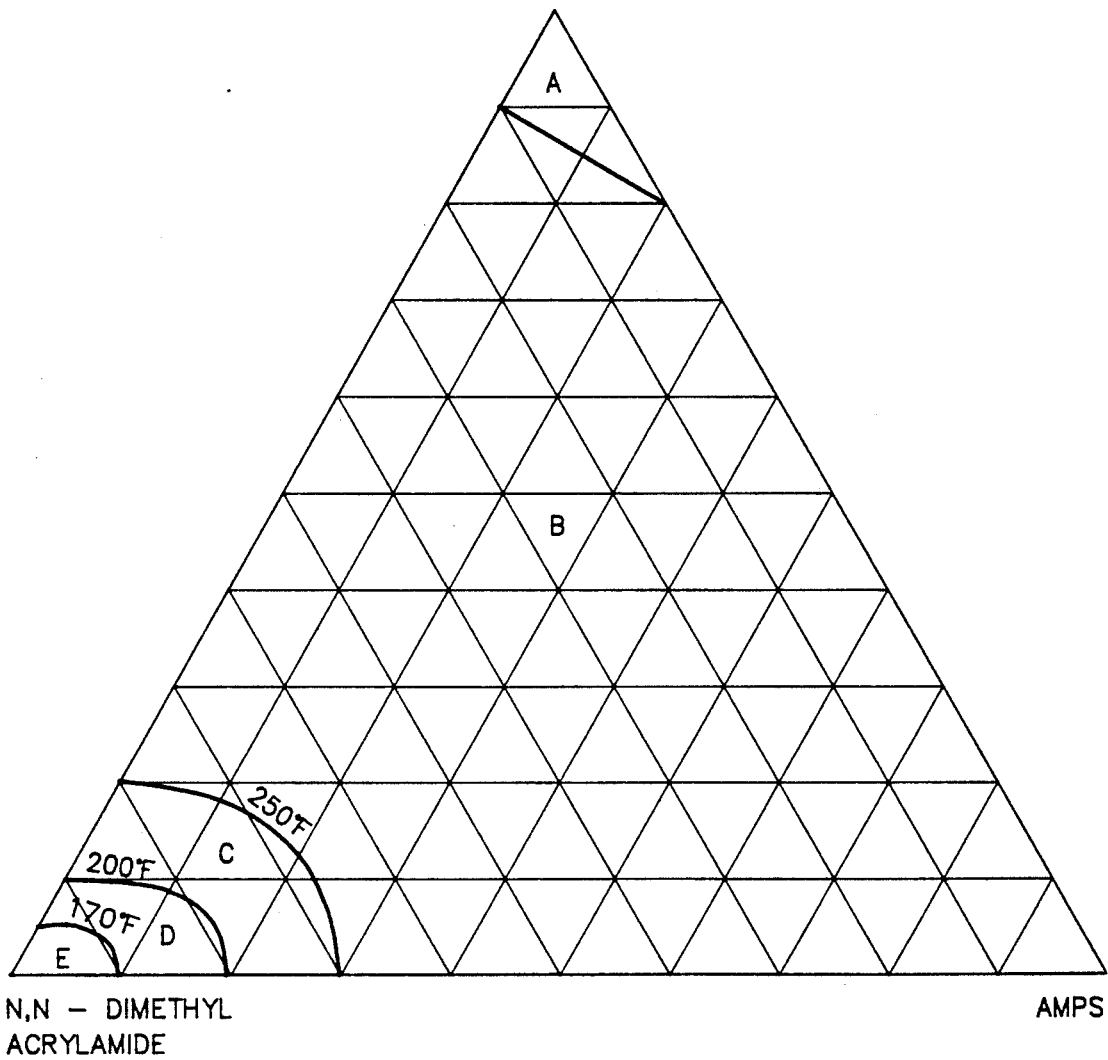
FIG. 16 is a plot similar to FIG. 15 except the unsaturated amide is N,N-dimethylacrylamide.

The following description of FIGS. 15 and 16 show that for the chosen polymers, significant viscosity enhancement is possible even when at hostile conditions.

In FIGS. 15 and 16 the viscosity data is for polymer aged 7 days at 300° F. and the viscosity then determined at 250° F. The 300° F. aging test is carried out as follows. Synthetic sea water (SSW) is prepared from distilled water to which salts are added as described in U.S. Pat. No. 5,080,809. The polymer is dissolved in the SSW to form a 0.25 weight percent solution. It is then subjected to vacuum and if necessary nitrogen purge to remove oxygen. It is then sealed under 100 psig nitrogen pressure in a glass lined container and aged 7 days at 300° F.

As can be seen from FIG. 15, polymer compositions depicted therein have aged viscosities of 0.7 (i.e. better than 2 times sea water) or greater, generally 1.0 (about 3 times sea water) or greater. Thus in accordance with this invention for the first time the psychological barrier has been crossed to utilizing polymers which do not impart the 10 to 20 fold increase in viscosity associated with standard materials such as acrylamide. The inventors have surprisingly discovered that the water soluble polymers described herein because of their resistance to precipitation on aging at high temperatures are effective in spite of their apparent poor performance in standard room temperature viscosity tests. In high temperature applications, the only significant factor is the viscosity imparted after aging.

The polymers shown in area B of FIG. 15 represent compositions which are preferred because of stability even at 250° F. Those of area E are useless because of precipitation at hostile environment temperatures of 170° F. Areas D and C represent polymers stable up to at least 170° F. and 200° F. respectively. The area encompassed by area B can be increased somewhat by utilizing N,N-disubstituted acrylamide as shown in FIG. 16. The area encompassed in region A is less preferred because the viscosity imparted to the sea water is so low that higher concentrations are required to give effective solutions. Such compositions are not useless, however, and can be used if desired with best results obtained using the highest molecular weight polymers obtainable.

As stated hereinabove, the unaged viscosity at an arbitrary test temperature of 250° F. (121° C.) for a solution containing 0.25 weight percent polyacrylamide unaged is about 10. For polymers as shown in FIG. 15 having aged viscosities of 1, the unaged viscosity is about 1.5. Other polymers depicted as being encompassed by the useful polymers in accordance with this invention can have unaged viscosities at 250° F. (121° C.) of about 2 or slightly more (some specific compositions are higher than this). Thus the invention in one aspect can be viewed as utilizing a polymer in a hostile environment which polymer in an unaged test at 250° F. in a concentration of 0.25 weight percent imparts to sea water a viscosity of less than one third (i.e. a viscosity of no more than 2 or no more than 3) the viscosity imparted by the same amount of a standard unaged acrylamide polymer such as N-Hance 1027 by Hercules.

In another aspect, the invention resides in the surprising relationship wherein the N-vinylamide such as VP imparts a disproportionate stability to the polymers containing pendant amide groups such as Am derived polymers as well as copolymers of unsaturated amides such as acrylamide and vinyl-containing sulfonate monomers such as AMPS, i.e., VP/Am/NaAMPS. Yet VP does not stabilize the esters discussed hereinafter (such as SPM). In fact, the VP/SPM is not as effective as the SPM homopolymer. SPM represents, e.g., potassium or sodium 3-methacryloyloxy propanesulfonate or (3-sulfopropyl)methacrylic ester, sodium or potassium salt.

Polymer Characterization

The polymers of this invention can be characterized as to relative molecular weight and viscosity by K values calculated from measured relative viscosities $n_{rel}$ at various concentrations. In this calculation, $K=1000\ k$, where k is Fikentscher's constant, obtained from the equation $$\frac{\log n_{rel}}{C} = \frac{75k^2}{1 + 1.5\ kC} + k,$$

where $n_{rel}$ is the viscosity of the solution compared with its solvent and C is concentration in grams per 100 milliliters (or 1 deciliter) of solution. The development and significance of K values are discussed more fully in Example VIII.

In contrast to the copolymers of 50-99 mole percent N-vinyl-2-pyrrolidone and 1-50 mole percent acrylamide, with K values of 10 to 140, disclosed and claimed by U.S. Pat. No. 3,500,925, the copolymers of this invention have K values of more than 140 when measured at concentrations of I gram/deciliter or less. The highest K values generally correlate with the preferred methods of preparation and testing of the copolymers of this invention, as described in Example VIII. Copolymer solutions prepared and tested by the methods presently considered optimum can have K values in the range from of about 150 to at least about 250.

Polymers useful in this invention can be further characterized by measuring the cloud point temperature, as defined and more fully discussed herein and in Examples V, VI and XVII. The polymers are preferably tested for cloud point temperature after heat aging for a period of time which produces an equilibrium cloud point temperature representative of the polymer's performance in, e.g., enhanced oil recovery in reservoirs of equivalent temperatures. The equilibrium cloud points appear to correspond to an equilibrium degree of hydrolysis, as defined elsewhere herein, generally limited to about 70-80 percent, which may partially account for the superior properties of the preferred copolymers.

Monomer Proportions

The first and second monomer proportions for copolymers of this invention can vary widely, as previously disclosed. Generally, VP:Am weight ratios of about 10:90 to about 90:10, as applied to the mixture of monomers polymerized, are used, but copolymers having VP:Am weight ratios as low as 5:95 and as high as 99:1 can be prepared and employed for specialized applications. As used in this paragraph, the term VP is meant to be generic to N-vinyl lactams and N-vinyl amides as broadly disclosed and Am is generic to unsaturated amides as broadly disclosed herein (i.e., to set out the weight ratios broadly for first monomer:second monomer) and the ratios are intended to cover "mixed" copolymers, i.e. N-vinyl pyrrolidone/acrylamide/N,N-dimethylacrylamide. Generally, the minimum amount of the VP monomer required to produce copolymers of the desired characteristics will be used. The polymers of vinyl-containing sulfonate salts, phosphonate salts (or the corresponding acids) or esters as the third comonomer or vinyl lactams (more broadly N-vinyl amides) as the first component and unsaturated amides, if present, as the second component can have monomer ratios as Shown in FIGS. 15 and 16 excluding area E, although of course, proportions shown are most preferred for the specific monomers set out.

Thus, the first component (the N-vinyl amide) can be present in an amount within the range of 0-100, preferably 10-90, more preferably 30-70 weight percent based on the weight of all monomers incorporated into the polymer. The second component (the unsaturated amide) in an amount within the range of 0-80 (up to 85 in VP/AM) preferably 10-55 weight percent and the third component (the sulfonate, phosphonate or ester) in an amount within the range of 0-100, preferably 10-95, more preferably 40-90 weight percent. In all instances, there can be a termonomer present in the amount set out elsewhere herein based on the total weight of the other components, the ratios just set out hereinabove thus being the relative proportions of the first, second, and/or third components to each other.

In general, when conditions are less severe, e.g., the fluids are to be exposed to high temperatures, salinity and/or hardness ion concentrations for shorter periods of time, a lower proportion of VP can be used in the copolymer, thus reducing costs and increasing the viscosity attainable per unit of copolymer.

Conversely, for very hostile environments and extended exposures, a higher proportion of VP will generally be required for effectiveness, regardless of the relative cost.

For applications requiring mainly a flocculant, as, e.g., water treatment and/or thickening, clarification of beverages, or minerals beneficiation, lower proportions of VP can be used, e.g. in the range of from about 20 to 50 weight percent, with the remainder Am. In example XXIII, a copolymer having 30% VP and 70% Am was successfully used to flocculate and remove clay from a turbid river water sample.

The terpolymers of this invention can also be tailored for certain applications by adjusting the proportions and types of monomers charged. For simplicity, the term "terpolymer" is used herein to mean a monomer or monomers other than the principal monomers of N-vinyl lactam and unsaturated amide, although it is recognized that technically N-vinyl lactam and unsaturated amide are also termonomers. A minor portion of a termonomer, for example a hydrophobic compound, is included to alter characteristics of the polymer such as its tendency to adsorb on or absorb in a rock formation. (Adsorption refers to the attachment of polymer molecules to the rock surface by physical or chemical means, While absorption refers to such larger scale phenomena as imbibing of the polymer solution within the pore structure of the formation rock.) Other polymer characteristics which can be altered by incorporating such a termonomer in the polymer include solubility in water, brine and oils, as well as crosslinking ability. The terpolymers of this invention have been found to be as stable as the copolymers under conditions of high temperature and/or salinity and/or hardness, as shown in Examples XV through XXI, and thus provide stable polymers with various useful properties.

The termonomer can be added in a quantity in the range of from about 0.1 to not more than about 25 weight per cent, generally not more than 10 weight percent of the total monomers charged. The major portion of the terpolymer consists essentially of the first monomer and second monomer as disclosed for the copolymers, with their relative proportions or weight ratios variable over the same range as in the copolymers to adapt the polymers for various applications.

Generally, the terpolymers can contain in the range of from about 10 to about 90 weight percent of an N-vinyl lactam or more broadly N-vinyl amide such as N-vinyl-2-pyrrolidone as a first monomer, with a second monomer of an unsaturated amide such as acrylamide in the range of from about 90 to about 10 weight percent and the termonomer as disclosed above present as an amount in the range of from about 0.1 to about 10 weight percent, preferably from about 1.0 to about 10 weight percent. Preferably, the terpolymers contain about 25 to about 75 weight percent N-vinyl lactam, about 75 to about 25 weight percent unsaturated amide, and about 2 to 8 weight percent termonomer. A termonomer content of about 3 to about 5 weight percent is presently most preferred. For enhanced oil recovery applications at reservoir temperatures of above about 250° F., it is presently preferred that the proportions of said first monomer and said second monomer be approximately or nearly equal, i.e., that the weight ratio of the first and second monomers be in the 20 range of about 45:55 to about 65:35.

In addition to varying the monomer proportions, the molecular weight of all the inventive polymers can be varied according to the amount of initiator used or by initiation by gamma irradiation, for example. Thus, a relatively high molecular weight may be suitable for Enhanced Oil Recovery (EOR), or for flocculating suspended solids, while for drilling fluids, a lower molecular weight can be used to limit the degree of flocculation of suspended clay.

The invention is further illustrated by the following examples, which should not be regarded as more limiting than the appended claims. Unless otherwise noted, all percentages and/or parts are by weight.

EXAMPLE I

Copolymer Preparation and Testing

The polymer preparations were carried out in 10 ounce crown top glass beverage bottles. Each bottle was charged under an inert atmosphere with 20.0 g total of the monomer(s), 200.0 g of the reaction medium (t-butyl alcohol, distilled water, water containing salts or synthetic sea water (SSW) as specified) and 0.02 g of initiator, or the specified amount in terms of weight percent, based on the total monomer weight and desired solution viscosity. Each bottle was purged for about 10 to 20 minutes with an argon stream to remove oxygen and capped. The SSW was prepared as described in U.S. Pat. No. 5,080,809.

The bottles were placed in a bath maintained at 50° C. and rotated for at least 4 hours to achieve substantially complete polymerization of the monomers. The bottles were removed and the resulting solutions in aqueous media were diluted with the specified test medium to obtain the desired viscosities for the tests. Polymers prepared in t-butyl alcohol were separated from the alcohol medium by elutriation, then diluted with the test media for viscosity tests.

Aging of the samples was conducted in torch-sealed glass ampules containing about 30 to 35 mL of polymer solution, e.g., 2 weight percent or as specified in the Tables, in an oven maintained at the specified temperature. At various time intervals, ampules were removed, observed for any evidence of precipitation and cooled to room temperature. Each seal was broken and the viscosity of the solution as a function of shear rate was measured at 77° F. (ambient room temperature) with a Brookfield LVT model viscometer equipped with an UL adapter for viscosity measurements at different shear rates. Each viscosity listed is an average of three measurements at each shear rate.

Screen factors, when reported, were determined by measuring the time required for passage of an aliquot of aqueous polymer solution by gravity flow through five 100-mesh stainless steel screens, and dividing this time by the time required for passage of the same amount of solvent through these screens under identical conditions. Screen factors are related to viscosity of the polymer solution, thus the higher the factor the higher the viscosity. The test method is detailed by Foshee, W. C.; Janning, R. R. and West, J. J. in Paper SPE 6202 entitled "Preparation and Testing of Partially Hydrolyzed Polyacrylamide Solutions" presented at the 51st Annual Fall Meeting of the Society of Petroleum Engineers in New Orleans, Oct. 3-6, 1976.

In Table IV, footnote f, the cloud point was visually estimated with an aged sample tested at an elevated temperature by placing the ampule containing the polymer in another bath maintained at a lower temperature, so that the polymer solution was cooled sufficiently to allow redissolving of the precipitated polymer. The bath temperature was then slowly raised and the temperature at which cloudiness visually reappears was recorded as the cloud point. For example, the cloud point of a polymer solution aged at 250° F. that had become cloudy was determined to be 215° F. (see footnote f, Table IV) by cooling the hot mixture to about 180° F., thus allowing the precipitated polymer to redissolve. The temperature was slowly raised until 215° F. was reached, at which point the cloudiness visually reappeared. This temperature was recorded as the cloud point.

As discussed earlier, it has been found that cloud point can be correlated with the maximum temperatures at which such polymers can be expected to retain their viscosity when aged. Thus, newly-formulated polymers can be quickly evaluated as to their suitability for laboratory or field tests for retention of viscosity under aging at elevated temperatures.

The viscosities of the aged polymers are listed in Table I.

TABLE I

Aging Results For Homopolymers and Copolymers of N-Vinyl-2-Pyrrolidone and Acrylamide Prepared in SSW with 0.5 Weight Percent AIBN[j] and Different Monomer Ratios and Aged in SSW

| Sample | Weight Percent VP | Am | Conc. in SSW | Days aged | Brookfield[k] Viscosity, centipoise, after aging at 200° F. | 250° F. |
|---|---|---|---|---|---|---|
| 1 (homopolymer) | 100 | 0 | 2.0 | 0 | 16.1 | 16.1 |
| | | | | 21 | 14.2 | 13.8 |
| | | | | 48 | 14.0 | 13.6 |
| | | | | 125 | —[a] | —[b] |
| 2 (copolymer) | 87.5 | 12.5 | 2.0 | 0 | 55.4 | 55.4 |
| | | | | 21 | 60.1 | 61.9 |
| | | | | 48 | 60.5 | 60.9 |
| | | | | 124 | —[a] | —[b] |
| 3 (copolymer) | 75 | 25 | 2.0 | 0 | 46.8 | 46.8 |
| | | | | 17 | 42.9 | 42.8 |
| | | | | 44 | 43.0 | 41.9 |

TABLE I-continued

Aging Results For Homopolymers and Copolymers of N-Vinyl-2-Pyrrolidone and Acrylamide Prepared in SSW with 0.5 Weight Percent AIBN[1] and Different Monomer Ratios and Aged in SSW

| Sample | Weight Percent | | Conc. in SSW | Days aged | Brookfield[k] Viscosity, centipoise, after aging at | |
|---|---|---|---|---|---|---|
| | VP | Am | | | 200° F. | 250° F. |
| | | | | 120 | —[a] | —[b] |
| 4 (copolymer) | 62.5 | 37.5 | 2.0 | 0 | 108.4 | 108.4 |
| | | | | 27 | 124.9 | 105.0 |
| | | | | 48 | 129.0 | 117.0 |
| | | | | 105 | 127.0 | 112.0 |
| | | | | 120 | —[a] | —[a] |
| 5 (copolymer) | 50 | 50 | 2.0 | 0 | 331 | 331 |
| | | | | 26 | 457 | 478 |
| | | | | 47 | 476 | 386 |
| | | | | 119 | —[a] | —[a] |
| 6 (copolymer) | 37.5 | 62.5 | 2.0 | 0 | 860 | 860 |
| | | | | 24 | 1934 | 1376 |
| | | | | 45 | 1686 | 1038[c] |
| | | | | 101 | 1624 | 910[d] |
| | | | | 117 | —[a] | —[e] |
| 7 | 25 | 75 | 2.0 | 0 | 1330 | 1330 |
| | | | | 20 | >2000 | 1220[f] |
| | | | | 43 | >2000 | 813[f] |
| | | | | 99 | 1988 | 142[f] |
| | | | | 113 | —[a] | —[g] |
| 8 (copolymer) | 12.5 | 88.5 | 2.0 | 0 | >2000 | >2000 |
| | | | | 20 | >2000 | >1857[f] |
| | | | | 42 | >2000 | 660[f] |
| | | | | 100 | >200 | 650[f] |
| | | | | 112 | —[a] | —[g] |
| 9 (control) | 0 | 100 | 0.4 | 0 | 19.1 | 19.1 |
| | | | | 4 | 3.0[h] | 2.1[h] |
| | | | | 18 | — | 1.4[h] |
| | | | | 56 | 24.4[h] | 1.3[h] |
| | | | | 87 | 1.3[h] | 1.6[h] |

[a]Clear, aging continuing.
[b]Hazy, very small amount of precipitate, test continuing.
[c]Cloudy at 250° F., clear at 78° F.
[d]Very hazy, white precipitate. At 78° F., clear with a little floating material.
[e]Very hazy with white precipitate on ampule sides, test continuing.
[f]Very cloudy with much white precipitate on ampule side. At 78° F., clear with clear gel.
[g]Very cloudy with much white precipitate on ampule side, test continuing.
[h]Clear with powdery white precipitate at aging temperatures and at 78° F.
[i]Azobisisobutyronitrile, based on weight of monomers.
[k]Determined at shear Tfte of 7.3 sec$^{-1}$ or lower at 25° C. (e.g. 7.3, 3.7 and 1.8 sec$^{-1}$ in terms of centipoise (cP).

The aging results presented in Table I show that the VP and VP/AM polymers are more thermally stable under the test conditions at 200 F. than the polyacrylamide control. The solution viscosities of the copolymers generally increase with increasing Am content. The lower solution viscosities of sample 3, 75/25 VP/AM, compared with those of sample 2, 87.5/12.5 VP/AM, are believed to be anamolous, since later work shows viscosity results intermediate to those of samples 2 and 4 of Table I. The various copolymers, however, show consistently good thermal stability in this test.

The higher the level of Am in the copolymer, the greater the probability of precipitation at a test temperature of 250° F. For example, when the Am level is higher than about 75 weight percent, precipitation occurs at some time less than about 20 days. When the Am level is lower than about 65 weight percent, the results show much less to no precipitation occurring, even after up to about 125 days at 250° F. Based on both the viscosity and the stability results, the data in Table I indicate that suitable copolymers for EOR have VP/AM levels ranging from about 60/40 to about 40/60 at the temperatures tested. Such copolymers provide reasonably viscous solutions at relatively low polymer concentrations which are very resistant to thermal degradation. The higher proportions of VP are generally preferred for use in reservoirs having more "hostile" conditions, e.g., higher temperature, salinity and hardness of the formation water.

TABLE II

Viscosity of 2 Weight Percent Solutions of 50:50 VP-AM Copolymers Prepared with Different Initiators in Distilled Water and Diluted in SSW

| Run No. | Initiator | | Brookfied Viscosity,[b] cP |
|---|---|---|---|
| | Description | Weight Percent[a] | |
| 1 | AIBN[c] | 1.0 | 157 |
| 2 | AIBN[c] | 0.5 | 226 |
| 3 | AIBN[c] | 0.25 | 233 |
| 4 | AIBN[c] | 0.13 | 280 |
| 5 | t-BPP[d] | 1.0 | 11.2 |
| 6 | t-BPP[d] | 0.5 | 52.3 |
| 7 | t-BPP[d] | 0.25 | 42.8 |
| 8 | t-BPP[d] | 0.13 | 69.7 |

[a]Based on weight of monomers
[b]Same as described in footnote k of Table I.
[c]azobisisobutyronitrile
[d]t-butylperoxypivalate

TABLE III

Viscosity of 2 Weight Percent Solutions of 50:50 VP-AM Copolymers Prepared with Different Initiators in SSW and Diluted in SSW

| Run No. | Initiator | | Brookfied Viscosity,[b] cP |
|---|---|---|---|
| | Description | Weight Percent[a] | |
| 1 | AIBN[c] | 1.0 | 530 |
| 2 | AIBN[c] | 0.5 | 657 |
| 3 | AIBN[c] | 0.25 | >2000 |
| 4 | AIBN[c] | 0.13 | >2000 |
| 5 | t-BPP[d] | 1.0 | 17.4 |
| 6 | t-BPP[d] | 0.5 | 15.4 |
| 7 | t-BPP[d] | 0.25 | 19.8 |
| 8 | t-BPP[d] | 0.13 | 24.4 |

[a]Based on weight of monomers
[b]Same as described in footnote k of Table I.
[c]azobisisobutyronitrile
[d]t-butylperoxypivalate The results in Tables II and III show rather dramatically that the viscosities of the polymers prepared in SSW and AIBN are substantially higher in comparison to the viscosities of corresponding polymers, prepared in water using AIBN initiator. It is also clear from the data that AIBN is preferred over the T-BPP as the initiator, based on the much higher polymer solution viscosities obtained. The data in Tables II and III also show that the viscosities of polymers prepared with an AIBN initiator or inversely proportional to the amount of initiator employed, as would be expected by those skilled in the art. This trend is not consistent in the polymers prepared with t-BPP, suggesting that some interaction may take place between the polymer produced and the t-BPP in the solution.

TABLE IV

Aging Results for Several 50:50 PV-AM Copolymers Prepared in SSW or t-Butyl Alcohol and aged in SSW at 200° F.

| Sample No. | Reaction Medium | Description | Weight Percent[g] | Copolymer Concentration Wt. % | Days Aged | Brookfield Viscosity[a] cP |
|---|---|---|---|---|---|---|
| 1[b] | SSW | AIBN | 1.0 | 2.0 | 0 | 530 |
| | | | | | 28 | 670 |
| | | | | | 54 | 664 |
| | | | | | 111 | 719 |
| | | | | | 320 | —[e] |
| 2c | SSW | AIBN | 0.13 | 0.5 | 0 | 19.5 |
| | | | | | 28 | 28.0 |

TABLE IV-continued

Aging Results for Several 50:50 PV-AM Copolymers
Prepared in SSW or t-Butyl Alcohol and aged in SSW at 200° F.

| Sample No. | Reaction Medium | Description | Weight Percent[g] | Copolymer Concentration Wt. % | Days Aged | Brookfield Viscosity[a] cP |
|---|---|---|---|---|---|---|
| | | | | | 61 | 28.6 |
| | | | | | 98 | —[e] |
| 3d | SSW | t-BPP | 0.25 | 2.0 | 0 | 19.8 |
| | | | | | 35 | 25.5 |
| | | | | | 94 | 26.8 |
| | | | | | 190 | —[e] |
| 4 | t-butyl alco- | t-BPP | 1.0 | 2.0 | 0 | 18.6 |
| | | | | | 32 | 27.0 |
| | | | | | 63 | 27.0 |
| | | | | | 173 | 27.8[f] |

[a]Same as described in footnote k of Table I.
[b]Same polymer as in run 1, Table III.
[c]Same polymer as in run 4, Table III.
[d]Same polymer as in run 7, Table III.
[e]Clear solution in a parallel test at 250° F., test continuing.
[f]Tested at 250° F.. The polymer solution became cloudy after 13 days at 250° F. The cloudiness disappeared on cooling to room temperature and apparently did not affect solution viscosity. The cloud point was determined to be 215° F..
[g]Based on weight of monomers The data given in Table IV show typical results obtained with 50:50 PV-Am copolymers prepared in SSW or t-butyl alcohol and aged at 200° F. or 250° F. Sample I has been aged for over 1467 days at 250° F. with clear solutions obtained, indicating the exceptional stability of the polymer in a saline hard water environment under the test conditions employed.

Since t-BPP is believed to interact with the polymer produced, it would not be appropriate to draw any conclusions from the results of samples 3 and 4.

EXAMPLE II

Effects of Heat Aging on Viscosities

Several 50/50 VP/AM copolymers were prepared at 50° C. using 0.25 weight percent AIBN as the initiator in an aqueous polymerization medium as follows: Polymer A was prepared in distilled water, Polymer B was prepared in 0.7 ionic strength (I.S.) NaCl solution, and Polymer C was prepared in 0.7 I.S. SSW. A portion of each polymer was diluted to the 0.25 weight percent polymer level in the same medium employed in its preparation.

Each diluted polymer solution was divided into 2 portions to give 6 test samples in all. In series 1, the three dissimilar unaged polymer solutions were individually tested to determine how solution viscosity changed over the temperature range of about 80° to 300° F. In series 2, the three dissimilar polymer solutions were aged for 7 days at 300° F. in an essentially oxygen-free atmosphere.

Aliquots of each polymer solution were passed through a capillary viscometer, a 40 foot length of 0.069 inch inner diameter stainless steel tubing. The solution viscosities, in terms of centipoise (cP), were calculated from the viscometer results by applying the Poiseuille equation as known in the art.

Figure 2:
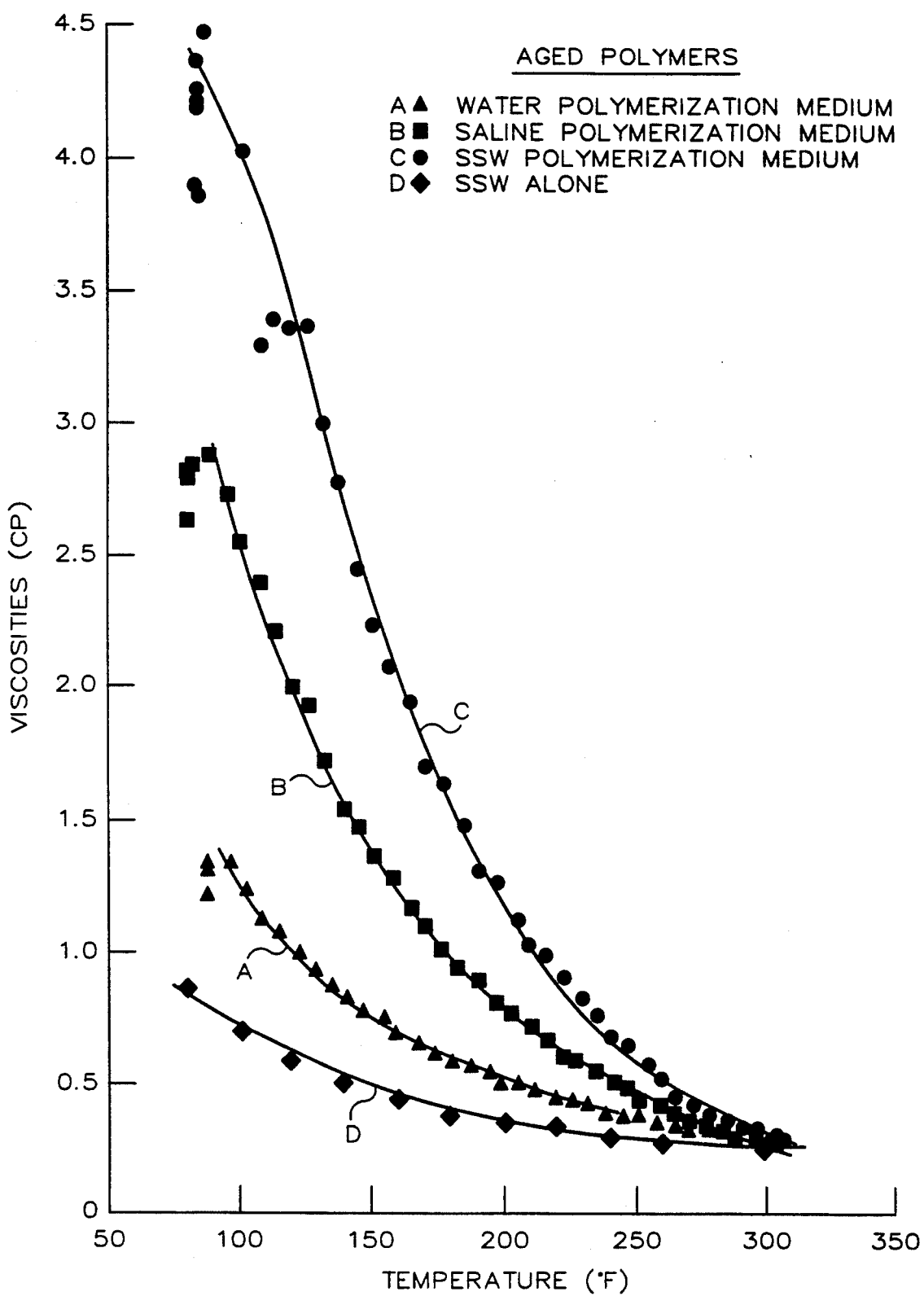
FIG. 2 shows the variation of viscosity with temperature of heat-aged polymers of FIG. 1.

The viscosity results obtained for unaged polymers are tabulated in Table V and shown in FIG. 1; results for the aged polymers are tabulated in Table VI and shown in FIG. 2. The results obtained with the unaged polymers, shown in FIG. 1 as curves A, B, and C show that they have significantly greater solution viscosities than does SSW containing no polymers, shown in FIG. 1 as curve D, over the 80° to 300° F. temperature span tested. (Curve D was drawn from the properties of SSW listed in Table VII.) The polymers prepared in either saline, ionic strength (I.S.) of 0.7, (curve B) or SSW, I.S. of 0.7, (curve C) have significantly greater viscosities than does the polymer prepared in distilled water (curve A) over the entire temperature range tested.

The results obtained with the polymer aged for 7 days at 300° F. are shown in FIG. 2. They indicate again that all of the polymers (curves A, B, C) have greater solution viscosities than does SSW (curve D) over the temperature range tested.

The results also show that polymers prepared (curve C) in SSW are substantially more resistant to the effects of heat than polymers prepared in saline (curve B) or in distilled water (curve A), based on their significantly greater solution viscosities over all temperatures in this test. However, even the polymers prepared in saline or distilled water are potentially useful in certain process embodiments of this invention.

As shown in FIG. 2, the viscosities of all the polymers prepared approach that of SSW above 300° F. However, it should be noted that even at these temperatures, the polymers are present as homogeneous solutions. In contrast, other polymers such as polyacrylamide precipitate as solids at about 200° F. or below. Furthermore, the viscosity of the inventive VP-AM copolymers relative to that of SSW at 200° F. can be increased by using higher concentrations of the copolymers, and/or copolymers of higher molecular weight.

TABLE V

| Unaged Polymers | | | | | |
|---|---|---|---|---|---|
| Polymerized in Distilled Water | | Polymerized in NaCl | | Polymerized in SNSW | |
| Temp (°F.) | Visc (cP) | Temp (°F.) | Visc (cP) | Temp (°F.) | Visc (cP) |
| 85 | 2.35 | 81 | 4.32 | 83 | 4.39 |
| 98 | 2.17 | 90 | 4.17 | 89 | 4.25 |
| 110 | 1.91 | 103 | 3.81 | 100 | 3.71 |
| 117 | 1.74 | 110 | 3.57 | 113 | 3.49 |
| 124 | 1.61 | 123 | 3.05 | 119 | 3.22 |
| 136 | 1.33 | 129 | 2.82 | 133 | 2.76 |
| 147 | 1.23 | 142 | 2.44 | 139 | 2.52 |
| 159 | 1.14 | 148 | 2.19 | 152 | 2.22 |
| 166 | 1.07 | 161 | 1.93 | 158 | 2.03 |
| 179 | 0.97 | 167 | 1.88 | 171 | 1.74 |
| 185 | 0.91 | 180 | 1.67 | 177 | 1.70 |
| 198 | 0.83 | 193 | 1.47 | 189 | 1.52 |
| 204 | 0.80 | 199 | 1.40 | 202 | 1.41 |
| 217 | 0.73 | 212 | 1.26 | 209 | 1.46 |
| 224 | 0.70 | 219 | 1.21 | 222 | 1.19 |
| 237 | 0.65 | 232 | 1.13 | 229 | 1.15 |
| 244 | 0.61 | 245 | 1.01 | 242 | 1.02 |
| 256 | 0.58 | 251 | 0.97 | 253 | 0.95 |
| 269 | 0.55 | 264 | 0.89 | 260 | 0.92 |
| 275 | 0.53 | 277 | 0.84 | 273 | 0.82 |
| 288 | 0.51 | 289 | 0.79 | 292 | 0.76 |
| 300 | 0.49 | 302 | 0.75 | 305 | 0.72 |

TABLE VI

| Aged Polymers | | | | | |
|---|---|---|---|---|---|
| Polymerized in Distilled Water | | Polymerized in NaCl | | Polymerized in SNSW | |
| Temp (°F.) | Visc (cP) | Temp (°F.) | Visc (cP) | Temp (°F.) | Visc (cP) |
| 88 | 1.34 | 80 | 2.81 | 84 | 4.36 |
| 96 | 1.33 | 95 | 2.72 | 96 | 4.62 |
| 109 | 1.12 | 107 | 2.38 | 108 | 3.28 |
| 123 | 0.99 | 119 | 1.99 | 119 | 3.35 |
| 135 | 0.87 | 132 | 1.71 | 131 | 2.99 |
| 147 | 0.78 | 145 | 1.46 | 145 | 2.44 |
| 160 | 0.68 | 157 | 1.27 | 157 | 2.07 |

TABLE VI-continued

| Polymerized in Distilled Water | | Aged Polymers Polymerized in NaCl | | Polymerized in SNSW | |
| --- | --- | --- | --- | --- | --- |
| Temp (°F.) | Visc (cP) | Temp (°F.) | Visc (cP) | Temp (°F.) | Visc (cP) |
| 174 | 0.62 | 170 | 1.08 | 170 | 1.70 |
| 182 | 0.56 | 183 | 0.93 | 184 | 1.45 |
| 200 | 0.50 | 196 | 0.80 | 197 | 1.26 |
| 212 | 0.47 | 209 | 0.70 | 209 | 1.02 |
| 226 | 0.43 | 221 | 0.59 | 221 | 0.89 |
| 239 | 0.38 | 233 | 0.53 | 234 | 0.75 |
| 251 | 0.37 | 246 | 0.47 | 247 | 0.64 |
| 264 | 0.33 | 258 | 0.40 | 259 | 0.51 |
| 277 | 0.31 | 270 | 0.34 | 271 | 0.41 |
| 289 | 0.28 | 282 | 0.30 | 284 | 0.34 |
| 300 | 0.26 | 301 | 0.25 | 303 | 0.29 |

TABLE VII

| SSW Viscosities | |
| --- | --- |
| Temperature °F. | Viscosity (cP) |
| 80 | 0.85 |
| 100 | 0.69 |
| 120 | 0.58 |
| 140 | 0.50 |
| 160 | 0.435 |
| 180 | 0.375 |
| 200 | 0.34 |
| 220 | 0.31 |
| 240 | 0.28 |
| 260 | 0.26 |
| 280 | 0.245 |
| 300 | 0.23 |

EXAMPLE III

Cloud Points and Viscosity

A series of VP/AM copolymers having VP/AM weight ratios of 90/10, 80/20, 70/30, 60/40, 55/45, 50/50 and 45/55 as before was prepared as before in 0.7 I.S. saline with 0.25 weight percent AIBN (based on the total monomer) as the initator. A portion of each polymer solution was diluted to 0.25 weight percent copolymer in 0.7 I.S. SSW in series A and to 0.50 weight percent copolymer in 0.7 I.S. SSW in series B. The series A solutions were subsequently aged for 1 week at 300° F. in the absence of oxygen and the polymer viscosity of each solution detemined at 300° F. using a capillary viscometer as previously described. The series B solutions were divided into two portions. Portion 1 was aged for 7 weeks in SSW at 250 F. in the absence of oxygen. Portion 2 was aged in SSW at 300 F. for 7 weeks in the absence of oxygen. The cloud point of each solution in series B was determined in the manner previously described.

Figure 3:
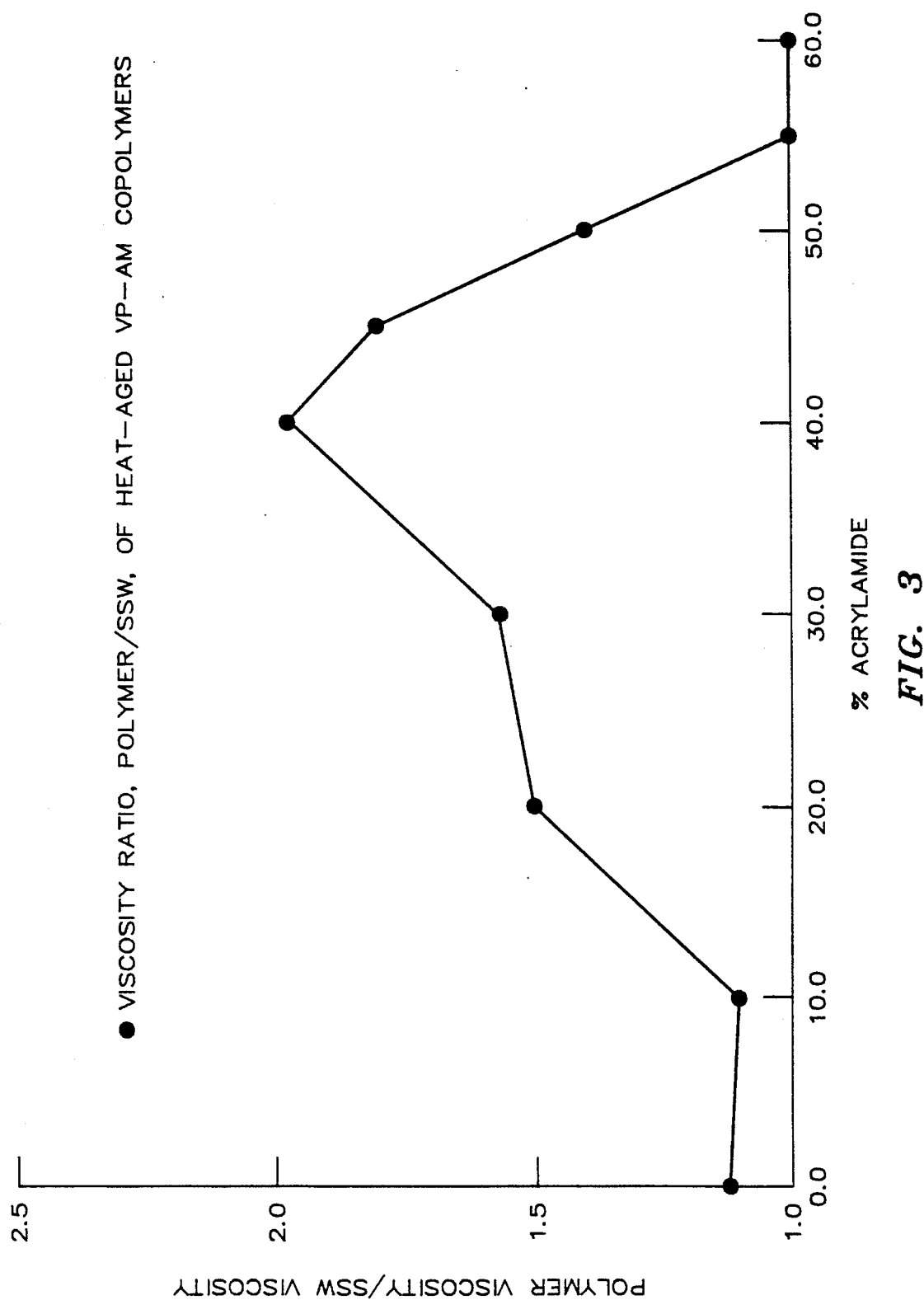
FIG. 3 illustrates the viscosity ratio of aged copolymers of the invention as a function of comonomer proportions.

The series A viscosity results are shown in FIG. 3, plotted as polymer viscosity/SSW viscosity ratio vs. copolymer composition. The series B cloud point results are plotted in FIG. 4. The viscosity results indicate that the most viscous polymer solutions were obtained at VP/AM weight ranges varying from about 80/20 to about 50/50. The optimum range, with these polymers as the basis, appears to be about 65/35 to about 55/45, with 60/40 giving the best results. Although copolymers prepared in synthetic sea water should be more viscous, the optimum range of monomer proportions should be similar to that obtained here.

Figure 4:
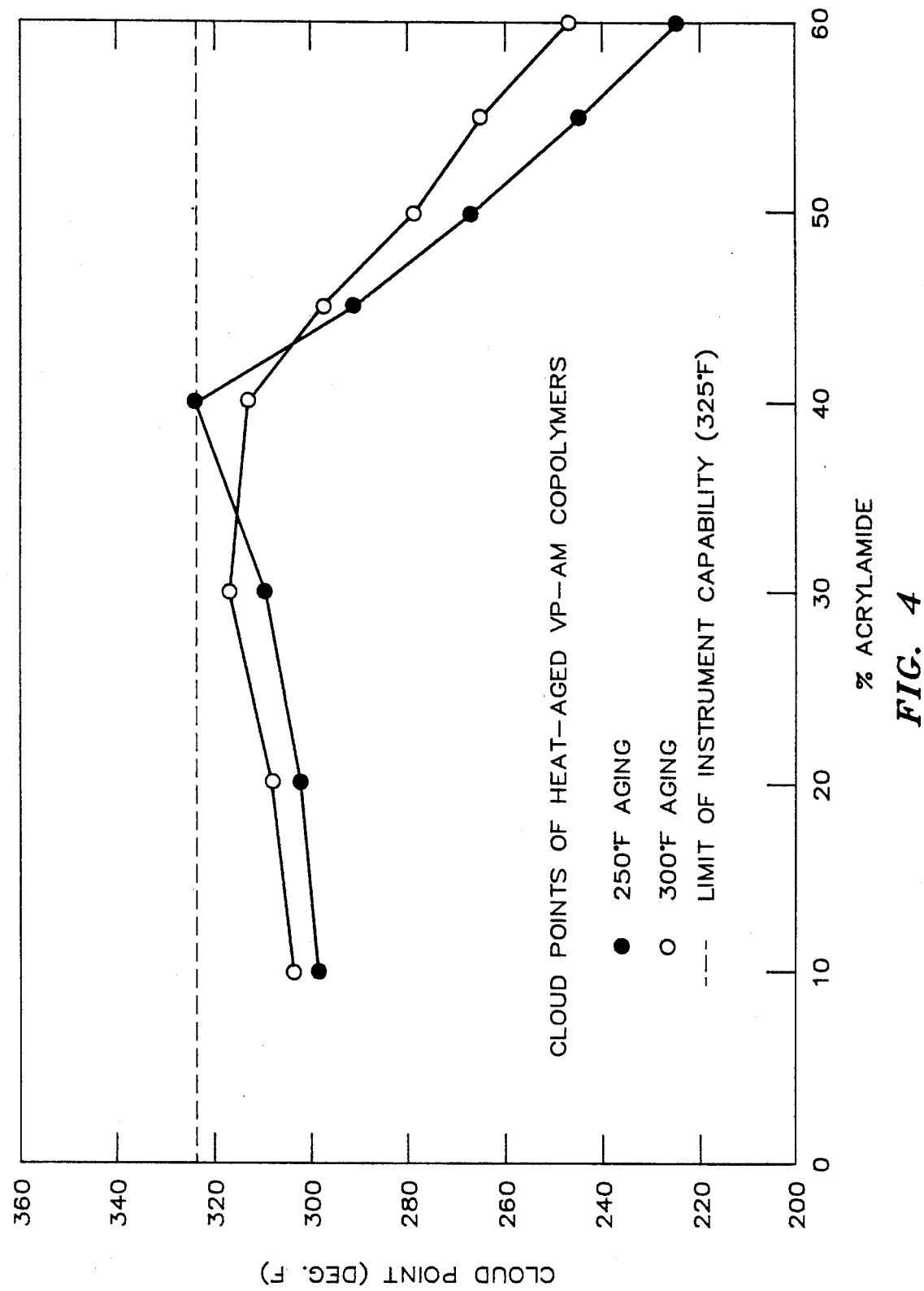
FIG. 4 illustrates cloud point temperatures for copolymers of the invention aged at different temperatures.

The cloud point results plotted in FIG. 4 indicate that the most degradation-resistant copolymers are formed with a VP/AM weight range varying from about 90/10 to about 55/45. That is, the cloud point varied from about 295° F. for 55/45 PVP/AM copolymer to about 300° F. for the 90/10 VP/AM copolymer. However, the peak cloud point temperature, for the 60/40 copolymer, was above 325° F., the limit of the apparatus used for that run, for the sample aged at 250° F. These results, in light of the highest solution viscosity results obtained with heat-aged 60/40 copolymer (FIG. 3), suggest that this copolymer is about optimum in composition for EOR applications in reservoirs with temperatures at least 30 about 250° F. On the other hand, the results obtained at 300° F. suggest that copolymers having about equivalent performance can be expected when the VP/AM weight ratios vary from about 70/30 to about 60/40. As noted above, although copolymers prepared in synthetic sea water should display superior viscosity and stability, the optimum ranges of monomer proportions should correspond to those determined here.

Generally, better results were obtained with the copolymers aged at 300° F. (except for the 60/40 copolymer) than at 250° F. The degree of hydrolysis appears to stabilize at about 80% Am hydrolyzed. At 80% Am hydrolyzed the VP-AM (aged) sample is completely soluble in SSW at the temperatures below the cloud point. This equilibrium value, or consistency of degree of hydrolysis with time, permits a safe prediction that the polymer properties, specifically solubility and viscosity, will not change appreciably with time.

The viscosities and cloud points obtained for copolymers prepared in saline solution indicate that such copolymers would be useful in certain process embodiments of this invention, even if not as viscous or stable as copolymers prepared in synthetic sea water.

EXAMPLE IV

Equilibrium Cloud Points

Figure 5:
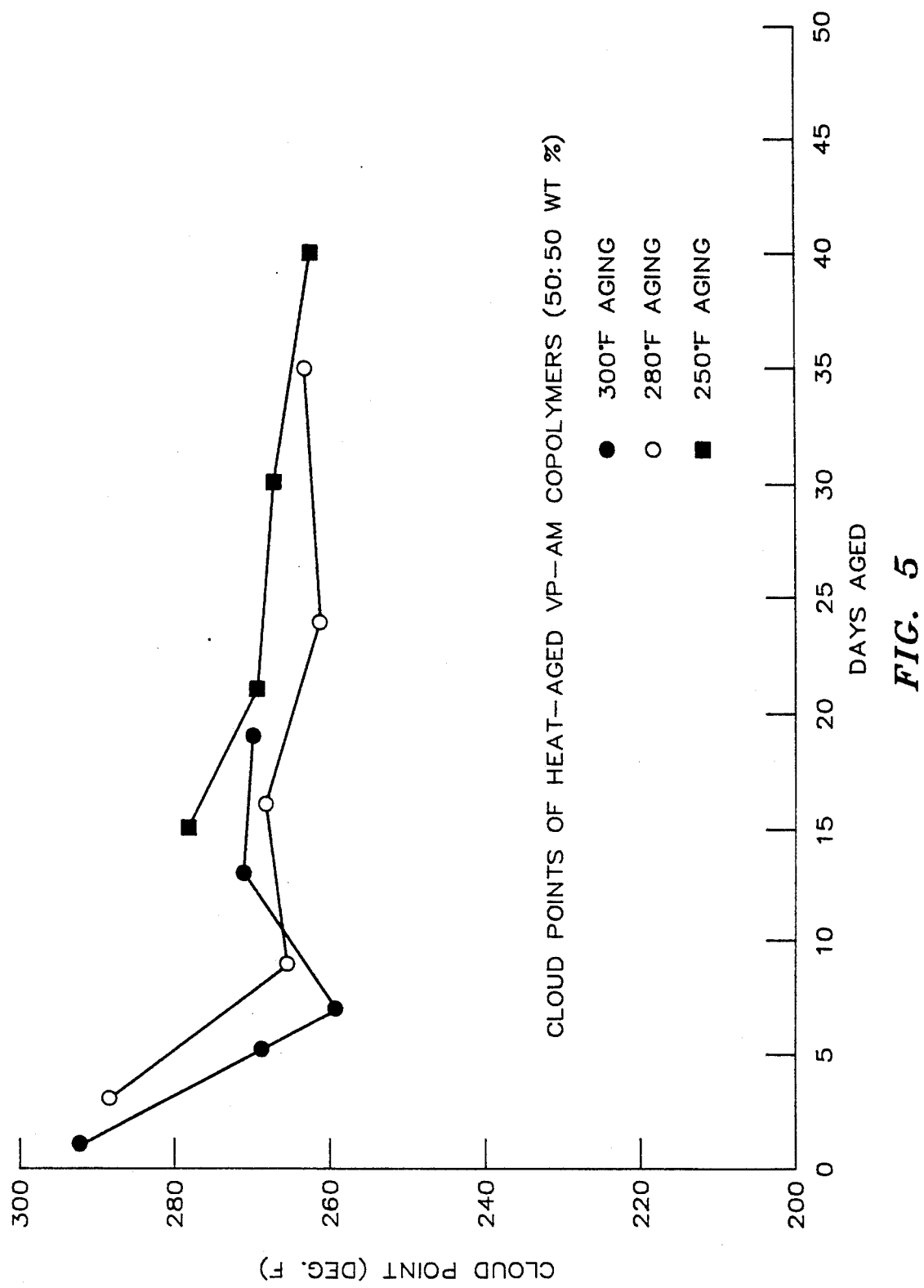
FIG. 5 illustrates equilibrium cloud point temperatures for copolymers of the invention aged at different temperatures.

A 50/50(weight ratio) VP/AM copolymer was prepared as before in 0.7 I.S. SSW using 0.125 weight percent AIBN (based on the total monomer) as the initiator. The polymer solution was diluted with SSW to obtain a solution containing 0.5 weight percent copolymer. Individual portions of the diluted copolymer solution were aged for the specified time at the specified temperatures (250° F., 280° F. and 300° F.) in the absence of oxygen, and the cloud point of each copolymer solution determined as previously described. The results obtained are plotted in FIG. 5.

The curves indicate that the cloud point temperatures decline, e.g., perhaps 25°-30° F., in the first 10 days aging, regardless of the aging temperature. The copolymer solution exposed to the highest temperature, 300° F., showed the steepest decline. After about 10-15 days, however, the cloud point temperatures of samples aged at the higher temperatures remained about the same for the duration of the test, e.g., 25 days. The cloud point temperatures thus appear to stabilize at an equilibrium value of about 260°-270° F., whether tested at 250°, 280° or 300° F., indicating that the copolymer should be resistant to degradation in hot, saline environments at temperatures at least as high as the equilibrium cloud point temperature.

EXAMPLE V

Hydrolysis of the Copolymers

Figure 6:
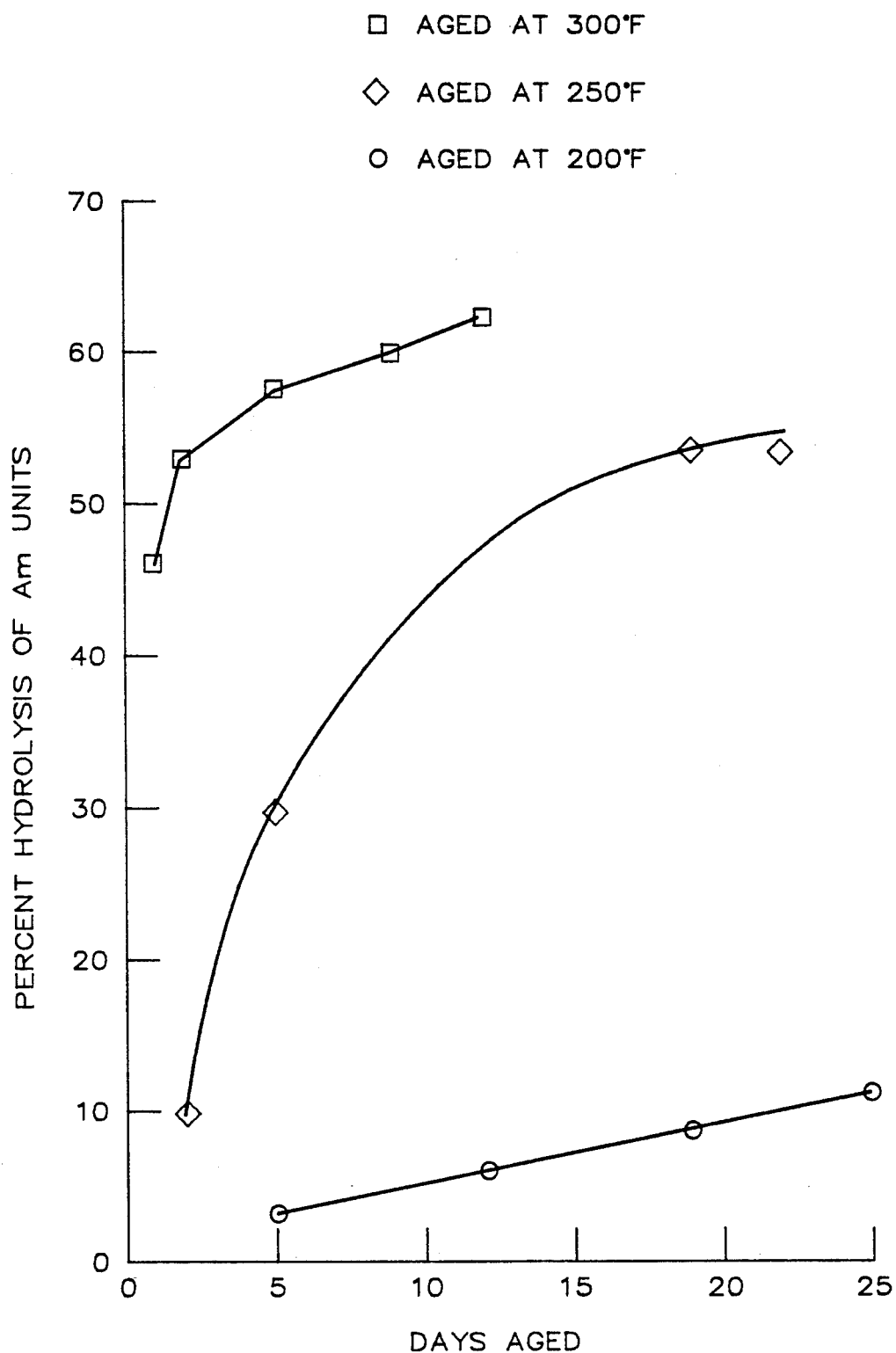
FIGS. 6 and 7 illustrate the degree of hydrolysis of the acrylamide units attained in copolymers of the invention aged at different temperatures.
Figure 7:
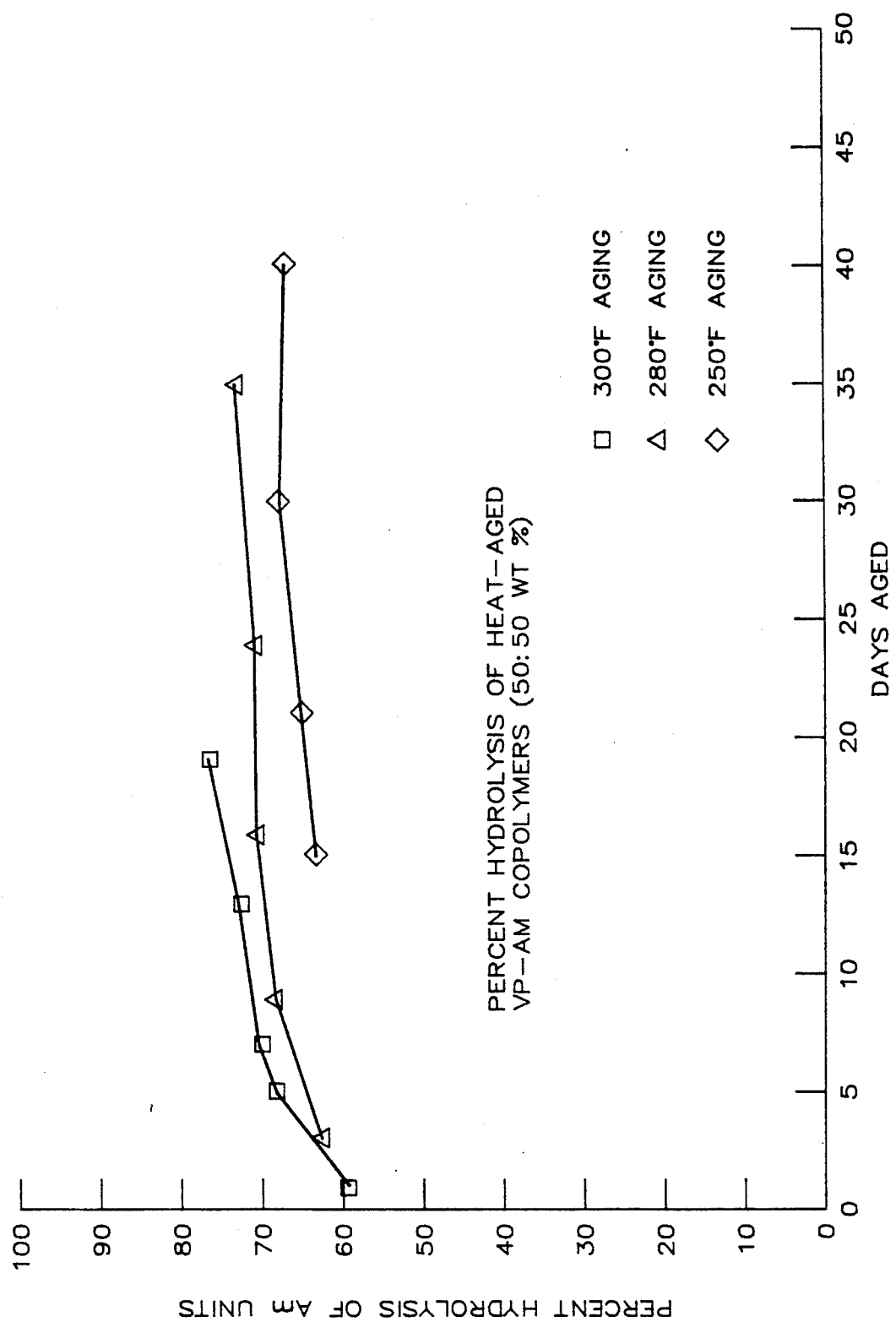

As mentioned earlier herein, the equilibrium cloud points and resultant properties of the aged copolymers are believed related to the degree of hydrolsic of the copolymers. Selected samples of the copolymers were tested for degree of hydrolysis by the Dow color test, described more fully by Foshee, et al, in Paper SPE6202 (New Orleans, 1976), previously cited. To determine the percent hydrolysis, the concentration of amide surviving the hydrolysis is determined by an iodometric method, converting the amide groups to N-bromoamide, followed by a reaction with potassium iodide to form iodine which is then complexed with starch. The amount of this iodine-starch complex is then spectrophotometrically measured. The degree of hydrolysis can also be determined by the titration of ammonium ions produced as a result of the hydrolysis with sodium hydroxide, but the Dow color test has been found to be more convenient and sufficiently accurate. In FIG. 6, the effect of aging in SSW on the degree of hydrolysis of a 0.5 weight percent solution of a 50:50 PVP-AM copolymer prepared in SSW is plotted for three different aging temperatures. It is apparent that the hydrolysis process is relatively slow when the polymer is aged at 200° F. but exceeds the 50 percent point after about 15 days at 250° F. When the copolymer is aged at 300° F., 40 percent hydrolysis is attained almost immediately, and 60 percent is exceeded within ten days. However, as seen in FIG. 7 and as described earlier herein, these copolymers tend to attain an equilibrium degree of hydrolysis eventually, no matter what the aging temperature. As seen in FIG. 7, samples of a 0.5 weight percent 50:50 copolymer of VP-Am prepared in SSW and aged in SSW at the temperatures of 250°, 280° and 300° F. all attain a percent hydrolysis in the range from about 65 to 75 percent after about 15 days aging.

EXAMPLE VI

K Values as Indicators of Relative Viscosity and Molecular Weight

Fikentscher K values were developed to relate the relative viscosity of any polymer solution to concentration, and are functions of the molecular weight of the polymers. This K equals 1000 k, where k is given by "Fikentscher's formula", $$\frac{\log n_{rel}}{C} = \frac{75k^2}{1 + 1.5\,kC} + k,$$

where C is concentration in grams per deciliter solution. The development and uses of these K values are described by K. H. Meyer in "Natural and Synthetic High Polymers", pp. 24–26 (Interscience, New York, 1942) and Schildknecht in "Vinyl and Related Polymers", p. 676 (John Wiley & Sons, New York, 1952), The relative viscosity (viscosity ratio) $n_{rel}$ is the ratio $t/t_o$ which can be determined from the average efflux times measured for the solution, $t/t_o$, and for the solvent, $t_o$.

With sufficiently long efflux times, e.g., about 100 seconds or longer, the specific viscosity, $n_{sp}$, can be determined from the relationship $$n_{sp} = \frac{(t - t_o)}{t_o}$$

(Generally, for the solutions employed, the value $n_{sp}$ is determined by subtracting 1 from $n_{rel}$.)

The ratio, $n_{sp}/C$ is called the reduced viscosity (viscosity number).

The intrinsic viscosity can be detemined by plotting reduced viscosity versus concentration and extrapolating to measure the intercept for zero concentration.

For greater detail, see ASTM D 2857 and/or Polymer Technology—Part 3, pages 27–33, Plastics Engineering, August 1982.

K values have been used for years to describe the viscosity grades of commercially marketed cellulosic polymers as well as polyvinylpyrrolidones and other polymers. The use of K values has become well established and is retained as a means of expressing relative molecular weight; for example, K values for solutions of homopolymers of 30 vinyl alkyl ethers are reported in Kirk-Othmer, *Encyclopedia of Chemical Technology*, Second Edition, Volume 21, pp. 419–420. As previously discussed herein, U.S. Pat. No. 3,500,925 discloses and claims homopolymers and copolymers of N-vinyl lactams, including N-vinyl-2-pyrrolidone, having K values of 10 to 140. Fikentscher, et al disclose in U.S. Pat. No. 3,006,900, issued Oct. 21, 1961, copolymers of methacrylamide and N-vinylpyrrolidone, and "mixed copolymers" including at least one other monomer such as acrylamide, characterized by K values of at least about 35.5.

Examples of inventive and control copolymers of 50:50 VP:AM composition were prepared by methods disclosed herein, tested for relative viscosity ($n_{rel}$), and characterized by K values calculated in accordance with the above formula.

Relative Viscosity Measurement

Relative viscosities ($n_{rel}$) of the VP-AM copolymers were determined by comparing the flow time of polymer solution at a given polymer concentration with the flow time of the neat solvent. The following relationship of flow times describes Relative Viscosity.

$$n_{rel} = \frac{t}{t_o}$$

$t$ = flow time polymer solution
$t_o$ = flow time of neat solvent

In all examples herein, relative viscosity was measured in an Ubbelohde #1 capillary viscometer at 25.0° C. Flow times were taken by stop watch, and the times recorded in most cases to the nearest 1/100th second or in all cases to the closest 1/10th second. The precision of this time measurement was assured by repeating each flow through the viscometer three times, and an average flow time, from range of values of no more than 2/10th second, reported.

Based upon the precision of these and other measurements, the precision of the calculated K values is estimated to be ± less than about one K value unit.

Surprisingly, the K values calculated for even copolymers prepared in a distilled water polymerization medium were higher than those reported in U.S. Pat. No. 3,500,925, and the K values for copolymers prepared by the inventive methods disclosed herein were substantially higher. Over the ranges tested, the K values were found generally to vary inversely with polymer concentration in the test solution, e.g., the lower the concentration, the higher the K value. Some variation was also found depending upon the nature of the solution in which the polymers were tested for relative viscosity before calculating the K values. For 35 polymers prepared in the same polymerization media, measurement of relative viscosity in synthetic sea water (SSW) generally produced higher K values than for those tested in H$_2$O, with polymers tested in a solution of mixed salts producing K values lower than the synthetic sea water but slightly higher than solutions of NaCl.

Figure 8:
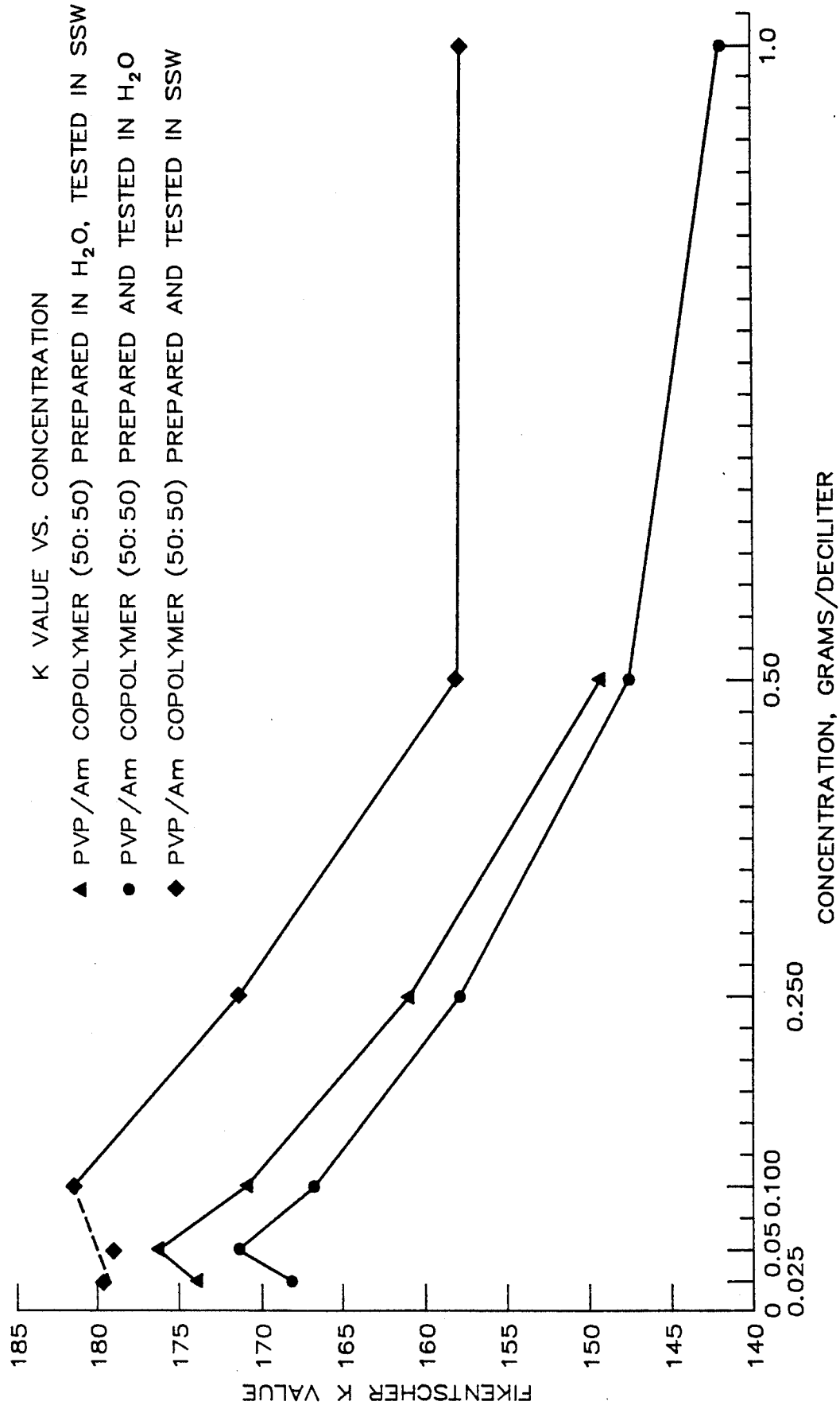
FIG. 8 shows K values for copolymers of the invention at various concentrations compared with copolymers of the prior art.
Figure 9:
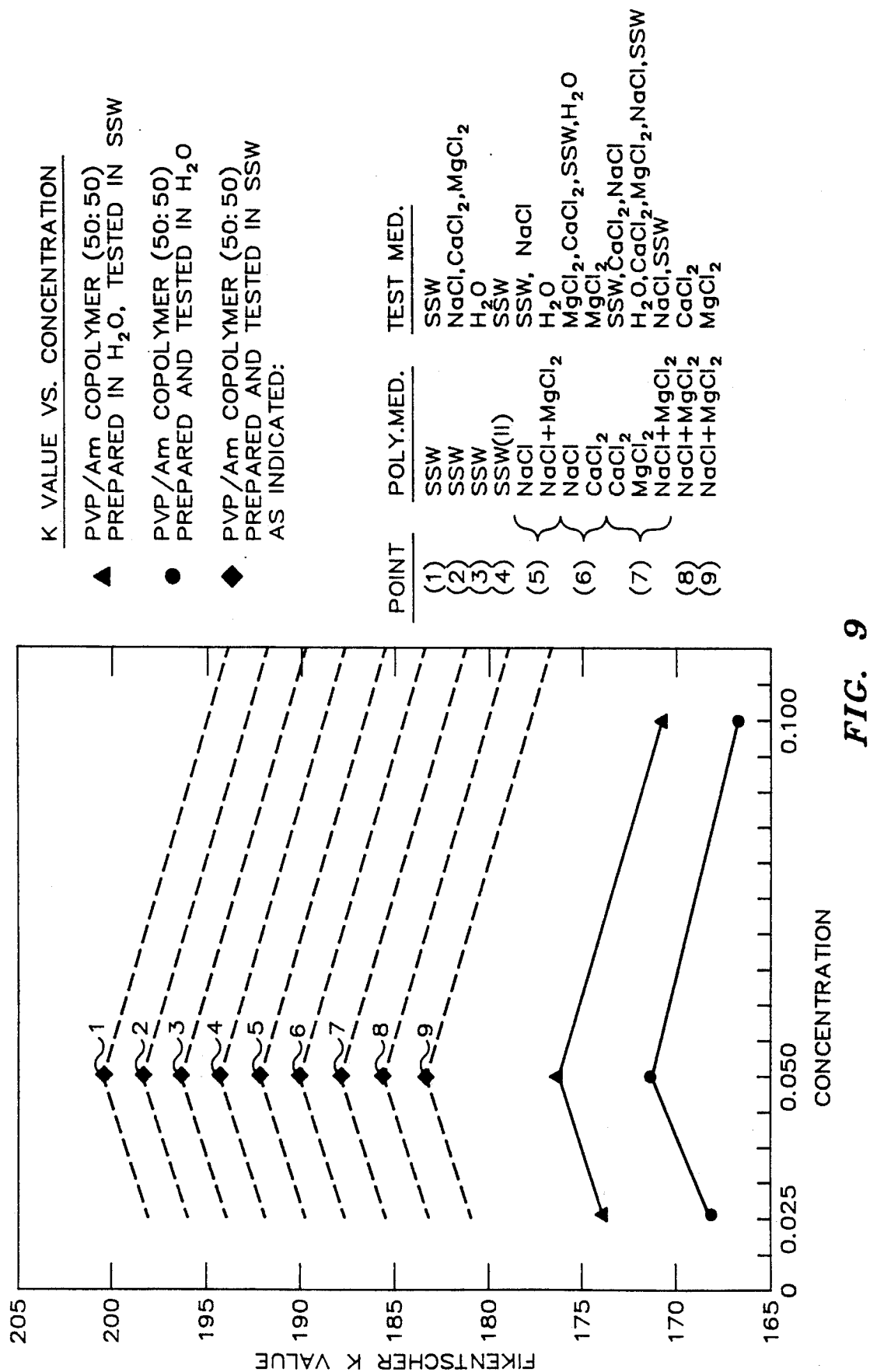
FIG. 9 shows K values for copolymers of the invention as well as copolymers of the prior art at various concentrations and for various polymerization and test media.

FIG. 8 describes the variation of the K value with the polymer concentration in test solution for copolymers prepared in water. Since it was indicated in some sources in the literature that measurements for K values were made with a concentration equal to 1.0 g per deciliter of solution, one of these samples was tested in water at this concentration and a K value of 141.8 was obtained for it. In these aqueous systems, the concentrations in grams/deciliter and weight percent are approximately equal. Identical samples were tested in various electrolyte solutions at concentrations of 0.5 g/dL and below. As can be seen in FIG. 9, the K values obtained were generally higher than those calculated for samples tested in water at the same concentrations. The maximum values were seen for samples tested in synthetic sea water, with K values ranging from 149 to 176; samples tested in water produced K values 3 to 5 units lower. For clarity, only the values for samples tested in SSW and H$_2$O have been plotted, with all data listed in Table VIII. Those samples tested in saline solution produced K values ranging from 150 to 179, with samples tested in solutions of magnesium chloride and calcium chloride producing K values slightly below these figures.

Samples of VP:AM (50:50) copolymer were also prepared in SSW and tested in SSW for comparison with the copolymers prepared in water. The results of relative viscosity measurements and calculated K values are tabulated in Table IX. The K values for concentrations in the range from 0.025 to 1.0 g/deciliter are plotted in FIG. 8 for comparison with the copolymers prepared in water and tested in water. The K value of 157.7 obtained for C=1.0 g/dL is substantially higher than the K of 141.8 obtained with the H$_2$O/H$_2$O copolymer, and this advantage persists over most of the concentration range, even compared to the samples made in water and tested in solutions of various electrolytes. (The notation H$_2$O/H$_2$O means the copolymer was prepared in water and its viscosity was determined in water.) The K values of about 178 for C=0.05 and 0.025 are inconsistent with this trend, and may represent the limit of errors in weighing or other measurements.

FIG. 9 shows plots of K values versus concentration from FIG. 8 for a limited range of concentrations equal to 0.025 to 0.1 grams/deciliter. Several of the samples prepared in water displayed an apparent maximum K value at a concentration of 0.05 g/dL. Samples of copolymers of the same 50:50 composition were then prepared in various aqueous polymerization media containing electrolytes, tested for relative viscosity at concentrations of 0.05 g/dL, and the K values calculated. As seen in FIG. 9 and Table X, the K values for these copolymers were substantially higher than for the samples made in water. A smaller amount of variation was observed depending on the solution medium in which the polymers were tested. Maximum values were obtained for the sample prepared and tested in synthetic sea water, giving a K value of 200.4. A second polymer sample of the same composition (SSW II) prepared and tested in synthetic sea water gave a K value of 194.3. The average of these K values, 197.4, is comparable to the values obtained for other samples prepared in synthetic sea water and tested in various electrolyte solutions, and is substantially higher than the values obtained for the polymers prepared and tested in other electrolyte solutions. Tested in water, this material produced a K value of about 196. Samples prepared in saline solution produced a K value of about 192, regardless of the test medium. Samples prepared in a polymerization medium containing a mixture of NaCl and MgCl$_2$ produced K values ranging from 183 to 192, with the maximum being obtained for the samples tested in a solution of H$_2$O. While not all the differences in K values for samples prepared and tested in various media can be explained, and some differences may be due to statistical variations and/or operator error, the copolymers prepared in electrolytes, particularly synthetic sea water, NaCl or a mixture of salts, produced significantly higher K values than those copolymer samples prepared in H$_2$O. These polymers were of significantly higher K value than many commercial polymers, including polyvinylpyrrolidone and the polymers claimed in U.S. Pat. No. 3,500,925. Thus, while the inventive copolymers prepared in synthetic sea water or mixed electrolyte solutions are superior as reflected by their relative viscosities and K values, the copolymers prepared in H$_2$O or other electrolyte solutions are sufficiently viscous to be useful in certain process embodiments of the invention.

TABLE VIII

Calculated K values for VP-AM copolymer (50:50 wt. percent) prepared in distilled water with 0.5 wt. percent AIBN and tested in various media

| Conc. (g/dL) | Medium | $n_{rel}$ | K Value |
| --- | --- | --- | --- |
| 1.0 | H$_2$O | 24.3 | 141.8 |
| 0.5 | H$_2$O | 6.44 | 147.6 |
| 0.25 | H$_2$O | 3.02 | 157.8 |
| 0.10 | H$_2$O | 1.66 | 166.7 |
| 0.05 | H$_2$O | 1.31 | 171.4 |
| 0.025 | H$_2$O | 1.14 | 168.2 |
| 0.5 | SSW | 6.70 | 149.3 |
| 0.25 | SSW | 3.15 | 161.0 |
| 0.10 | SSW | 1.70 | 170.8 |
| 0.05 | SSW | 1.33 | 176.3 |
| 0.025 | SSW | 1.15 | 173.9 |
| 0.5 | MgCl$_2$ | 7.04 | 151.4 |
| 0.25 | MgCl$_2$ | 3.20 | 162.1 |
| 0.10 | MgCl$_2$ | 1.64 | 164.6 |
| 0.05 | MgCl$_2$ | 1.32 | 173.9 |
| 0.025 | MgCl$_2$ | 1.15 | 173.9 |
| 0.5 | CaCl$_2$ | 6.86 | 150.3 |
| 0.25 | CaCl$_2$ | 3.18 | 161.7 |
| 0.10 | CaCl$_2$ | 1.63 | 163.6 |
| 0.05 | CaCl$_2$ | 1.32 | 173.9 |
| 0.025 | CaCl$_2$ | 1.14 | 168.2 |
| 0.5 | NaCl | 6.94 | 150.8 |
| 0.25 | NaCl | 3.21 | 162.4 |
| 0.10 | NaCl | 1.73 | 173.8 |
| 0.05 | NaCl | 1.30 | 168.8 |
| 0.025 | NaCl | 1.16 | 179.5 |

TABLE IX

Calculated K values for VP:AM copolymer (50:50 wt. percent) in SSW with 0.5 wt. percent AIBN and tested in SSW.

| Conc. (g/dl) | $n_{rel}$ | K Value |
| --- | --- | --- |
| 1.0 | 46.36 | 157.7 |
| 0.5 | 8.24 | 158.0 |
| 0.25 | 3.63 | 171.2 |
| 0.10 | 1.81 | 181.1 |
| 0.05 | 1.34 | 178.7 |
| 0.025 | 1.16 | 178.2 |

TABLE X

Calculated K values for VP-Am copolymers (50:50 composition) prepared in various media with 0.5 wt. percent AIBN and tested in various media. (All concentrations 0.05 g/dl)

| Polymerization Medium | Test Medium | $n_{rel}$ | K Value |
|---|---|---|---|
| SSW | SSW | 1.44 | 200.4 |
| SSWII | SSWII | 1.41 | 194.3 |
| SSW | NaCl | 1.43 | 198.4 |
| SSW | CaCl$_2$ | 1.43 | 198.4 |
| SSW | MgCl$_2$ | 1.43 | 198.4 |
| SSW | H$_2$O | 1.42 | 196.4 |
| NaCl | SSW | 1.40 | 192.2 |
| NaCl | NaCl | 1.40 | 192.2 |
| NaCl | CaCl$_2$ | 1.39 | 190.0 |
| NaCl | MgCl$_2$ | 1.39 | 190.0 |
| NaCl | H$_2$O | 1.39 | 190.0 |
| NaCl/MgCl$_2$ | SSW | 1.38[a] | 187.9 |
| NaCl/MgCl$_2$ | NaCl | 1.38 | 187.9 |
| NaCl/MgCl$_2$ | H$_2$O | 1.40 | 192.2 |
| NaCl/MgCl$_2$ | CaCl$_2$ | 1.37 | 185.6 |
| NaCl/MgCl$_2$ | MgCl$_2$ | 1.36 | 183.4 |
| CaCl$_2$ | Mgcl$_2$ | 1.39 | 190.0 |
| CaCl$_2$ | SSW | 1.38 | 187.9 |
| CaC$_2$ | CaCl$_2$ | 1.38 | 187.9 |
| CaCl$_2$ | NaCl | 1.38 | 187.9 |
| CaCl$_2$ | H$_2$O | 1.37 | 185.9 |
| MgCl$_2$ | SSW | 1.38 | 187.9 |
| MgCl$_2$ | NaCl | 1.38 | 187.9 |
| MgCl$_2$ | MgCl$_2$ | 1.38 | 187.9 |
| MgCl$_2$ | CaCl$_2$ | 1.38 | 187.9 |
| MgCl$_2$ | H$_2$O | 1.38 | 187.9 |

[a]Average of two runs using separate polymer batches.

EXAMPLE VII

Screen Factor Tests

A series of 50/50 VP/AM copolymers was prepared in 0.7 I.S. SSW at 50° C. as previously described using AIBN as the initiator. Each copolymer solution was produced with a different amount of initiator, the range extending from 0.13 to 1.0 weight percent AIBN based on monomer weight. Each polymer solution was further diluted with SSW to provide solutions having from about 0.2 to 1 weight percent polymer. The screen factors for the various solutions were determined at 78° F. and at 180° F. by measuring the time required for passage of an aliquot of the polymer solution by gravity flow through five 100-mesh stainless steel screens at the designated temperature and dividing this time by the time required for passage of the same amount of SSW through these screens under identical conditions. This method is described by Foshee, et al, as previously cited.

Figure 10:
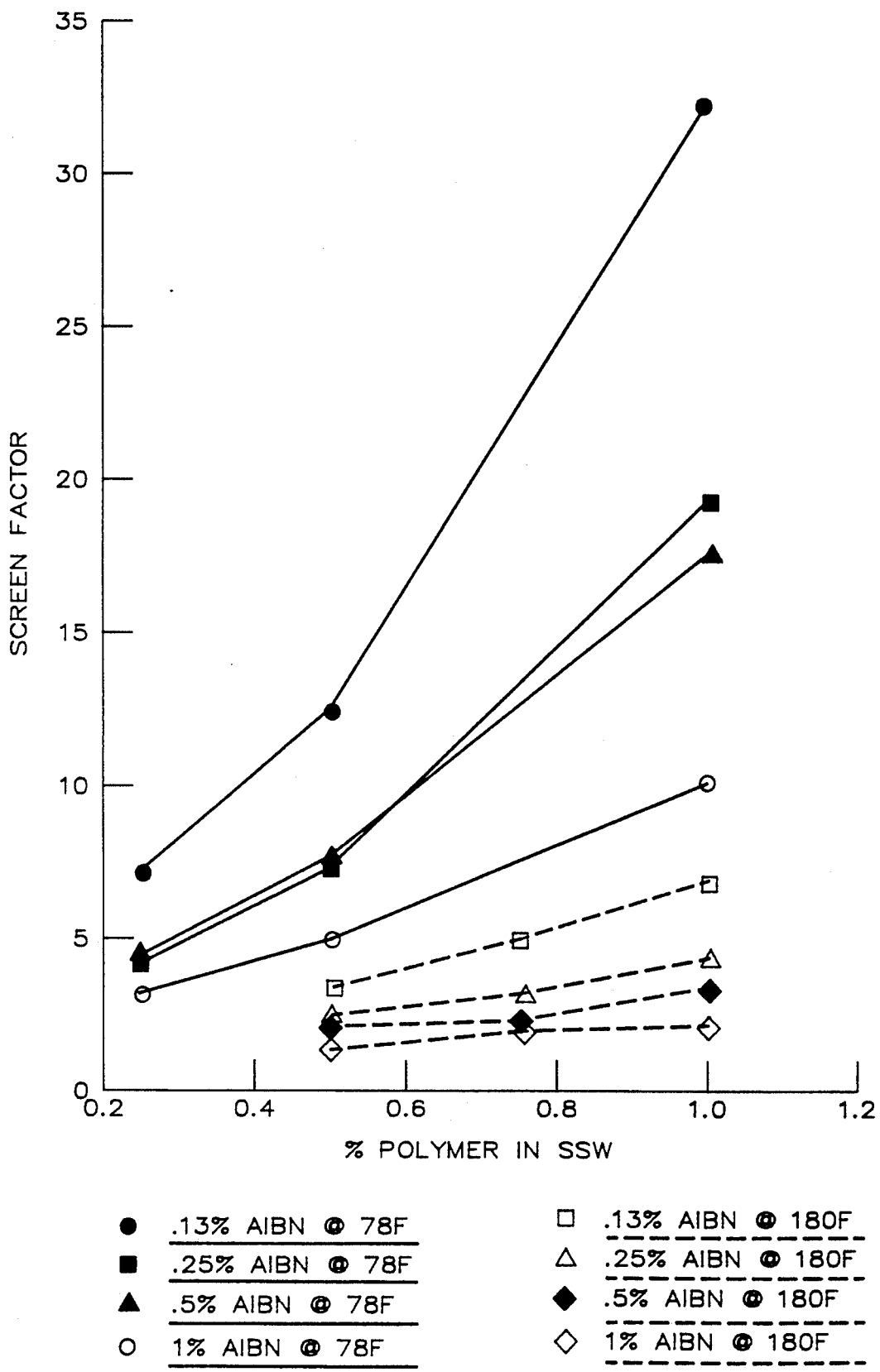
FIG. 10 illustrates Screen Factors for copolymers of the invention tested at various concentrations in SSW.
Figure 11:
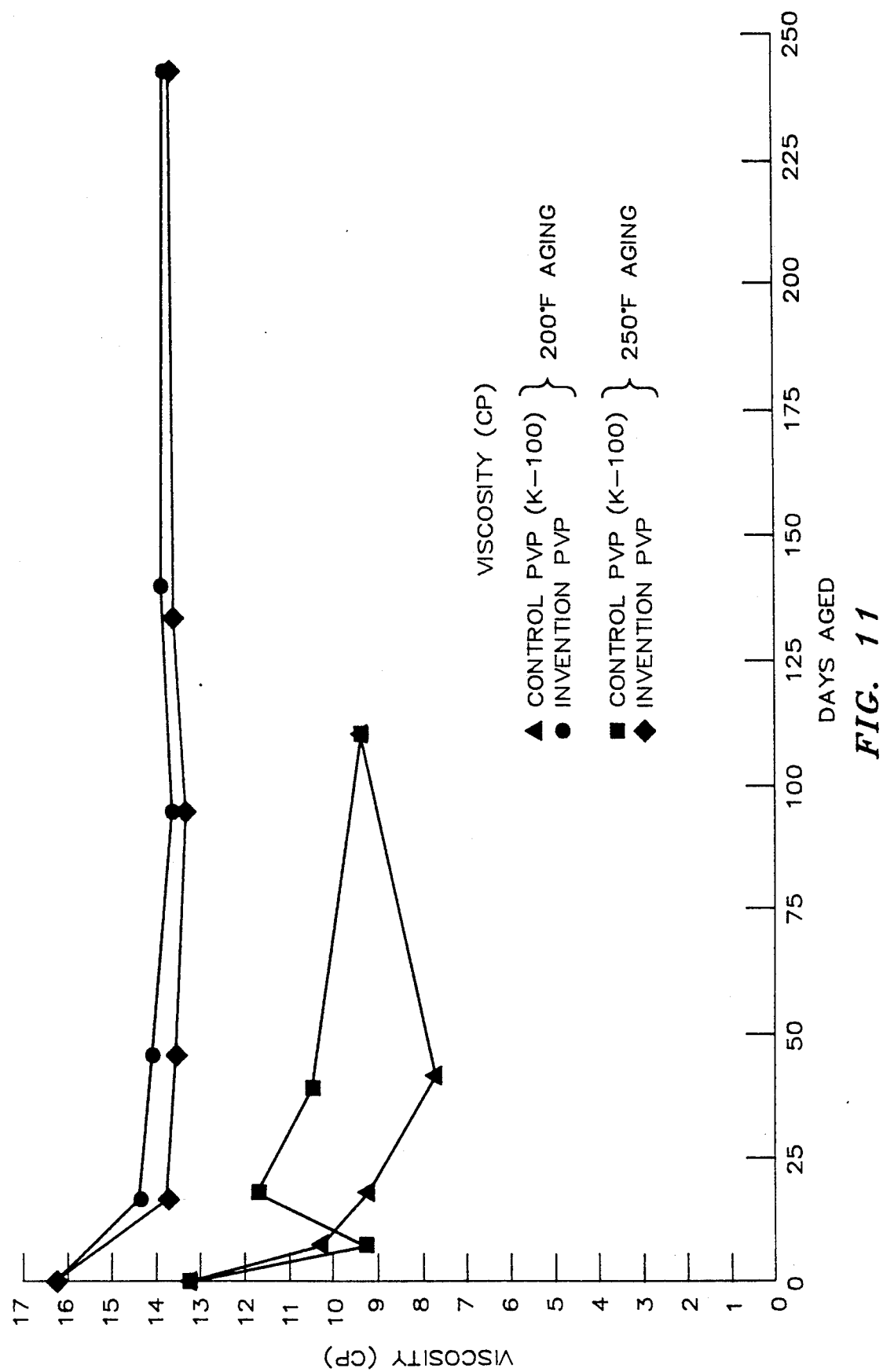
FIG. 11 illustrates the viscosity of homopolymers which are subjected to heat aging.

The results obtained are plotted in FIG. 10. The screen factors are directly related to the molecular weight of the polymer, e.g. how much AIBN was used in its preparation, and accordingly to its solution viscosity. The higher the molecular weight (higher the solution viscosity), the higher the screen factor over the range studied. Polymer molecular weight is inversely related to initiator concentration, as is known in the art. Consequently, the highest screen factor is obtained with the polymer prepared with the least amount of initiator. Screen factors at 180° F. are smaller than their counterparts at 78° F., as expected. For example, a solution containing 1 weight percent copolymer (copolymer prepared with 0.13 weight percent AIBN) has a screen factor of about 32 at 78° F. and about 7 at 180° F.

Screen factors are easier and faster to obtain than resistance factors and they can be used to estimate the relative magnitudes of the resistance factors at the same temperatures. A resistance factor describes a decrease in mobility of a polymer solution in comparison with the flow of the aqueous medium in which it is prepared. With chemically similar polymers, as the screen factor increases the resistance factor also increases. For example, screen factors measured for 0.5 weight percent solutions of the 50/50 VP/AM copolymers (prepared with 0.13, 0.25 and 1.0 weight percent AIBN in SSW) in SSW at 180° F. are 3.3, 2.4, and 1.3, while preliminary average resistance factors for identical solutions measured in Berea cores are 12.1, 9.8 and 5.0, respectively. These values result in an average ratio of resistance factor to screen factor of about 3.9. From this ratio and the screen factor for another copolymer in this group, one can estimate its resistance factor under the same conditions.

Detailed information relating to screen factors, resistance factors and the like are given by Jeanings, R. R.; Rogers, J. H. and 10 West, T. J. "Factors Influencing Mobility by Polymer Solutions" J. Pet. Tech. (March 1971), 391–401.

EXAMPLE VIII

Thermal Aging of Terpolymers

Test samples, e.g., of VP/AM/MMA terpolymer solutions were prepared by combining sufficient terpolymer with synthetic seawater (SSW; 0.7 ionic strength) to give a 0.5 wt. percent (5000 ppm) solution of the terpolymer (active basis). The test solution was purged of oxygen by inert gas entrainment before running the thermal aging tests. Aging tests were routinely carried out by incubating sealed samples at 200° F., 250° F. and 300° F. for specified time periods. After cooling the samples, Brookfield viscosities of the thermally aged samples were determined at 77° F. to determine viscosity retention of the solution after subjection elevated temperature in the presence of electrolytes. The results are shown in Table XI.

All of the tests shown in Table XI involved the use of terpolymers prepared in synthetic seawater with an initiator level of 0.5 wt percent AIBN (based on total monomers).

TABLE XI

| Aging Period (Days) | 200° F. Aging Viscosity (cP) | 250° F. Aging Viscosity (cP) | 300° F. Aging Viscosity (cP) |
|---|---|---|---|
| Thermal Aging of 47.5/47.5/5.00 Weight Percent VP/Am/MMA Terpolymer | | | |
| 0 days | 7.5 | 7.5 | 7.5 |
| 22 days | 9.9 | 8.7 | 8.5 |
| 56 days | 9.7 | 7.7 | 5.6 |
| 112 days | 9.4 | 8.0 | 6.4 |
| 190 days | 9.3 | 8.3 | 4.5 |
| Thermal Aging of 48.5/48.5/3.0 Weight Percent VP/Am/MMA Terpolymer | | | |
| 0 days | 9.0 | 9.0 | 9.0 |
| 12 days | 11.7 | 11.4 | 7.1 |
| 42 days | 12.5 | 11.0 | 5.1 |
| 68 days | 11.4 | 10.3 | 7.0 |
| 118 days | 12.4 | 10.2 | 7.5 |
| Thermal Aging of 49.5/49.5/1.00 Weight Percent VP/Am/MMA Terpolymer | | | |
| 0 days | 10.3 | 10.3 | 10.3 |
| 17 days | 14.1 | 12.6 | 7.1 |
| 57 days | 14.2 | 12.6 | 6.2 |
| 83 days | 14.0 | 12.0 | 7.9 |
| 133 days | 13.9 | 12.4 | 8.1 |

Referring to the results in Table XI, it is evident that good retention of solution viscosity was noted in all three terpolymer compositions after aging at 200° F.

and 250° F. Attention is called to the fact that the terpolymers containing 1 wt. percent and 3 wt. percent methyl methacrylate (MMA) retained a greater percentage of the initial solution viscosity in the 300° F. tests than did the terpolymer containing 5 wt. percent MMA, viz., 79 percent viscosity retention and about 83 percent viscosity retention compared to 60 percent viscosity retention.

EXAMPLE IX

Thermal Aging of Terpolymers

All of the tests shown in Table XII involved the use of terpolymers prepared in synthetic seawater with an initiator level of 0.125 wt. percent AIBN (based on total monomers). Test samples were 0.5 weight percent terpolymer in synthetic seawater. Viscosity measurements were determined at 77° F. after aging at the indicated elevated temperatures.

TABLE XII

| Aging Period (Days) | 200° F. Aging Viscosity (cP) | 250° F. Aging Viscosity (cP) | 300° F. Aging Viscosity (cP) |
|---|---|---|---|
| Thermal Aging of 47.5/47.5/5.0 Weight Percent VP/AM/MMA Terpolymer | | | |
| 0 days | 12.1 | 12.1 | 12.1 |
| 13 days | 15.6 | 15.6 | 12.0 |
| 14 days | 17.1 | 11.3 | 6.5 |
| 101 days | 16.9 | 13.5 | 6.7 |
| 147 days | 9.7 | 13.2 | 7.7 |
| Thermal Aging of 48.5/48.5/3.0 Weight Percent VP/Am/MMA Terpolymer | | | |
| 0 days | 13.8 | 13.8 | 13.8 |
| 18 days | 17.6 | 16.7 | 9.9 |
| 46 days | 19.6 | 16.3 | 9.0 |
| 105 days | 19.6 | 15.1 | 9.3 |
| 148 days | 19.0 | 15.8 | 8.2 |
| Thermal Aging of 49.5/49.5/1.00 Weight Percent VP/Am/MMA Terpolymer | | | |
| 0 days | 14.2 | 14.2 | 14.2 |
| 15 days | 20.0 | 17.5 | 4.6 |
| 47 days | 17.3 | 17.5 | 12.4 |
| 106 days | 21.2 | 18.5 | 7.8 |
| 149 days | 16.5 | 14.4 | 10.2 |

Referring to the results in Table XII, it is evident that the initial solution viscosity values for the three terpolymers (12.1; 13.8; 14.2) are significantly greater than the corresponding values in Table XI (7.5; 9.0; 10.3). Presumably, this is due to the higher average molecular weights of the Table XII terpolymers, which can be attributed to lower levels of initiator, viz., 0.125 wt. percent AIBN compared to 0.50 wt. percent AIBN. It is evident that the solution sample containing 1 wt. percent methyl methacrylate terpolymer retained a greater percentage of the initial solution viscosity in the 300° F. tests than did the terpolymers containing 3 wt. percent and 5 wt. percent MMA, viz., about 72 percent viscosity retention compared to about 59 percent viscosity retention and about 65 percent viscosity retention. The viscosity of 9.7 obtained upon aging the 5 wt. percent MMA terpolymer for 147 days at 200° F. appears lower than would be expected, probably due to the presence of oxygen or other operator error.

In general, it is believed that the apparent fluctuations of solution viscosities noted throughout the thermal aging tests are related to the extent of the percent hydrolysis of pendant —CONH$_2$ groups, since it is well known that the viscosifying effectiveness of polyacrylamides passes through a maximum as a function of the degree of hydrolysis of amide moieties along the polymer backbone. The variously structured terpolymers could well vary in their inherent tendency to undergo hydrolysis of pendant amide groups along the polymer backbone.

EXAMPLE X

Terpolymer Cloud Point Temperatures

This example discloses cloud point determinations of terpolymer compositions prepared as described in Examples XV and XVI of U.S. Pat. No. 5,080,809 which had been aged in synthetic seawater at temperatures in the range of 200°–300° F. Results are summarized in Table XIII.

TABLE XIII

Cloud Point Determinations on VP/Am/MMA Terpolymer Prepared in Synthetic Seawater

| Thermal Aging Days @ F. | Cloud Points °F. (After Aging) | | |
|---|---|---|---|
| | 1% MMA | 3% MMA | 5% MMA |
| 157 @ 300 F.$^a$ | | | 275.6 |
| 160 @ 300 F. | 300.7 | 289 | |
| 182 @ 300 F. | 297.6 | | 282.0 |
| 186 @ 300 F. | | 293.6 | |
| 202 @ 300 F. | >298 | | |
| 214 @ 300 F. | | 295.6 | |
| 181 @ 250 F.$^a$ | 254.4 | | |
| 186 @ 250 F. | | 239.0 | |
| 202 @ 250 F. | 255.8 | | |
| 214 @ 250 F. | | 239.8 | |
| 181 @ 200 F.$^a$ | 253.5 | | |
| 202 @ 200 F. | 282.1 | | |
| 51 @ 300 F.$^b$ | | 243.5 | |
| 66 @ 300 F. | | 262.2 | |
| 76 @ 300 F. | | | 258.6 |
| 79 @ 300 F. | 285.6 | | |
| 84 @ 300 F. | 273.5 | | |
| 98 @ 300 F. | 288.8 | | |
| 113 @ 300 F. | 289.3 | | |
| 113 @ 250 F.$^b$ | 255.9 | | |
| 112 @ 200 F.$^b$ | >300 | | |

$^a$Azobisisobutyronitrile initiator level was 0.125 wt. percent
$^b$Azobisisobutyronitrile initiator level was 0.5 wt. percent Referring to the results in Table XIII, it is evident that the terpolymers containing 1 wt. percent MMA and 3 wt. percent MMA exhibit somewhat higher cloud points under comparable conditions than terpolymers containing 5 wt. percent MMA. This observation was apparent for terpolymerization initiated by 0.125 wt. percent AIBN or 0.50 wt. percent AIBN.

EXAMPLE XI

Stability of Thermally Aged Terpolymers

This example demonstrates the thermal stability of terpolymer compositions containing varying amounts of methyl methacrylate (MMA), the balance being equal weights of acrylamide (Am) and N-vinyl-2-pyrrolidone (VP). Solution viscosities were determined at different temperatures by capillary viscometry as is well known in the art. In general, 0.25 weight percent solutions of the terpolymers were aged at 300° F. for seven days before viscosities were determined. Two terpolymers were studied: (1) a VP/Am/MMA polymer (49.5 wt % VP, 49.5 wt % Am, 1.0 wt % MMA) prepared in synthetic seawater with an AIBN level of 0.125 wt. percent based on total monomers charged, and (2) a VP/Am/MMA terpolymer (47.5 wt % VP, 47.5 wt % Am, 5.0 wt % MMA) prepared in synthetic seawater with an AIBN level of 0.13 wt percent. Results are summarized in Table XIV.

TABLE XIV

Capillary Viscometer Results on Aged VP/Am/MMA Terpolymers

| Approximate Temp. °F.[a] | 1% MMA[b] | 5% MMA[b] |
|---|---|---|
| 105 | 4.00 | 3.27 |
| 130 | 3.02 | 2.32 |
| 155 | 2.01 | 1.69 |
| 185 | 1.34 | 1.19 |
| 205 | 0.92 | 0.85 |
| 230 | 0.61 | 0.61 |
| 255 | 0.42 | 0.43 |
| 280 | 0.31 | 0.34 |
| 305 | 0.25 | 0.26 |

[a]Temperature of viscosity measurement.
[b]Terpolymerization was carried out in synthetic seawater.

Referring to the results in Table XIV, it is evident that the MMA level can be as high as at least 5 weight percent without adversely affecting solution viscosity or thermal stability of the terpolymer systems. In the temperature range of 105° F. to 205° F., the viscosity of the terpolymer system containing 1 wt. percent MMA was slightly higher than that of the 5 wt. percent MMA system.

EXAMPLE XII

Thermal Stability of Unaged Terpolymers

This example compares the thermal stability of 0.25 weight percent solutions of unaged VP/Am/MMA terpolymers (49.5/49.5/1.00 weight percent) as evidenced by solution viscosities determined by capillary viscometry. One of the terpolymers was prepared in deionized water whereas the other terpolymer was prepared in synthetic seawater. Results are summarized in Table XV.

TABLE XV

Solution Viscosities of VP/Am/MMA Terpolymers by Programmed Capillary Viscometry

| Approximate Temp. °F.[c] | Viscosity (cP) 1% MMA[a] | 1% MMA[b] |
|---|---|---|
| 105 | 3.65 | 2.62 |
| 130 | 2.81 | 1.95 |
| 155 | 1.99 | 1.48 |
| 185 | 1.48 | 1.07 |
| 205 | 1.10 | 0.93 |
| 230 | 0.92 | 0.76 |
| 255 | 0.69 | 0.61 |
| 280 | 0.57 | 0.50 |
| 305 | 0.46 | 0.44 |

[a]Prepared in synthetic seawater
[b]Prepared in deionized water
[c]Temperature of viscosity measurement Referring to the results in Table XV, it is evident that the viscosities in the polymer system containing the terpolymer prepared in synthetic seawater are somewhat higher than the viscosities observed in the system containing the terpolymer prepared in deionized water.

EXAMPLE XIII

Viscosities of Solutions Containing VP/Am/X Terpolymers by prograrwned Capillary Viscometry This example discloses temperature-programmed capillary viscometer results on 0.25 weight percent solutions of control terpolymers consisting of N-vinyl-2-pyrrolidone (VP) and acrylamide (Am) and a third termonomer X (1 wt. percent) selected from the group of methyl acrylate (MA), butyl acrylate (BA), hydroxyethyl acrylate (HEA), lauryl methacrylate (LMA), acrylonitrile (AN), vinyl acetate (VA), styrene (STY), 4-vinylpyridine (4-VPy), 5-methyl-2-vinyl pyridine (MVPy) and mixtures thereof. Solutions were aged for 7 days at 300 F. before carrying out the capillary viscosity measurements. Results are summarized in Table XVI. The terpolymers were prepared in 0.7 ionic strength aqueous sodium chloride solution initiated by 0.25 wt. percent AIBN (based on total monomers). Although not prepared in polymerization media comprising mixed salts or synthetic sea water, as preferred for the inventive polymers, the properties of these terpolymers are expected to reflect the influence of the different termonomers used. The properties of terpolymers prepared in preferred media, e.g. SSW, should be similarly affected by the type and amount of termonomer used. Each terpolymer resulted from a reactor charge of 49.5 wt. percent VP, 49.5 wt. percent Am and 1.0 wt. percent of the termonomer designated in Table XVI.

TABLE XVI

Solution Viscosities of Aged Terpolymers VP/Am/X*
Viscosity (cP)

| Approximate Temp. °F.[k] | (MA)[a] | (BA)[b] | (HEA)[c] | (LMA)[d] | (AN)[e] | (VA)[f] | (STY)[g] | (4-VPy)[h] | (MVPy)[i] | T[j] |
|---|---|---|---|---|---|---|---|---|---|---|
| 85 | 3.57 | 3.44 | 1.67 | 1.3 | 3.13 | 1.05 | 3.75 | 4.2 | 4.3 | 3.30 |
| 145 | 1.62 | 1.57 | 0.81 | 0.61 | 1.82 | 0.7 | 2.0 | 2.65 | 2.0 | 1.97 |
| 180 | 0.79 | 0.99 | 0.61 | 0.56 | 1.10 | 0.44 | 1.09 | 1.49 | 1.25 | 1.31 |
| 225 | 0.47 | 0.64 | 0.40 | 0.40 | 0.60 | 0.32 | 0.58 | 0.65 | 0.7 | 0.55 |
| 250 | 0.31 | 0.43 | 0.38 | 0.37 | 0.42 | 0.26 | 0.38 | 0.50 | 0.48 | 0.40 |
| 275 | 0.21 | 0.40 | 0.3 | 0.32 | 0.27 | 0.23 | 0.25 | 0.34 | 0.33 | 0.30 |
| 300 | 0.37 | 0.60 | NM** | 0.26 | 0.22 | 0.19 | 0.24 | 0.21 | 0.26 | |

*X represents termonomer as defined in footnotes a through j.
[a]MA represents methyl acrylate.
[b]BA represents butyl acrylate
[c]HEA represents hydroxyethyl acrylate.
[d]LMA represents lauryl methacrylate.
[e]AN represents acrylonitrile.
[f]VA represents vinyl acetate.
[g]STY represents styrene.
[h]4-VPy represents 4-vinylpyridine.
[i]MVPy represents 5-methyl-2-vinyl pyridine.
[j]T represents a 1:1 wt/wt mixture of methyl methacrylate (MMA) and vinyl acetate (VA).
[k]Temperature of viscosity measurement.

**NM represents Not Measured.

Referring to the results in Table XVI, it is evident that the initial viscosities of the thermally aged system containing hydroxyethyl acrylate (HEA), lauryl methacrylate (LMA), and vinyl acetate (VA) termonomers were significantly lower than systems containing the other designated termonomers. Perhaps this indicates the greater inherent tendency of the pendant moieties in these three terpolymers to hydrolyze during the 7 day thermal aging at 300 F. before measuring solution viscosities by programmed capillary viscometry. All of the systems in Table XVI showed greatly reduced viscosities at elevated temperatures, particularly at temperatures above 180 F. However, these viscosities are still greater than that of synthetic sea water at comparable temperatures. At temperatures up to 250° F., higher viscosities were exhibited by systems containing pyridine-derived termonomers such as 4-vinylpyridine (4VPy) and 5-methyl-2-vinylpyridine (MVPy).

This observation perhaps is related to the fact that the pyridine moiety is probably the least readily altered grouping under the test conditions. A similar rationale may account for the less dramatic effects in the terpolymer systems derived, respectively, from VP, Am and styrene; and VP, Am and acrylonitrile (AN). In general, the test conditions appear severe enough to cause significant hydrolysis of pendant ester moieties.

Calculations show that between 85° F. and 300° F., the terpolymer containing MA lost 89.6 percent of its viscosity and the BA terpolymer lost 82.6 percent of its viscosity, while the terpolymers containing 4-VPy and MVPy lost 94.3 and 95.1 percent, respectively, of their viscosities.

EXAMPLE XIV

Viscosities of Unaged Terpolymers

This example discloses viscosities of unaged 0.25 weight percent solutions containing VP/Am/MMA terpolymers. Terpolymers contained methyl methacrylate (MMA) at levels of 0.25 to 10 weight percent, with the balance of the terpolymer consisting of equal weights of units derived from N-vinyl-2-pyrrolidone (VP) and acrylamide (Am). Relative viscosities as well as Brookfield viscosities are presented for the series of control terpolymer compositions prepared in 0.7 ionic strength aqueous sodium chloride solution. Brookfield viscosities are given for similar control terpolymer compositions prepared in deionized water and selected inventive terpolymers prepared in synthetic seawater. Results are summarized in Table XVII.

TABLE XVII

Viscosities of Unaged Terpolymer Solutions

| Wt % MMA$^a$ | Deionized H$_2$O$^b$ Terpolymer Viscosity (cP) | 0.7 Ionic Strength$^c$ Terpolymer Viscosity (cP) | Synthetic Seawater$^d$ Terpolymer Viscosity (cP) | 0.7 Ionic Strength$^c$ Terpolymer Relative Viscosity$^e$ |
|---|---|---|---|---|
| 0.25 | 3.6 | 5.1 | NM$^i$ | 1.79 |
| 0.50 | 3.9 | 5.1 | NM$^i$ | 1.74 |
| 1.0 | 3.8 | 5.4 | 5.3 | 1.73 |
| 2.0 | 3.7 | 5.1 | NM | 1.67 |
| 3.0 | 3.6 | 4.5 | 5.1 | 1.56 |
| 5.0$^f$ | 3.6 | 4.6 | 5.0 | 1.57 |
| 7.0$^g$ | 3.4 | 4.7 | NM$^i$ | 1.63 |
| 10.0$^h$ | 3.0 | 4.4 | NM$^i$ | 1.48 |

$^a$Balance of terpolymer comprised equal weight proportions of VP and Am units.
$^b$Terpolymer was prepared in deionized water.
$^c$Terpolymer was prepared in 0.7 ionic strength aqueous sodium chloride solution.
$^d$Terpolymer was prepared in synthetic seawater.
$^e$Relative viscosity is calculated by dividing the time required for a solution to pass through a capillary viscometer by the time required for a solvent to pass through the same capillary viscometer.
$^f$Sample contained haze or water insoluble material.
$^g$Sample more hazy than that referenced in footnote e; contained a considerable amount of water insoluble material.
$^h$Sample contained a white precipitate.
$^i$Not measured.

Referring to the results in Table XVII, it is evident that the viscosities of the control terpolymers prepared in the 0.7 ionic strength aqueous sodium chloride solution and the inventive terpolymers prepared in synthetic seawater were somewhat higher than the measurements for the control terpolymers prepared in deionized water. It is noteworthy that the terpolymer compositions containing less than 1 weight percent methyl methacrylate (MMA) imparted significant viscosities to water solutions of electrolytes. As noted in footnotes f, g, and h of Table XVII, attention is called to the fact that terpolymer compositions containing more than about 5 weight percent methyl methacrylate (MMA) exhibited greatly reduced water solubilities.

EXAMPLE XV

VP-Am Copolymers as Flocculants

Several invention copolymers and several commercially available polymers as controls were tested for efficacy as flocculating agents in Caney River (Oklahoma) water containing 250 ppm added bentonite clay of 325 mesh particle size. The river water had an initial turbidity of about 87 nephelos units. The procedures of ASTM-D 2035-80 and ASTM Standards cited therein were followed. The inventive copolymers consisting of VP/AM weight ratios of 40/60, 30/70 and 20/80 were prepared in SSW at 49° C. in the presence of 0.5 weight percent AIBN based on the weight of the monomers. A portion of each copolymer was subsequently diluted with SSW to form a 1 weight percent solution and the Brookfield viscosities of the solutions were determined at 25° C. at 6 rpm.

Sample 1, 40/60 VP/Am, had a Brookfield viscosity of about 73 cP as determined with a U.L. spindle.

Sample 2, 30/70 VP/Am, had a Brookfield viscosity of about 157 cP as determined with a No. 1 spindle.

Sample 3, 20/80 VP/Am, had a Brookfield viscosity of about 232 cP determined with a No. 1 spindle.

In the procedure followed, each 1500 mL jar, containing 1000 mL of the water-clay mixture and 0.5 ppm of the test polymer based on the contents of the jar, was stirred for 1 minute at a flash mix speed of 105 rpm. The speed was reduced to 20 rpm and stirring continued for 20 minutes. The stirrer was withdrawn and results then determined in accordance with the ASTM procedure except for color of the water which was not recorded.

The results are set forth in Table XVIII.

TABLE XVIII

| | VP/Am Copolymers as Flocculating Agents | | | | | | | |
|---|---|---|---|---|---|---|---|---|
| Remarks | Invention | | | | | | Controls[a] | |
| Run No. | 1 | 2 | 3 | 4 | 5 | 6 | 7[b] | 8[c] |
| Sample Description | 40/60 VP/Am | | 30/70 VP/Am | | 20/80 VP/Am | | 1125L | 1180 |
| Initial sample pH | 7.11 | 7.11 | 7.11 | 7.11 | 7.11 | 7.06 | 7.06 | 7.06 |
| Initial turbidity, nephelos units | 87 | 87 | 87 | 87 | 87 | 87 | 86 | 86 |
| Test temp. °C. | 27.2 | 27.2 | 27.2 | 27.2 | 27.2 | 27.2 | 23.8 | 23.8 |
| Time, first floc, min. | 0.5 | 0.5 | 0.5 | 0.5 | 0.5 | 0.5 | 0.1 | 0.5 |
| Floc size | medium fine | medium fine | medium fine | medium fine | medium fine | medium fine | coarse | medium fine |
| Settling rate, min. | 5.5 | 5.5 | 5.5 | 5.5 | 5.5 | 5.5 | 0.2 | 4.0 |
| Turbidity, 15 min., settle; nephelos | 2.9 | 3.0 | 3.5 | 3.8 | 3.4 | 3.2 | 3.8 | 1.5 |
| Final sample pH | 7.15 | 7.14 | 7.21 | 7.20 | 7.27 | 7.31 | 7.69 | 6.83 |

[a]Results are averages of 2 runs.
[b]Betz Poly-Flox ® 1125L, Betz Laboratories, Trevose, PA
[c]Betz Poly-Flox ® 1180.

The results obtained with the inventive copolymers are comparable to those obtained with commercial flocculant, Betz Poly-Floc ® 1180. Although the tests were conducted in river water containing an unknown concentration of dissolved salts (The water is considered to be hard water based on its reaction with soap), it is expected that the inventive copolymers will serve as effective flocculating agents for processes involving the clarification of water containing suspended matter. Specific applications might be in clarification of brackish water, removal of fines in mineral processing i.e., phosphate mining, uranium or copper mining, or removal of clay from potash ores suspended in concentrated brines.

ADDITIONAL EXPERIMENTAL

The general experimental procedure used to prepare the polymers of the following examples involved the charging of monomers and water (either distilled water or saline water) to crown top bottles along with suitable initiators. The reaction mixtures were degassed with an inert gas for approximately 20 minutes before capping and allowing polymerization to take place at a specified temperature depending on the chemical initiator used. For radiation induced polymerizations, no chemical initiator was added and the reaction mixture in the crown top bottles was irradiated with suitable radiation dosages. At the end of the reaction period, the entire reaction mass was usually in the form of a gel.

Characterization of reaction products was carried out by addition of sufficient amounts of synthetic North Sea water to the gel to prepare 0.1 weight percent and 0.25 weight percent polymer solutions for viscosity measurements. Relative viscosities of the 0.1 weight percent solutions at 25° C. were determined in a capillary viscometer. The unaged viscosities of the 0.25 weight percent polymer solutions were determined by high pressure capillary viscometry. In order to measure the aged viscosity of a polymer solution, the solution was aged in a sealed bomb at 300° F. for 7 days as described hereinbefore. The aged viscosity of the sample was then determined by high pressure capillary viscometry. The formation of precipitate in the aging test indicated that the polymer lacked sufficient thermal stability in the hard salinity test medium to merit any further consideration as a mobility control agent in hostile environments (i.e., temperature > 170° F., hardness cations > 500 ppm). Since the viscosity of the synthetic North Sea water at 250° F. was found to be on the order of 0.28 centipoise, this value was used to indicate the relative effectiveness of the polymer solutions.

The examples presented hereinbelow are representative of the instant teaching. Unless otherwise noted, the compositions were prepared and tested in accordance with the above general experimental procedure. Reaction times were usually on the order of 24 hours and reaction mixtures were usually neither stirred nor tumbled during the polymerizations. The total solids level generally was in the range of 5% to 50% with most of the preparations being carried out in the range of 20% to 35% total solids.

EXAMPLE XVI

NaAMPS Polymers For Hostile Environments

This example presents in summary form representative polymer compositions which are potentially useful as mobility control agents under hostile environment conditions. These samples are characterized by the presence of sodium 2-acrylamido-2-methylpropanesulfonate (NaAMPS) units. Solutions of these polymers in synthetic North Sea water (2500 ppm polymer) at 250° F. exhibited unaged viscosities in the range of 1.50 to 7.05 centipoise. After thermal aging of these solutions in synthetic North Sea water at 300° F. for 7 days, the aged viscosities of these solutions varied in the range of 1.28 to 4.59 centipoise. The viscosity of sea water at 250° F. is about 0.28 centipoise.

TABLE XIX

| | Hostile Environment Polymers Containing Sodium 2-Acrylamido-2-Methylpropanesulfonate (NaAMPS) Units | | | | | | | |
|---|---|---|---|---|---|---|---|---|
| Sample No. | Wt. % NaAMPS | Wt. % VP[b] | Wt. % Am[c] | Wt. % DMAm | Inherent Viscosity(dL/g)[g] | 250 F. (2500 ppm) | | VR* |
| | | | | | | Unaged | Aged | |
| 1 | 100[e] | 0 | 0 | 0 | 11.04 | 7.05 | 4.59 | 16.4 |
| 2 | 70[e] | 0 | 0 | 30 | 8.90 | 3.80 | 2.50 | 8.9 |
| 3 | 55[e] | 30 | 15 | 0 | 9.01 | 2.19 | 1.85 | 6.6 |
| 4 | 100[f] | 0 | 0 | 0 | 7.82 | 1.92 | 1.79 | 6.4 |
| 5 | 100[f] | 0 | 0 | 0 | 7.39 | 2.45 | 1.42 | 5.1 |
| 6 | 55[f] | 30 | 15 | 0 | 8.38 | 2.08 | 1.40 | 5.0 |
| 7 | 70[f] | 0 | 0 | 30 | 7.85 | 2.07 | 1.37 | 4.9 |
| 8 | 65[f] | 35 | 0 | 0 | 6.28 | 1.50 | 1.35 | 4.8 |

TABLE XIX-continued

Hostile Environment Polymers Containing
Sodium 2-Acrylamido-2-Methylpropanesulfonate (NaAMPS) Units

| Sample No. | Wt. % NaAMPS | Wt. % VP[b] | Wt. % Am[c] | Wt. % DMAm | Inherent Viscosity(dL/g)[g] | 250 F. (2500 ppm) Unaged | Aged | VR* |
|---|---|---|---|---|---|---|---|---|
| 9 | 25[f] | 50 | 25 | 0 | 8.19 | 1.56 | 1.38 | 4.6 |

[a]NaAMPS represents sodium 2-acrylamido-2methylpropanesulfonate.
[b]VP represents N-vinyl-2-pyrrolidone.
[c]Am represents acrylamide.
[d]DMAm represents N,N-dimethylacrylamide.
*VR represents Viscosity Ratio and is calculated by dividing the aged viscosity of the polymer solution by 0.28 (the viscosity of sea water at 250° F.).
[e]Refined grade 2-acrylamido-2-methylpropanesulfonic acid was neutralized to prepare the sodium salt (NaAMPS) used in synthesizing the polymers.
[f]Commercial grade AMPS materials were used in these polymerizations.
[g]In this and subsequent examples, unless otherwise noted, viscosity was determined on 0.1 wt. percent solutions in Synthetic North Sea Water at 25° C.

Referring to the results in Table XIX, it is evident that the use of refined grade AMPS in homopolymer sample 1 (cf. Nos. 4 and 5) gave the homopolymer system with the highest aged viscosity, i.e., 4.59 cP compared to 1.79 cP (Sample No. 4) and 1.42 cP (Sample No. 5). These systems, respectively, exhibited aged viscosities which were 16.4, 6.4 and 5.1 times as viscous as sea water at 250° F.

Referring to samples 2 and 7, it is apparent that the 30/70 DMAm/NaAMPS copolymer (Sample 2) made with refined grade AMPS material exhibited a higher aged viscosity than did the copolymer prepared from commercial AMPS material (Sample 7).

The same conclusion applies to the three component polymer samples, numbers 3 (from refined grade AMPS) and 6 containing 30 weight percent VP, 15 weight percent acrylamide and 55 weight percent NaAMPS. Sample 9 (VP/Am/NaAMPS polymer 50/25/25) is another example of a polymer system which exhibited a significant aged viscosity value. In each three component polymer (i.e., samples 3, 6 and 9), the relative weight percent ratio of VP and Am was 2:1. In the course of this work, the weight ratio of VP to Am in three component polymer compositions is preferably not less than 1:1.

Referring to sample 8, it is evident that copolymers of VP and NaAMPS are useful in hostile environments, the aged viscosity at 250° F. being 4.8 times the viscosity of sea water at 250° F.

Attention is called to the fact that the aged viscosities of sample 1-9 in Table XIX were 4.6 to 16.4 times the viscosity of sea water at 250° F.

EXAMPLE XVII

Poly(N-Vinyl-2-Pyrrolidone-co-Sodium-2-acrylamido-2-Methylpropanesulfonate)

This example describes the preparation of VP/NaAMPS copolymers containing, respectively, 25/75, 33/67 and 36/65 weight ratios of the respective comonomers. VAZO ® 33 was used as the initiator at a level of 0.10 phm in the first runs and in the 35/65 run the initiator was 0.10 phm t-butyl hyponitrite.

For the 25/75 copolymer, a 45 g portion of a 50 wt. percent solution of NaAMPS (prepared from commercial grade 2-acrylamido-2-methylpropanesulfonic acid), 97.5 g distilled water, 2.0 g VP and 4.5 g of a stock solution of initiator prepared by dissolving 0.267 g of VAZO ® 33 in 40 g VP was charged to a 10 ounce crown top bottle. After degassing the mixture with argon for 20 minutes, the bottle was capped and stored for 24 hours at ambient temperature. The reaction charge was 20% total solids. The 33/67 and 35/65 copolymers were similarly prepared.

The gelled reaction masses were individually mixed with sufficient synthetic North Sea water to give 0.1 weight percent and 0.25 weight percent solutions for viscosity measurements. The results are shown in Table XXXVI.

TABLE XX

Aging Results on VP/NaAMPS Copolymers Aged in Synthetic North Sea Water

| Wt/Wt VP/NaAMPS | Inherent Viscosity (dL/g) | Viscosity (cP) 250° F. (2500 ppm) Unaged | Aged |
|---|---|---|---|
| 25/75 | 6.93 | 1.80 | 1.07 |
| 33/67 | 6.31 | 1.22 | 1.23 |
| 35/65 | 6.28 | 1.50 | 1.35 |

Referring to the results in Table XX, it is evident that the aged viscosities of the copolymer solutions at 250° F. were several times greater than the viscosity of sea water (0.28 cP) at 250° F. These copolymers, therefore, are potential candidates for hostile environments.

EXAMPLE XVIII

N-Vinyl-2-Pyrrolidone/Acrylamide/ Sodium 2-Acrylamido-2-Methylpropanesulfonate Polymers This sample describes the preparation of polymers of VP, Am and NaAMPS using VAZO ® 33 as the initiator (0.10 phm). Appropriate quantities of monomers were used to prepare VP/Am/NaAMPS polymers of the following compositions: 33/11/56; 25/10/65; 30/15/55; and 25/15/60.

The gelled reaction masses were individually mixed with sufficient synthetic sea water to prepare 0.1 weight percent and 0.25 weight percent solutions for viscosity measurements. The results are summarized in Table XXI.

TABLE XXI

Aging Results on VP/NaAMPS Polymers Aged in Synthetic North Sea Water

| Wt/Wt/Wt VP/Am/NaAMPS | Inherent Viscosity (dL/g) | Viscosity (cP) 250° F. (2500 ppm) Unaged | Aged |
|---|---|---|---|
| 33/11/56 | 7.02 | 1.37 | 1.08 |
| 25/10/65 | 7.98 | 1.65 | 1.20 |
| 30/15/55 | 8.38 | 2.19 | 1.85 |
| 25/15/60 | 7.45 | 1.46 | 1.05 |

Referring to the results in Table XXI, it is apparent that the VP/Am/NaAMPS polymers are candidates for applications in hostile environments because the aged viscosities of the three component polymer solutions of 3.5 to 6.5 times the viscosity of sea water at 250° F. indicates excellent stability. The weight ratio of VP to Am in these hostile environment terpolymers varied over the range of 1.66:1 to 3:1 in these 250° F. tests. At temperatures of 250° F. and above, a ratio of at least 1:1 N-vinyl lactam:unsaturated amide is preferred. A lower ratio, for instance as low as 0.11:1, can be used in lower temperature applications such as at 170° F.

EXAMPLE XIX

N-Vinyl-2-Pyrrolidone/Acrylamide/Diacetone Acrylamide Polymers (VP/Am/DAAm)

This example describes the preparation and testing of VP/Am/DAAm polymers. The polymerizations were carried out either in synthetic sea water or distilled water in accordance with the general experimental procedure discussed hereinabove (20% total solids; VAZO ® 33 initiator at 0.06±0.015 phm).

The gelled reaction masses were individually dissolved in sufficient synthetic North Sea water to give 0.1 weight percent and 0.25 weight percent polymer solutions for viscosity measurements. Results are summarized in Table XXII.

TABLE XXII

Aging Results on VP/Am/DAAm Polymers Aged in Synthetic North Sea Water

| Wt/Wt/Wt VP/Am/DAAm | Inherent Viscosity (dL/g) | Viscosity (cP) 250° F. (2500 ppm) | |
|---|---|---|---|
| | | Unaged | Aged |
| 50/45/5 | 8.58 | 1.54 | 0.74 |
| 50/43/7 | 7.48 | 1.20 | 0.84 |
| 50/40/10 | 6.63a | 1.09 | 0.89 |
| 50/35/15 | 6.32a | 1.03 | 0.97 |
| 48/38/14 | 7.44 | 1.66 | 0.97 |
| 45/45/10 | 8.22 | 1.72 | 0.90 |
| 40/50/10 | 7.40a | 2.04 | Pptd[b] |
| 30/50/20 | 7.18a | 1.95 | Pptd[b] |

[a]Inherent viscosities were determined on 2500 ppm polymer solutions in synthetic North Sea water.
[b]These samples failed the hostile environment thermal aging tests because precipitates formed in the polymer solutions.

Referring to the results in Table XXII, it is evident that the first six entries performed well in the thermal aging test exhibiting aged viscosities on the order of 2.5 to 3.5 times the viscosity of synthetic sea water at 250° F. The last two entries of Table XXII failed to perform well in the thermal aging tests resulting in the formation of precipitates.

In regard to the last two entries of Table XXII, it should be noted that the weight ratio of N-vinyl-2-pyrrolidone to acrylamide in the three-component polymers was less that 1:1. Referring again to the first six three-component polymers of Table XXII, it should be noted that the weight ratio of N-vinyl-2-pyrrolidone to acrylamide varied over the range of 1:1 to about 1.4:1 in these 250° F. tests. At temperature of 250° F. and above, a ratio of at least 1:1 N-vinyl lactam:unsaturated amide is preferred. A lower ratio, for instance as low as 0.11:1 can be used in lower temperature applications such as at 170° F. This observation suggests that thermal stabilization of the three component polymer systems is related to the weight ratio of VP to Am in the polymer.

EXAMPLE XX

VP/AM/NaAMPS Polymers

This example presents in tabular form (see Table XXIII) a variety of VP/Am/NaAMPS polymer compositions which performed well enough in thermal aging tests to merit consideration for application in hostile environments.

TABLE XXIII

Aging Results on Representative VP/Am/NaAMPS Polymers Aged in Synthetic North Sea Water

| Wt/Wt/Wt VP/Am/NaAMPS | Inherent Viscosity (dL/g) | Viscosity (cP) 250° F. (2500 ppm) | |
|---|---|---|---|
| | | Unaged | Aged |
| 30/15/55 | 9.01 | 2.19 | 1.85 |
| 30/15/55 | 8.38 | 2.08 | 1.40 |
| 50/25/25 | 8.19 | 1.56 | 1.28 |
| 25/10/65 | 7.98 | 1.65 | 1.20 |
| 35/25/40 | 7.97 | 1.76 | 1.09 |
| 30/23/47 | 8.05 | 2.20 | 1.05 |
| 30/20/50 | 7.98 | 1.90 | 0.99 |
| 50/45/5 | 8.70 | 1.73 | 0.99 |
| 50/43/7 | 8.19 | 1.77 | 0.93 |
| 42.5/50/7.5 | 5.35 | 1.37 | 0.34 |

The last entry in Table XXIII is a 42.5/50/7.5 VP/Am/NaAMPS polymer which performed very poorly in the thermal aging test (aged viscosity 0.34 cP; the viscosity of sea water at 250° F. is about 0.28 cP). Part of this lack of thermal stability is believed related to the weight ratio of VP to Am in the polymer. Part is believed related to something which went wrong during the sample preparation. This polymer would be useful in lower temperature applications. It should be noted that in the first nine entries of Table XXIII which all performed will in the thermal aging tests the polymers contained >1:1 wt/wt ratio of VP:Am. The last polymer entry in the table contained <1:1 wt/wt ratio of VP:Am.

EXAMPLE XXI

This example describes the preparation and thermal aging testing of two polymers prepared, respectively, by the copolymerization of N-methyl-N-vinyl acetamide (NMVA) with acrylamide (Am) and by the terpolymerization of NMVA with Am and sodium 2-acrylamido-2-methylpropanesulfonate (NaAMPS).

Appropriate quantities of monomers were used to prepare the NMVA/Am 50/50 wt/wt copolymer and the NMVA/Am/NaAMPS 30/15/55 wt/wt/wt terpolymer. The polymerizations were carried out in accordance with conventional solution polymerization technology using a total solids level of 30% in distilled water at ambient temperature with 0.1 phm of initiator.

The gelled reaction masses were mixed with sufficient synthetic North Sea water to prepare 0.1 weight percent and 0.25 weight percent solutions for solution viscosity measurements. The NMVA/Am 50/50 wt/wt copolymer solution exhibited an inherent viscosity of 11.1 dL/g and an aged solution viscosity of 1.3 centipoise. The NMVA/Am/NaAMPS 30/15/55 wt/wt/wt terpolymer solution exhibited inherent viscosity of 9.6 dL/g and an aged solution viscosity of 1.7 centipose. In Table XXIV the performance of these polymers is compared to that of previously described hostile environment (HE) polymers VP/Am 50/50 wt/wt and VP/Am/NaAMPS 30/15/55.

TABLE XXIV

N-Methyl-N-Vinyl Acetamide Derived Polymers for use in Hostile Environments

Aged Viscosity[f]

TABLE XXIV-continued

| Run No. | Monomer Units (Wt %) | | | | IV (0.10)[e] SNSW 25° C. | SNSW (0.25) |
|---|---|---|---|---|---|---|
| | NMVA[a] | VP[b] | Am[c] | NaAMPS[d] | | |
| 1 | 50 | 0 | 50 | 0 | 11.1 | 1.3 |
| 2* | 0 | 50 | 50 | 0 | 8.9 | 1.2 |
| 3 | 30 | 0 | 15 | 55 | 9.6 | 1.7 |
| 4 | 0 | 30 | 15 | 55 | 8.5 | 1.7 |

*A representative gel log sample of a 50/50 VP/Am copolymer was used in this test.
[a]NMVA represents N-methyl-N-vinyl acetamide.
[b]VP represents N-vinyl-2-pyrrolidone.
[c]Am represents acrylamide.
[d]NaAMPS represents sodium 2-acrylamido-2-methylpropanesulfonate.
[e]IV represents Inherent Viscosity (dL/g) in Synthetic North Sea water.
[f]Aged viscosity is the observed solution viscosity after the solution was aged for one week at 300° F..

Referring to the aged solution viscosity results in runs 1 and 2 of Table XXIV, it is evident that a solution of the 50/50 wt/wt NMVA/Am copolymer in SNSW exhibited a solution viscosity comparable to that of a solution of the 50/50 wt/wt VP/Am copolymer in SNSW. Perhaps this result reflects the comparable thermal stability of the NMVA/Am and VP/Am copolymers in SNSW solution. This behavior may be attributable to the capacity, respectively, of the NMVA and VP moieties to disproportionately retard the hydrolysis rate of the pendant acrylamide amide function. This is particularly remarkable since these compounds do not have the cyclic lactam structure which has been shown to enhance stability.

Referring to the aged solution viscosity results in runs 3 and 4 of Table XXIV, it is evident that a solution of the 30/15/55 wt/wt/wt terpolymer in SNSW exhibited thermal stability comparable to that of a solution of the 30/15/55 wt/wt/wt VP/Am/NaAMPS terpolymer in SNSW. As indicated above, this result demonstrates the capacity of the NMVA and VP moieties to retard the hydrolysis rate of the pendant acrylamide amide function.

EXAMPLE XXII

This example describes hostile environment polymers derived from methacrylate esters of hydroxyalkanesulfonic acids. This example is divided into three parts to cover (a) the homopolymer of 3-methacryloyloxypropanesulfonic acid and water soluble salts thereof (SPM), (b) copolymers of SPM with (i) N,N-dimethylacrylamide (DMAm), (ii) sodium 2-acrylamido-2-methylpropanesulfonate (NaAMPS), (iii) N-methylacrylamide (NMAm), (iv) N-(methacryloyloxyethyl)-N,N-dimethylaminopropanesulfonate betaine (SPED), (v) potassium 3-acryloyloxypropanesulfonate (SPA) and (vi) N-vinyl-2-pyrrolidone (VP) and (c) terpolymers of SPM with (i) DMAm/NaAMPS, (ii) VP/Am and (iii) VP/NaAMPS.

All of the above polymers were prepared in accordance with conventional solution polymerization technology using total solids levels of 20–45% in distilled water at ambient temperature with about 0.1 phm of initiator. The cited weight percentages of polymer compositions reflects the relative weights of monomers charged to the polymerization zone.

(a) Homopolymers of SPM (potassium 3-methacryloyloxypropane sulfonate)

The gelled reaction masses from the homopolymerization runs were mixed with sufficient synthetic North Sea Water to prepare 0.1 weight percent and 0.25 weight percent solutions for solution viscosity measurements. Test results are summarized in Table XXV.

TABLE XXV

| | SPM Homopolymer Performance in SNSW | | | | |
|---|---|---|---|---|---|
| Run No. | % TS* | (Wt %) | | IV (0.1) SNSW 25° C. | Viscosity 250 F. (0.25 SNSW) cP |
| | | SPM[a] | SPA[b] | | Unaged / Aged |
| 1 | 30 | 100 | 0 | 7.4 | 1.8 / 1.6 |
| 2 | 35 | 100 | 0 | 8.3 | 1.9 / 1.5 |
| 3 | 45 | 100 | 0 | 8.6 | 2.3 / 1.8 |
| 4 | 30 | 0 | 100 | 8.5 | 3.1 / Pptd# |

*% TS represents % Total Solids in the polymerization medium.
[a]SPM represents potassium 3-methacryloyloxy propanesulfonate.
[b]SPA represents potassium 3-acryloyloxypropanesulfonate.
SPA homopolymer system failed the thermal aging test (Precipitation).

Referring to runs 1, 2 and 3 in Table XXV, it is evident that the SPM homopolymer in SNSW provided a solution which retained a significant percentage of its viscosity after thermal aging and the average solution viscosity of the thermally aged solution was 5.7 times that of sea water at 250° F. This behavior indicates that SPM hompolymer is potentially useful under hostile environment conditions.

Attention is called to the unexpected result observed in run 4 of Table XXV. The homopolymer of SPA (the lower homolog of SPM) failed to impart thermally stable viscosity to the solution in the high temperature test: precipitation accompanied the loss of solution viscosity.

(b) Copolymers of SPM
(i) DMAm/SPM (wt/wt): 10/90, 20/80, 30/70, 40/60, 50/50, 65/35, 80/20

TABLE XXVI

| | Performance Test Results on DMAm/SPM Copolymers* | | | |
|---|---|---|---|---|
| Run No. | Monomer Units (Wt %) | | IV (0.1) SNSW 25° C. | Viscosity 250° F. (0.25 SNSW) cP |
| | DMAm[a] | SPM[b] | | Unaged / Aged |
| C | 100 | 0 | NM# | 0.76 / 0.44 |
| 4 | 10 | 90[c] | 7.2 | 3.0 / 2.3 |
| 5 | 20 | 80 | 8.0 | 3.2 / 2.2 |
| 6 | 30 | 70 | 8.0 | 3.5 / 2.4 |
| 7 | 40 | 60 | 8.3 | 3.7 / 2.5 |
| 8 | 50 | 50 | 8.8 | 3.4 / 2.5 |
| 9 | 65 | 35 | 8.8 | 2.8 / 1.3 |
| 10 | 80 | 20 | 8.9 | 1.8 / 0.9 |

*Copolymers in runs 4–10 were prepared at 30% Total Solids.
[a]DMAm represents N,N-dimethylacrylamide.
[b]SPM represents potassium 3-methacryloyloxypropanesulfonate.
[c]This copolymer was prepared at 30% Total Solids. Another sample prepared at 40% Total Solids gave an aged viscosity of 2.9 cP.
NM represents Not Measured.

Referring to the results in Table XXVI, it is evident that copolymers of DMAm and SPM, especially those compositions containing 50 or more weight percent SPM are good candidates for hostile environment conditions: the average aged solution viscosity e.g., in runs 4–8 being 8.5 times the viscosity of sea water at 250° F. The homopolymer (see run C) of DMAm in SNSW exhibited an aged solution viscosity which was only about 1.6 times the aged viscosity of sea water at 250° F.

(ii) NaAMPS/SPM (wt/wt): 10/90, 15/85, 25/75, 30/70, 50/50, 65/35

TABLE XXVII

| | Performance Test Results on NaAMPS/SPM Copolymers* | | | |
|---|---|---|---|---|
| Run No. | Monomer Units (Wt %) | | IV (0.1) SNSW 25° C. | Viscosity 250° F. (0.25 SNSW) cP |
| | NaAMPS | SPM[b] | | Unaged / Aged |
| 11 | 10 | 90[c] | 6.7 | 2.1 / 1.9 |
| 12 | 15 | 85 | 6.4 | 1.9 / 1.8 |
| 13 | 25 | 75 | 6.2 | 1.8 / 1.6 |

TABLE XXVII-continued

Performance Test Results on NaAMPS/SPM Copolymers*

| Run No. | Monomer Units (Wt %) | | IV (0.1) | Viscosity 250° F. (0.25 SNSW) cP | |
| --- | --- | --- | --- | --- | --- |
| | NaAMPS<sup>a</sup> | SPM<sup>b</sup> | SNSW 25° C. | Unaged | Aged |
| 14 | 30 | 70 | 6.5 | 1.6 | 0.7 |
| 15 | 50 | 50 | 6.1 | 1.1 | 1.1 |
| 16 | 65 | 35 | 5.3 | 1.2 | 1.1 |

*Copolymers in runs 11–16 were prepared at 30% Total Solids.
<sup>a</sup>NaAMPS represents sodium 2-acrylamido-2-methylpropanesulfonate.
<sup>b</sup>SPM represents potassium 3-methacryloyloxypropanesulfonate.
<sup>c</sup>This copolymer was prepared at 30% Total Solids. Another sample prepared at 35% Total Solids gave an aged viscosity of 1.7 cP.
**Viscosity of sea water at 250° F. is about 0.28 cP.

Referring to the results in Table XXVII, it is evident that copolymers of NaAMPS and SPM over a range of compositions are good candidates for hostile environment conditions: the average aged viscosity being about 4.9 times the viscosity of sea water at 250° F.

(iii) NMAm/SPM (wt/wt): 10/90
(iv) SPED/SPM (wt/wt): 30/70
(v) SPA/SPM (wt/wt): 30/70
(vi) VP/SPM (wt/wt): 20/80, 10/90

TABLE XXVIII

Performance Test Results on NMAm/SPM, SPED/SPM, SPA/SPM and VP/SPM Copolymers*

| Run No. | Monomer Units (Wt %) | | | | | IV (0.1) | Viscosity 250° F. (0.25 SNSW) cP | |
| --- | --- | --- | --- | --- | --- | --- | --- | --- |
| | NMAm<sup>a</sup> | SPED<sup>b</sup> | SPA<sup>c</sup> | SPM<sup>d</sup> | VP<sup>e</sup> | SNSW 25° C. | Unaged | Aged |
| 17 | 10 | 0 | 0 | 90 | 0 | 6.5 | 1.6 | 0.9 |
| 18 | 0 | 30 | 0 | 70 | 0 | 7.6 | 2.4 | 1.2 |
| 19 | 0 | 0 | 30 | 70 | 0 | 6.7 | 1.6 | 1.1 |
| 20 | 0 | 0 | 0 | 80 | 20 | 6.5 | 1.6 | 0.9 |
| 21 | 0 | 0 | 0 | 90 | 10 | 7.5 | 1.6 | 1.3 |

*Copolymers in runs 17–19 were prepared at 30% Total Solids.
<sup>a</sup>NMAm represents N-methylacrylamide.
<sup>b</sup>SPED represents N-(methacryloyloxyethyl)-N,N-dimethylamino-propanesulfonate betaine.
<sup>c</sup>SPA represents potassium 3-acryloyloxypropanesulfonate.
<sup>d</sup>SPM represents potassium 3-methacryloyloxypropanesulfonate.
<sup>e</sup>VP represents N-vinyl-2-pyrrolidone.

Referring to the results in Table XXVIII, it is evident that the various copolymers of SPM are potentially useful in hostile environments because the aged solution viscosities were 3.2 to 4.6 times the viscosity of sea water at 250° F. It is noteworthy that in spite of the fact that the SPM homopolymer is effective a 10/90 Am/SPM copolymer in SNSW on aging at 250° F. was not effective as evidenced by an aged solution viscosity of 0.3 cP which is essentially the same as the viscosity of SNSW at 250° F.

(c) Terpolymers of SPM
(i) DMAm/NaAMPS/SPM (wt/wt/wt): 80/10/10, 60/20/20, 30/30/40, 20/60/20, 15/15/70

TABLE XXIX

Performance Test Results on DMAm/NaAMPS/SPM Terpolymers*

| Run No. | Monomer Units (Wt %) | | | IV (0.1) | Viscosity 250° F. (0.25 SNSW) cP | |
| --- | --- | --- | --- | --- | --- | --- |
| | DMAm<sup>a</sup> | NaAMPS<sup>b</sup> | SPM<sup>c</sup> | SNSW 25° C. | Unaged | Aged |
| 22 | 80 | 10 | 10 | 9.2 | 2.1 | 0.7 |
| 23 | 60 | 20 | 20 | 8.8 | 3.2 | 1.5 |
| 24 | 30 | 40 | 30 | 7.7 | 2.7 | 1.6 |
| 25 | 20 | 20 | 60 | 8.2 | 3.2 | 2.0 |
| 26 | 15 | 70 | 15 | 6.8 | 1.7 | 1.3 |

*Terpolymers were prepared at 30% Total Solids.
<sup>a</sup>DMAm represents N,N-dimethylacrylamide.
<sup>b</sup>NaAMPS represents sodium 2-acrylamido-2-methylpropanesulfonate. propanesulfonate betaine.
<sup>c</sup>SPM represents potassium 3-methacryloyloxypropanesulfonate.

Referring to the results in Table XXIX, it is evident that the various terpolymers of SPM are potentially useful in hostile environments because the aged solution viscosities were 2.5 to 7 times the viscosity of sea water at 250° F.

(ii) VP/Am/SPM (wt/wt/wt): 50/30/20, 30/10/60, 40/15/45, 40/30/30
(iii) VP/NaAMPS/SPM (wt/wt/wt): 20/60/20

TABLE XXX

Performance Test Results on VP/Am/SPM and VP/NaAMPS/SPM Terpolymers*

| Run No. | Monomer Units (Wt %) | | | | IV (0.1) | Viscosity 250° F. (0.25 SNSW) cP | |
| --- | --- | --- | --- | --- | --- | --- | --- |
| | VP<sup>a</sup> | Am<sup>b</sup> | NaAMPS<sup>c</sup> | SPM<sup>d</sup> | SNSW 25° C. | Unaged | Aged |
| 27 | 50 | 30 | 0 | 20 | 7.1 | 1.3 | 0.7 |
| 28 | 30 | 10 | 0 | 60 | 7.5 | 2.5 | 0.7 |
| 29 | 40 | 15 | 0 | 45 | 7.2 | 1.5 | 0.6 |
| 30 | 40 | 30 | 0 | 30 | 8.3 | 1.3 | 0.5 |
| 31 | 20 | 0 | 60 | 20 | 7.2 | 1.6 | 1.3 |

*Terpolymers in runs 28–31 were prepared at 30% Total Solids.
<sup>a</sup>VP represents N-vinyl-2-pyrrolidone.
<sup>b</sup>Am represents acrylamide.
<sup>c</sup>NaAMPS represents sodium 2-acrylamido-2-methylpropanesulfonate.
<sup>d</sup>SPM represents potassium 3-methacryloyloxypropanesulfonate.

Referring to the results in Table XXX, it is evident that the various terpolymers of SPM are potentially useful in hostile environments because the aged solution viscosities were about 1.8 to 4.6 times the viscosity of sea water at 250° F. Referring to run 31 in Table XXX, it can be concluded that the 20/60/20 VP/NaAMPS/SPM terpolymer (see aged solution viscosity) performed better than the VP/Am/SPM terpolymers of runs 27–30.

EXAMPLE XXIII

Thermal aging test data are presented for (i) poly(magnesium 2-acrylamido-2-methylpropanesulfonate), (ii) poly(magnesium 2-acrylamido- 2-methylpropanesulfonate-co-sodium 2-acrylamido-2-methylpropanesulfonate) (50/50 wt/wt ) [Mg(AMPS)$_2$/Na(AMPS)$_2$], and (iii) poly(magnesium 2-acrylamido-2-methylpropanesulfonate-co-sodium 2-acrylamido-2-methylpropanesulfonate) (10/90 wt/wt) [Mg(AMPS)$_2$/Na(AMPS)]. The cited weight percentages of monomers in these polymer compositions reflects the relative weights of monomers charged to the polymerization zone, e.g., for the 50/50 wt/wt [Mg(AMPS)$_2$/Na(AMPS)] polymer, equal weights of magnesium 2-acrylamido-2-methylpropanesulfonate and sodium 2-acrylamido-2-methylpropanesulfonate were charged to the polymerization zone. The polymers were prepared via techniques disclosed in U.S. Pat. No. 5,080,809.

TABLE XXXI

| | Mg(AMPS)$_2$ Polymers in synthetic North Sea Water (SNSW) | | | |
|---|---|---|---|---|
| | Monomer Units (Wt %) | | IV (0.1) SNSW | Viscosity 250 F. (0.25 SNSW) cP |
| Run No. | Mg(AMPS)$_2$ | NaAMPS | 25° C. | Unaged | Aged |
| 1 | 100 | 0 | 9.99 | 2.42 | 1.76 |
| 2 | 50 | 50 | 9.89 | 2.71 | 1.97 |
| 3 | 10 | 90 | 8.65 | 2.18 | 1.73 |

Referring to the results of Table XXXI, it is evident that the Mg(AMPS)$_2$-containing polymers in SNSW provided solutions which retained a significant percentage of solution viscosity after thermal aging and the average solution viscosity of the thermally aged solutions was about 6 times that of sea water at 250° F. This behavior indicates that the polymers are potentially useful under hostile environment conditions.

Preliminary investigations of the analogous systems with calcium 2-acrylamido-2-methylpropanesulfonate [Ca(Amps)$_2$] and aluminum 2-acrylamido-2-methylpropanesulfonate [Al(AMPS)$_3$] indicated that these salts ere significantly less soluble in aqueous systems than the Mg(AMPS)$_2$ monomer. In view of this finding, the Ca(AMPS)$_2$ and Al(AMPS)$_3$ compositions were not extensively studied.

EXAMPLE XXIV

Thermal aging test data are presented in this example for polymers derived from the diamine/AMPS salts. Polymers of the various diamine/AMPS salts were prepared in accordance with conventional solution polymerization technology using total solids levels of 20–30% in distilled water at ambient temperature with about 0.1 phm of initiator. The cited weight percentages of monomer units in the polymer compositions reflects the relative weights of monomers charged to the polymerization zone.

The gelled reaction masses from the polymerizations were mixed with sufficient synthetic North Sea water to prepare 0.1 weight percent and 0.25 weight percent solutions for solution viscosity measurements. Test results are summarized in Table XXXII.

TABLE XXXII

| | Polymers of Diamine/(AMPS)$_2$ Salts in Synthetic North Seawater (SNSW) | | | | | | |
|---|---|---|---|---|---|---|---|
| Run No. | TMEDA$^a$ (AMPS)$_2$ | NaAMPS$^b$ | TMEBA$^c$ (AMPS)$_2$ | THDA$^d$ (AMPS)$_2$ | IV (0.1) SNSW 25° C. | (0.25 SNSW) cP Unaged | Aged |
| 1 | 5 | 95 | 0 | 0 | 9.55 | 3.13# | 2.87# |
| 2 | 10 | 90 | 0 | 0 | 8.81 | 2.93+ | 1.35+ |
| 3* | 10 | 45 | 0 | 0 | 8.23 | 1.67 | 0.95 |
| 4 | 0 | 100 | 0 | 0 | 5.8 | 1.30 | 0.98 |
| 5 | 0 | 97 | 3 | 0 | 6.2 | 1.53 | 1.42 |
| 6** | 0 | 95 | 5 | 0 | 6.0 | 1.36 | 1.25 |
| 7 | 0 | 90 | 10 | 0 | 5.9 | 1.40 | 1.31 |
| 8 | 0 | 85 | 15 | 0 | 6.3 | 1.50 | 1.43 |
| 9 | 0 | 100 | 0 | 0 | 6.3 | 1.44 | 1.41 |
| 10 | 0 | 95 | 0 | 5 | 6.2 | 1.39 | 1.34 |
| 11 | 0 | 90 | 0 | 10 | 6.0 | 1.36 | 1.30 |

*This composition was 30 wt % VP, 15 wt % Am, 10 wt % TMEDA (AMPS)$_2$ and 45 wt % NaAMPS.
**A duplicate sample of this composition prepared from refined grade AMPS gave an unaged solution viscosity of 5.81 and an aged solution viscosity of 5.51.
Unaged value on a duplicate sample was 2.43 and aged value was 1.94.
+Unaged value on duplicate sample was 2.40 and aged value was 1.94.
$^a$TMEDA(AMPS)$_2$ represents the salt of 2-acrylamido-2-methylpropanesulfonic acid (AMPS) and N,N,N',N'-tetramethylethylenediamine.
$^b$NaAMPS represents sodium 2-acrylamido-2-methylpropanesulfonate.
$^c$TMEBA(AMPS)$_2$ represents the salt of AMPS and N,N,N'N'-tetramethyl-1,4-butanediamine.
$^d$THDA(AMPS)$_2$ represents the salt of AMPS and N,N,N',N'-tetramethyl-1,6-hexanediamine.

Referring to the results in Table XXXII, it is evident that relatively small loadings of the diamine (AMPS)$_2$ monomer in copolymerizations with NaAMPS (from commercial grade AMPS) provided potentially useful modified polymers. After thermal aging, solutions of these modified polymers in SNSW exhibited good retention of solution viscosity (see aged and unaged viscosity values). The average aged viscosity of the diamine (AMPS)$_2$/NaAMPS copolymer solutions was about 5 times the viscosity of SNSW at 250° F. This behavior shows that the polymers are useful in mobility control under hostile environment conditions.

The best performer in Table XXXII is found in run 6**. In the preparation of the 5/95 TMEBA/(AMPS)$_2$ salt, refined grade AMPS was used. The copolymerization was carried out at 35% total solids with 5 parts by weight of TMEBA/(AMPS)$_2$ and 95 parts by weight of NaAMPS prepared from refined grade AMPS. The aged solution viscosity value of 5.51 is about 19 times the viscosity of sea water at 250° F. which indicates that this system possesses potential as a mobility control agent under hostile environment conditions.

EXAMPLE XXV

Thermal aging tests are presented in this example for polymers derived from the oligomeric diamine/AMPS salts. The polymers were prepared via techniques disclosed in U.S. Pat. No. 5,080,809.

The gelled reaction masses from the polymerizations were mixed with sufficient synthetic North Sea water to prepare 0.1 weight percent and 0.25 weight percent solution viscosity measurements. Test results are summarized in Table XXXIII.

Referring to the results in Table XXXIII, it is evident that the oligomeric diamine/AMPS salts in relatively small amounts yielded copolymers with NaAMPS which are useful as hostile environment polymers. After thermal aging in synthetic North Sea water, solutions of these modified polymers exhibited good retention of solution viscosity (cf. aged and unaged viscosity values). The average aged viscosity values of the modified polymer solutions was about 3.5 times the viscosity of SNSW at 250° F. This behavior indicates that the subject polymers are useful in hostile environments, i.e., at temperatures in excess of 170° F. and in the presence of greater than 500 ppm divalent metal cations. Most remarkable is the essentially 100 percent retention of viscosity on high temperature aging.

TABLE XXXIII

| Polymers of Diamine/(AMPS)$_2$ Salts in Synethetic North Seawater (SNSW) | | | | | | |
|---|---|---|---|---|---|---|
| Run No. | ED-600$^a$ (AMPS)$_2$ | ED-900$^b$ (AMPS)$_2$ | NaAMPS | ED-2001$^c$ (AMPS)$_2$ | IV (0.1) SNSW 25° C. | (0.25 SNSW) cP Unaged | Aged |
| 12 | 2 | 0 | 98 | 0 | 6.3 | 1.29 | 1.46 |
| 13 | 5 | 0 | 95 | 0 | 5.8 | 1.16 | 1.14 |
| 14 | 10 | 0 | 90 | 0 | 5.2 | 0.95 | 1.10 |
| 15 | 0 | 2 | 98 | 0 | 5.6 | 1.17 | 1.08 |
| 16 | 0 | 10 | 90 | 0 | 5.0 | 0.9 | 0.87 |
| 17 | 0 | 0 | 98 | 2 | 5.5 | 1.11 | 1.08 |
| 18 | 0 | 0 | 90 | 10 | 4.9 | 1.0 | 0.9 |

$^a$ED-600 (MW ca. 600) is an oligomeric diamine described by the formula:

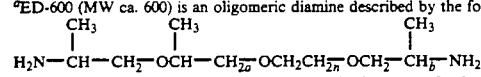

wherein n is in the range of 8–9 and (a + b) is in the range of 2–3.
$^b$ED-900 (MW ca. 900) is described by the above formula wherein n is 5–16 and (a + b) is 2–3.
$^c$ED-2001 (MW ca. 2000) is described by the above formula wherein n is 40–41 and (a + b) is 2–3.

While this invention has been described in detail for the purpose of illustration, it is not to be construed as limited thereby, but is intended to cover all the changes and modifications within the spirit and scope thereof.

That which is claimed is:

1. A flocculating process comprising adding a polymer of an N-vinyl lactam and an unsaturated amide of the formula

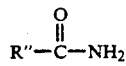

where R" is an unsaturated 1-alkenyl radical to a liquid containing solids, wherein the temperature of the liquid is at least about 170° F.

2. A process in accordance with claim 1 for concentrating finely divided organic or inorganic solids from an aqueous suspension thereof which comprises admixing with said suspension said polymer in an amount sufficient to cause accelerated sedimentation of the suspended solids, and maintaining the treated suspension under quiescent conditions to separate a clarified supernatant liquid layer and a concentrated solids suspension layer.

3. A process in accordance with claim 1 wherein said N-vinyl lactam is N-vinyl-2-pyrrolidone and said unsaturated amide is acrylamide.

4. A process in accordance with claim 1 wherein said polymer is a terpolymer prepared from a monomer mixture comprising about 10 weight percent or less based on total weight of monomers of at least one termonomer.

5. A process in accordance with claim 4 wherein said at least one termonomer is selected from the group consisting of hydrophobic compounds, vinyl pyridines and hydroxyalkyl esters of ethylenically unsaturated carboxylic acids, ethylenically-unsaturated nitriles, and combinations of any two or more thereof.

6. A flocculating process comprising adding a polymer of an N-vinyl lactam and an unsaturated amide to a liquid containing solids, wherein said liquid has a salinity of at least 10 grams per kilogram of solution.

7. A process in accordance with claim 6 wherein said liquid has a salinity of at least about 100 grams per kilogram of solution.

8. A process in accordance with claim 6 wherein said polymer contains an amount in the range of from about 10 to about 90 weight percent of said N-vinyl lactam, the remainder being said unsaturated amide.

9. A process in accordance with claim 8 wherein said N-vinyl lactam is N-vinyl-2-pyrrolidone and said unsaturated amide is acrylamide.

10. A process in accordance with claim 6 wherein said polymer is a terpolymer prepared from a monomer mixture comprising 10 weight percent or less based on total weight of monomers of at least one termonomer.

11. A process in accordance with claim 7 wherein said liquid is contacted with a potash ore.

12. In a process for accelerating the sedimentation of suspended solids in an aqueous suspension by mixing with a flocculating agent, the improvement comprising using as the flocculating agent a water-soluble polymer composition produced from a monomer composition comprising at least one of a hydrophilic N-vinyl lactam, at least one unsaturated amide of the formula

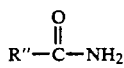

wherein R" is an unsaturated 1-alkenyl radical and at least one of a hydrophilic vinyl-containing sulfonate, wherein said polymer is contacted with said suspended solids at hostile environment conditions defined as including a temperature above 170° F. for a time sufficient for polymer aging.

13. A process in accordance with claim 12 wherein said N-vinyl lactam is N-vinyl-2-pyrrolidone and said unsaturated amide is acrylamide.

14. A process in accordance with claim 12 wherein said vinyl-containing sulfonate is selected from the group consisting of 2-acrylamido-2-methylpropanesulfonic acid and salts thereof and said unsaturated amide is acrylamide.

15. A process in accordance with claim 12 wherein said monomer composition comprises N-vinyl-2-pyrrolidone, acrylamide, and a vinyl-containing sulfonate selected from the group consisting of 2-acryamido-2-methylpropanesulfonic acid and the salts thereof.

16. A flocculating process comprising combining a solids-bearing liquid and a water-soluble polymer produced from a monomeric composition comprising at least one of a hydrophilic N-vinyl lactam, at least one of a hydrophilic α-, β- unsaturated carboxylic acid or a salt thereof, at least one of a hydrophilic unsaturated amide of the formula,

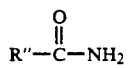

where R" is an unsaturated radical and at least one of a hydrophilic vinyl-containing sulfonic acid or a salt thereof wherein said water soluble polymer is exposed to hostile conditions defined as being at a temperature and a multivalent ion concentration above the infinite days line of FIG. 14.

17. A process according to claim 16 wherein said hydrophilic N-vinyl lactam is N-vinyl-2-pyrrolidone, said α-,β-unsaturated carboxylic acid is acrylic acid, said hydrophilic vinyl-containing sulfonic acid is 2-acrylamido-2-methylpropane sulfonic acid and said hydrophilic unsaturated amide is acrylamide.

18. A flocculating process comprising combining a solids-bearing liquid and a water-soluble polymer produced from a monomer composition comprising N-methyl-N-vinylacetamide and acrylamide wherein said water soluble polymer is exposed to hostile conditions defined as being at a temperature and a multivalent ion concentration above the infinite days line of FIG. 14 thereby forming flocculated solids and a treated liquid.

19. A flocculating process comprising combining a solids-bearing liquid and a water-soluble polymer produced from a monomeric composition comprising N-methyl-N-vinylacetamide and at least one of a hydrophilic vinyl-containing sulfonate wherein said water soluble polymer is exposed to hostile conditions defined as being at a temperature and a multivalent ion concentration above the infinite days line of FIG. 14 thereby forming flocculated solids and a treated liquid.

20. A flocculating process comprising combining a solids-bearing liquid and a water-soluble polymer produced from a monomeric composition comprising N-vinyl-2-pyrrolidone, at least one of an unsaturated amide of the formula

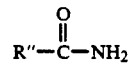

where R" is an unsaturated 1-alkenyl radical and at least one of a hydrophilic component of the formula

R is methyl, ethyl or H, provided further that at least one of the R groups on the terminal carbon of the vinyl group is H and the other is H or methyl, M is H, Na+, K+, Li+, R""$_4$N+, Ca++, Mg++, Zn++, Sr++, Fe++, Mn++, +NH$_3$R$^1$NH$_3$+ where R$^1$ is a 1-20 carbon atoms divalent hydrocarbon radical, R"" is H, —ROH or a 1-3 carbon atoms alkyl group, wherein X is selected from

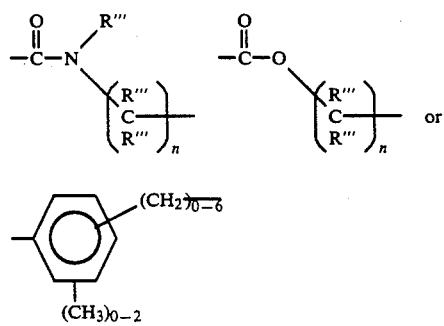

where n is an integer of 1-5, and R'" is a 1-3 carbon atom alkyl group or H, wherein said water soluble polymer is exposed to hostile conditions defined as being at a temperature and a multivalent ion concentration above the infinite days line of FIG. 14 thereby forming flocculated solids and a treated liquid.

21. A flocculating process comprising the steps of
(a) combining a solids-bearing solution and a water-soluble polymer produced from a monomeric composition comprising at least one of a hydrophilic N-vinyl amide and at least one of another unsaturated amide of the formula

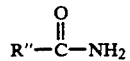

where R" is an unsaturated 1-alkenyl radical thereby forming a polymer-bearing, solids-bearing solution;
(b) exposing said polymer-bearing, solids-bearing solution to hostile conditions defined as being a temperature and a multivalent ion concentration above the infinite days line of FIG. 14; and
(c) separating the product of step (b) into a flocculated solids first part and a treated liquids second part wherein said polymer employed in step (a) has been preaged or said polymer in said polymer-bearing, solid-bearing solution in step (b) is aged in step (b) by exposure to said hostile conditions for a time sufficient to insure polymer aging.

22. A flocculating process comprising the steps of
(a) combining a solids-bearing solution and a water-soluble polymer produced from a monomeric composition comprising at least one of a hydrophilic N-vinyl amide and at least one of a hydrophilic vinyl-containing sulfonate thereby forming a polymer-bearing, solids-bearing solution;

(b) exposing said polymer in said polymer-bearing, solids-bearing solution to hostile conditions defined as being at a temperature and a multivalent ion concentration above the infinite days line of FIG. 14; and (c) separating the product of step (b) into a flocculated solids first part and a treated liquids second part wherein said polymer employed in step (a) has been preaged or said polymer in said polymer-bearing, solid-bearing solution in step (b) is aged in step (b) by exposure to said hostile conditions for a time sufficient to insure polymer aging.

23. A flocculating process comprising the steps of (a) combining a solids-bearing solution and a water-soluble polymer produced from a monomeric composition comprising at least one of a hydrophilic N-vinyl amide, at least one of another unsaturated amide of the formula

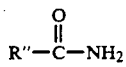

where R″ is an unsaturated 1-alkenyl radical and at least one of a hydrophilic component of the formula

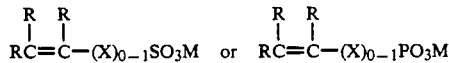

R is methyl, ethyl or H, provided further that at least one of the R groups on the terminal carbon of the vinyl group is H and the other is H or methyl, M is H, Na+, K+, Li+, R″″₄N+, Ca++, Mg++, Zn++, Sr+, Fe++, Mn++, +NH₃R¹NH₃+ where R¹ is a 1–20 carbon atoms divalent hydrocarbon radical, R″″ is H, —ROH or a 1–3 carbon atoms alkyl group, wherein X is selected from

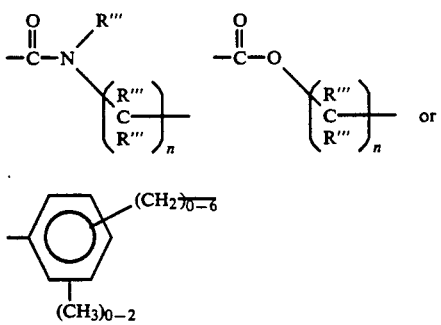

where n is an integer of 1–5, and R‴ is a 1–3 carbon atom alkyl group or H, thereby forming a polymer-bearing, solids-bearing solution;

(b) exposing said polymer-bearing, solids-bearing solution to hostile conditions defined as being a temperature and a multivalent ion concentration above the infinite days line of FIG. 14; and (c) separating the product of step (b) into a flocculated solids first part and a treated liquids second part wherein said polymer employed in step (a) has been preaged or said polymer in said polymer-bearing, solid-bearing solution in step (b) is aged in step (b) by exposure to said hostile conditions for a time sufficient to insure polymer aging.

24. A process according to claim 21 wherein said hydrophilic N-vinyl amide is N-vinyl lactam.

25. A process according to claim 24 wherein said N-vinyl lactam is N-vinyl-2-pyrrolidone and said unsaturated amide is acrylamide.

26. A process according to claim 22 wherein said hydrophilic N-vinyl amide is N-vinyl lactam.

27. A process according to claim 26 wherein said N-vinyl lactam is N-vinyl-2-pyrrolidone and said hydrophilic vinyl-containing sulfonate is a 2-acrylamido-2-methylpropane sulfonate.

28. A process according to claim 23 wherein said hydrophilic N-vinyl amide is N-vinyl lactam.

* * * * *

UNITED STATES PATENT AND TRADEMARK OFFICE
CERTIFICATE OF CORRECTION

PATENT NO. : 5,326,854
DATED : July 5, 1994
INVENTOR(S) : G. Allan Stahl et al

It is certified that error appears in the above-indentified patent and that said Letters Patent is hereby corrected as shown below:

Claim 20, column 53, line 66, delete "monomer" and insert —monomeric—.
Claim 20, column 54, line 10, at the end of the formula insert —wherein—.
Claim 23, column 55, line 37, at the end of the formula insert —wherein—.
Claim 23, column 55, line 42, delete "Sr+" and insert —Sr++—.

Signed and Sealed this

Twenty-fifth Day of October, 1994

Attest:

BRUCE LEHMAN

Attesting Officer     Commissioner of Patents and Trademarks